United States Patent
Ozaki et al.

(10) Patent No.: US 6,353,455 B1
(45) Date of Patent: Mar. 5, 2002

(54) METHOD OF EVALUATING CHARACTERISTICS OF A LIGHT BEAM, APPARATUS FOR EVALUATING THE CHARACTERISTICS, AND APPARATUS FOR ADJUSTING A WRITE UNIT BY EMPLOYING THE EVALUATING METHOD

(75) Inventors: Shinichi Ozaki; Katsushi Abe; Nobuhiro Takahashi, all of Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/398,761

(22) Filed: Sep. 17, 1999

Related U.S. Application Data

(62) Division of application No. 09/104,386, filed on Jun. 25, 1998, now Pat. No. 6,268,876.

(30) Foreign Application Priority Data

| Jun. 25, 1997 | (JP) | 9-183198 |
| Jul. 7, 1997 | (JP) | 9-197835 |
| Sep. 12, 1997 | (JP) | 9-268086 |
| Jan. 21, 1998 | (JP) | 10-009540 |
| Jun. 23, 1998 | (JP) | 10-176385 |
| Jun. 23, 1998 | (JP) | 10-176386 |
| Jun. 23, 1998 | (JP) | 10-176387 |
| Jun. 23, 1998 | (JP) | 10-176388 |
| Jun. 23, 1998 | (JP) | 10-176389 |
| Jun. 23, 1998 | (JP) | 10-176390 |
| Jun. 23, 1998 | (JP) | 10-176391 |
| Jun. 23, 1998 | (JP) | 10-176392 |
| Jun. 23, 1998 | (JP) | 10-176393 |

(51) Int. Cl.$^7$ .................................................. B41J 2/435
(52) U.S. Cl. .................... 347/236; 347/248; 347/250
(58) Field of Search ................................ 347/236, 225, 347/248, 250, 235, 234, 249; 250/235, 206.1, 206.3; 359/216

(56) References Cited

FOREIGN PATENT DOCUMENTS

| JP | 4-351928 | 12/1992 |
| JP | 5-284293 | 10/1993 |
| JP | 6-102087 | 4/1994 |
| JP | 8-86616 | 4/1996 |

*Primary Examiner*—N. Le
*Assistant Examiner*—Lamson Nguyen
(74) *Attorney, Agent, or Firm*—Oblon, Spivak, McClelland, Maier & Neustadt, P.C.

(57) ABSTRACT

At least two light beam detection units are spaced at a predetermined distance and provided in the scanning direction of a surface to be scanned. A light beam is emitted to the light beam detection unit provided on a scanning start side, by lighting a light beam source which is employed to scan the surface linearly during a scanning period equivalent to 1 dot during scanning. A light beam is emitted to the light beam detection unit provided on a scanning end side, by lighting the light beam source during the scanning period after elapse of a light-off period computed from a previously designed scanning speed and the predetermined distance. Based on a detection result of the light beam detection unit provided on the scanning start side and a detection result of the light beam detection unit provided on the scanning end side, scanning characteristics required of the light beam are evaluated.

16 Claims, 37 Drawing Sheets

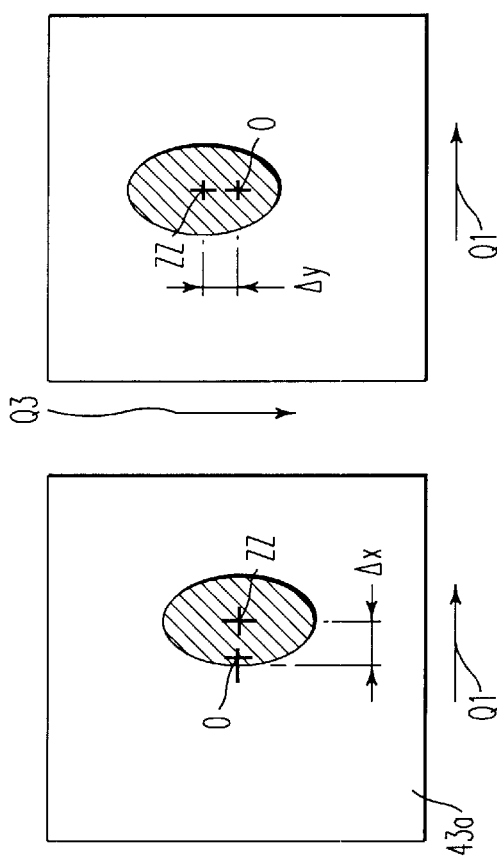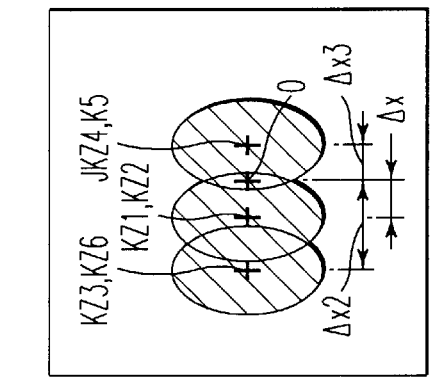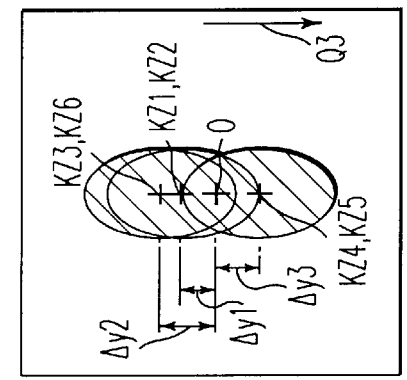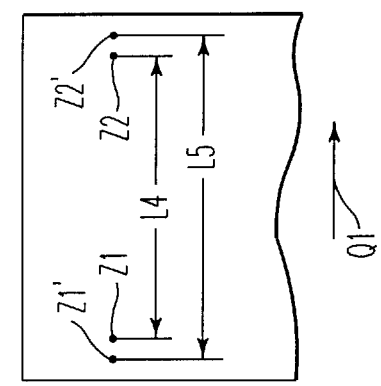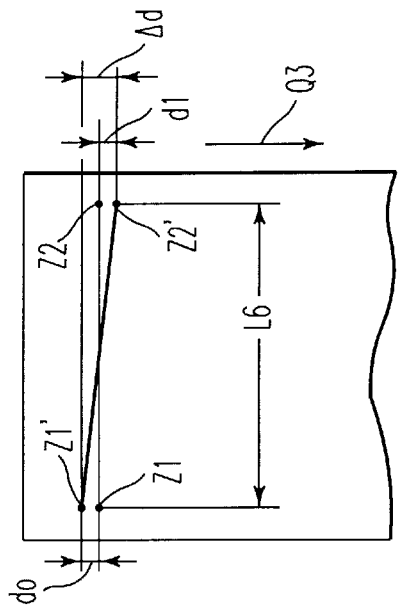
FIG. 19a  FIG. 19b  FIG. 19c
FIG. 19d  FIG. 19e  FIG. 19f

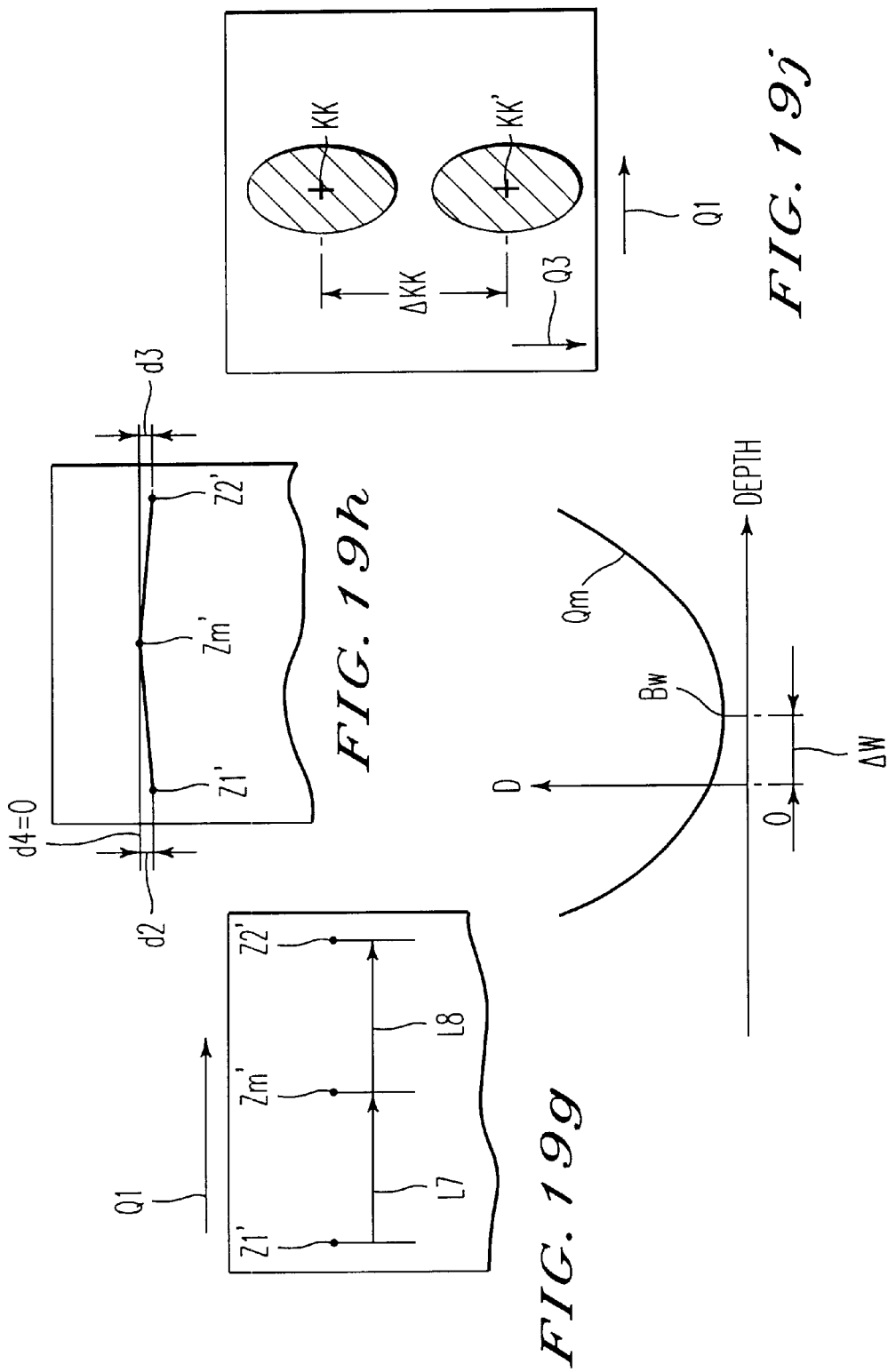

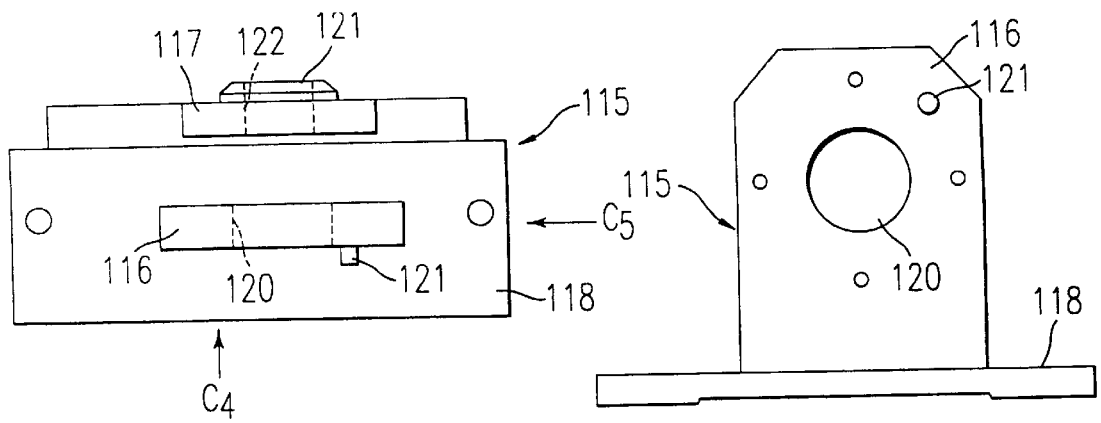
FIG. 42A          FIG. 42B
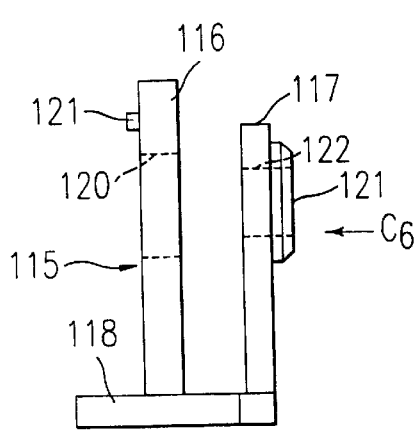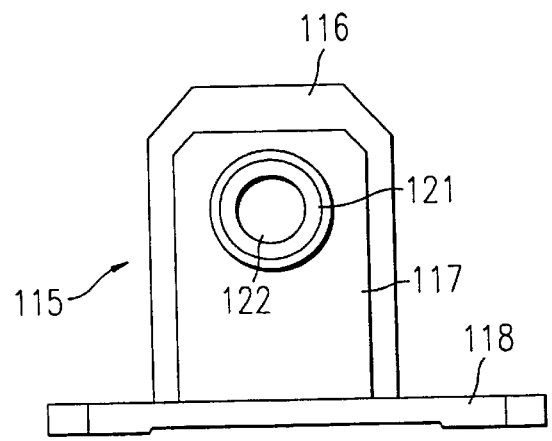
FIG. 42C          FIG. 42D
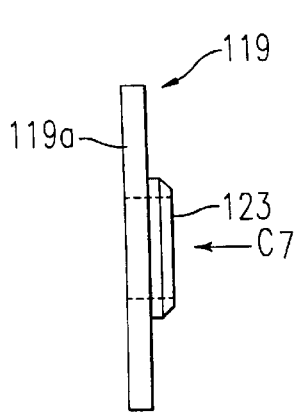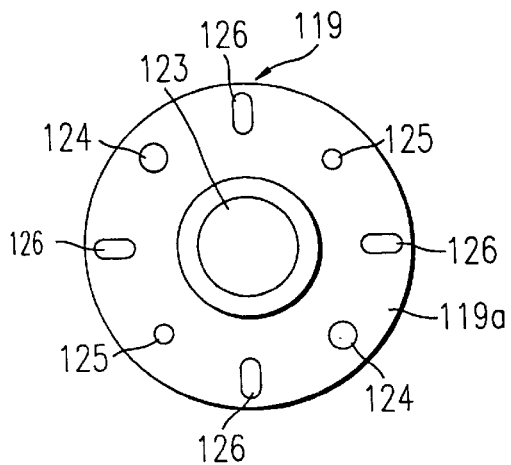
FIG. 43A          FIG. 43B

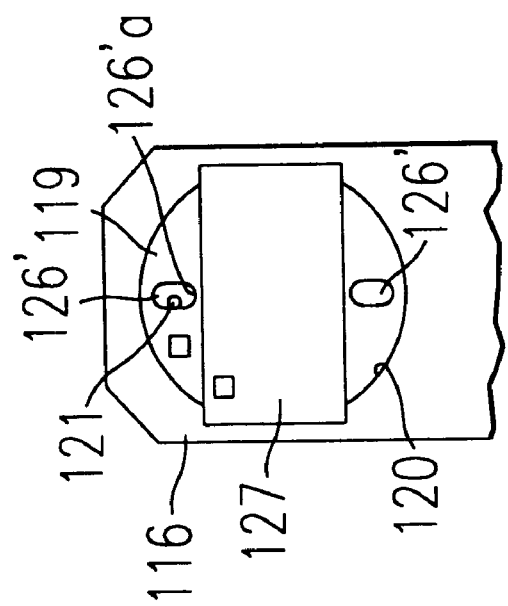
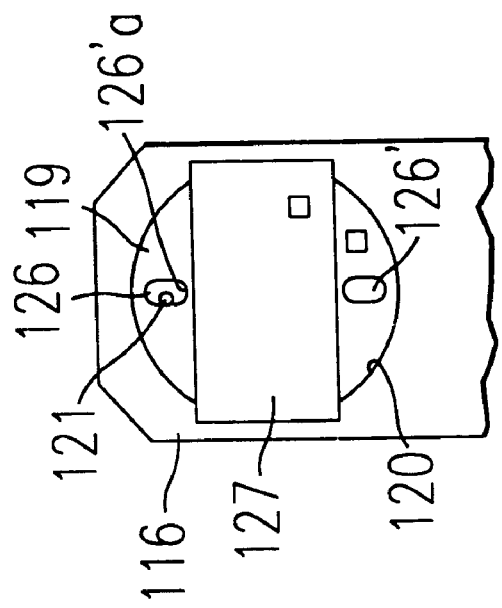

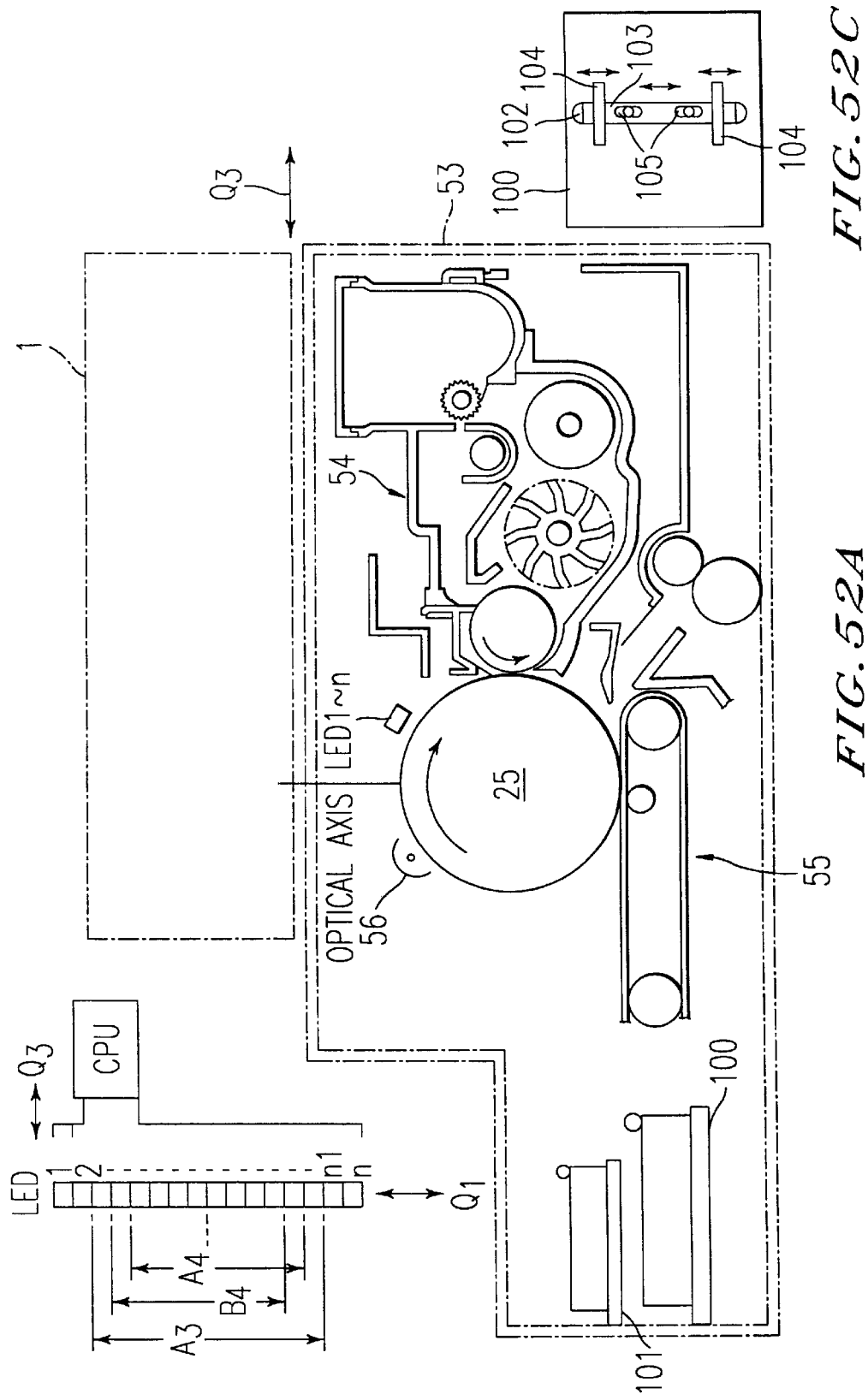

METHOD OF EVALUATING CHARACTERISTICS OF A LIGHT BEAM, APPARATUS FOR EVALUATING THE CHARACTERISTICS, AND APPARATUS FOR ADJUSTING A WRITE UNIT BY EMPLOYING THE EVALUATING METHOD

This application is a Division of application Ser. No. 09/104,386 filed on Jun. 25, 1998, now U.S. Pat. No. 6,268,876.

BACKGROUND OF THE INVENTION

1. Field of the Invention

The present invention relates to an apparatus for evaluating an image formation device, such as a laser printer and a copying machine. More particularly, the invention relates to a method of evaluating characteristics required of a light beam which is emitted from the write unit of an image formation device toward a latent image carrier, such as a photosensitive drum and a photosensitive belt. The invention also relates to a light beam characteristic evaluation apparatus that is employed for evaluating the characteristics, and further relates to an apparatus for adjusting a write unit by employing the evaluation method.

2. Description of the Related Art

Conventionally, an image forming device, such as a laser printer, a copying machine, and a facsimile device, performs writing on the surface of the photosensitive drum (latent image carrier) of an image forming unit by scanning the drum surface in both a horizontal scanning direction (i.e., main scanning direction) and a vertical scanning direction (i.e., sub-scanning direction) with a light beam emitted from a write unit, thereby forming an electrostatic latent image. In order to make the latent image visible and form a toner image, toner is caused to adhere to the surface of the photosensitive drum on which the latent image is formed. The toner image is transferred and fixed onto transfer paper. In this manner, an image is formed on the transfer paper.

The write unit is provided with an optical scanning system for scanning the surface of the photosensitive drum with a beam of light. The surface of the photosensitive drum is scanned in the horizontal scanning direction by the optical scanning system, while the surface is scanned in the vertical scanning direction by rotating the photosensitive drum.

In these image formation devices, incidentally, the characteristics required of the light beam of the write unit are evaluated in performing writing on the surface of the photosensitive drum which is a writing object.

For instance, in a copying machine, the image information on a manuscript is read in sequence and converted to a beam of light. In the case where the light beam writing position on the photosensitive drum surface deviates from a previously designed reference position, there arises a disadvantage that an image corresponding to the image information of a manuscript cannot be formed at the reference position. Particularly, in an image formation device, in which two laser light sources for emitting a beam of light are provided in the write unit and writing is performed on the photosensitive drum surface at two times the normal speed by scanning the photosensitive drum surface in the horizontal scanning direction concurrently with two light beams, if the writing position of one of the two light beams deviates from the writing position of the other light beam in the horizontal scanning direction, the image on a manuscript cannot be reproduced with high fidelity. Therefore, it is required to perform both the evaluation of the writing position of one light beam and the evaluation of the writing position of the other light beam.

In the case of a write unit which performs writing on a photosensitive drum by a single light beam, a writing position is computed for each surface of a polygon mirror constituting an optical scanning system. The object of evaluation in this case is both the position offset in the horizontal scanning direction (pitch fluctuation in the horizontal scanning direction) on each surface of the polygon mirror and the position offset in the vertical scanning direction (pitch fluctuation in the vertical scanning direction) on each surface of the polygon mirror.

In the case of a write unit which performs writing on a photosensitive drum by a plurality of multiplexed light beams, a pitch between light beams is also an object of evaluation in addition to the aforementioned evaluations.

Also, when two points on a manuscript in the horizontal scanning direction are extracted, two points on a copied image on transfer paper corresponding to the two points on the manuscript are extracted, and the distance between the two points on the manuscript is compared with the distance between the two points on the copied image, they must be equal to each other as long as copying is performed with equimagnification. If the distance between two points on a manuscript is not exactly equal to the distance between two points on a copied image, this will result in a magnification error. Since an image cannot be reproduced with high fidelity on transfer paper, performing the evaluation of a magnification error is required. In addition, in the case of enlargement and reduction, a ratio of a copied image formed on transfer paper to an image on a manuscript has to be equal to a desired magnification or demagnification ratio. If these ratio differ from each other, an image cannot be reproduced with high fidelity and therefore the evaluation of a magnification error will also be required.

Additionally, in the case where a left-side point and a right-side point on transfer paper are offset in the vertical scanning direction, it means that the scanning line has a tilt to the left or the right and therefore this scanning line tilt is also an object of evaluation.

Furthermore, assume that three points on a manuscript are extracted from left to right along the horizontal scanning direction and that the middle point is present at equal distances from the remaining two points. If the distance to the corresponding left-side point and the distance to the corresponding right-side point on the transfer paper are not equal with the corresponding middle point on the transfer paper as reference, a copied image will lack the balance between the right side and the left side. Therefore, it is also required to evaluate whether or not a distance from a middle point to a left-side point and a distance from a middle point to a right-side point are equal to each other.

In this case, if the difference between the writing position of the left-side point and the writing position of the middle point is not equal in the vertical scanning direction to the difference between the writing position of the right-side point and the writing position of the middle point, the scanning line will have a curve. Similarly, an image is not reproduced with high fidelity, so that it is also required to evaluate whether or not a scanning line has a curve.

Incidentally, a conventional apparatus for evaluating the characteristics of a light beam in the horizontal scanning direction is shown, for example, in FIG. 1 (see Japanese Laid-Open Patent Publication No. HEI 5-284293).

In the figure, reference numeral 1 denotes a write unit (optical unit). The write unit 1 is provided with a beam source (laser light source) 2, a rotatable polygon mirror 3, and an fθ lens 4. The beam source (laser light source) consists of a semiconductor laser 2. The semiconductor laser 2 is modulated and driven by an optical analog modulator 5. The optical analog modulator 5 modulates the strength of laser light emitted from the semiconductor laser 2 in correspondence to a manuscript image. The laser light emitted from the semiconductor laser 2 is deflected by rotation of the polygon mirror 3.

A pair of spaced photoelectric conversion elements 7a and 7b are provided in the horizontal scanning direction on a photosensitive surface 6 equivalent to the surface of a photosensitive drum provided in an image forming unit. In order to enhance received-light position accuracy (writing position accuracy), light intercepting plates 8a and 8b with a pinhole (circular small hole) are provided directly before the photoelectric conversion elements 7a and 7b. Let the distance between this pair of pinholes be L.

If the polygon mirror 3 is rotated with the semiconductor laser 2 lit at all times during scanning and if the photosensitive surface 6 is scanned in the horizontal direction Q1 with the light beam P1, the first photoelectric conversion element 7a will first receive the light beam P1 and then the second photoelectric conversion element 7b will receive the light beam P1. From the difference between the light receiving times and the distance L, an actual scanning speed of the light beam P1 of this write unit 1 can be computed. When this actually measured scanning speed of the light beam P1 is faster or slower than a previously designed scanning speed, the writing position of the light beam P1 is offset from the writing reference position.

Hence, whether this actually measured scanning speed of the light beam is within the allowable error of the designed scanning speed is evaluated. In the case where the measured scanning speed has exceeded this allowable error, the revolution speed of the polygon mirror 3 is adjusted so that the scanning speed of the write unit is within the allowable error.

This conventional light beam characteristic evaluation apparatus cannot compute the writing position itself directly. If it is to be computed, time needs to be computed until an output signal is output from the second photoelectric conversion element 7b since an output signal was output from the first photoelectric conversion element 7a. In addition, an actual scanning speed needs to be computed by dividing the distance L with the computed time, and a computation for converting this scanning speed to a writing position is needed. Therefore, the procedure for computing the writing position becomes complicated. Also, the characteristics of the light beam to be evaluated are limited.

Next, in the case where the beam diameter of the light beam P1 on the surface of the photosensitive drum is offset from a previously designed value, the edge of an image formed on transfer paper will become dim, or cracks will occur in the scanning line, so that there is a disadvantage that picture quality will be degraded. Therefore, it is also required to evaluate the diameter or shape of the light beam on the scanned surface.

In a conventional method of evaluating the beam diameter of a light beam, a pinhole or a slit is provided at a position corresponding to the surface of a photosensitive drum, and a light receiving device is provided directly after the pinhole or the slit. With this arrangement, the beam diameter is measured in a stationary state. This conventional method, however, cannot measure the beam diameter in a scanning state.

Hence, in order to measure the beam diameter in a scanning state, a method of and an apparatus for evaluating the beam diameter of a light beam have been proposed (see Japanese Laid-Open Patent Publication No. HEI 4-351928). As shown in FIG. 2, a one-dimensional (1-D) charge coupled device (CCD) 9 is provided on the photosensitive surface 6 equivalent to the surface of the photosensitive drum. In the optical path of the light beam P1 traveling toward the 1-D CCD 9, an objective lens is provided for directing the light beam P1 onto the photosensitive surface 6. While the beam spot S of the light beam P1 is being moved in a direction of arrow Q1 along the horizontal scanning direction, the 1-D CCD 9 is scanned n times in a direction of arrow Q2. The light quantity signals of pixels C1 to Cn during a signal scan are integrated and stored in a storage circuit. By computing a signal from this storage circuit, the light beam diameter is computed.

Incidentally, in this conventional evaluation method, when the 1-D CCD 9 is moved once in the direction of arrow Q2 and then is moved again in the direction of arrow Q2, the 1-scan period t1 of the 1-D CCD 9 has elapsed. For this reason, the light beam P1 has moved in the horizontal scanning direction (direction of arrow Q1) for this 1-scan period t1. Therefore, this evaluation method is equivalent to the constitution in which n 1-D CCDs 9 are arranged at regular intervals with the beam spot S in a stationary state, as schematically shown in FIG. 3.

In this evaluation method, as evident in FIG. 3, the light beam P1 has moved in the horizontal scanning direction for the 1-scan period t1 of the 1-D CCD 9, so that the beam spot S is fetched in a thinned-out state in the 1-D CCD 9. Furthermore, during the scanning period Δt between the time that after a certain pixel Ci of the 1-D CCD 9 is scanned, the image information is read and the time that after the adjacent pixel Ci+1 is scanned, the image information is read, the light beam P1 also moves in the horizontal scanning direction (direction of arrow Q1). Therefore, this is equivalent to fetching an image of the beam spot S by obliquely scanning the 1-D CCD 9, so that an error easily comes to occur when the beam diameter is quantized. The evaluation error in this quantization of the beam diameter is increased as the scanning speed of the light beam P1 is increased.

The aforementioned conventional light beam characteristic evaluation method (beam diameter evaluation method), therefore, has the disadvantage that it is difficult to enhance the evaluation accuracy of the beam diameter.

As previously described, the characteristics required of the light beam are a writing position characteristic to a photosensitive drum surface, pitch fluctuation in a horizontal scanning direction, pitch fluctuation in a vertical scanning direction, a beam-to-beam pitch, a magnification error, right-left balance (magnification error deviation), a scanning line curvature, a light beam diameter, a beam shape, and so on. In prior art, since the beam characteristics are evaluated by exclusive evaluation apparatuses, the characteristic evaluation of the light beam becomes complicated and is not a synthetic evaluation under the same condition, so that there is a fear that reliability of evaluation will be slightly reduced.

Furthermore, for a method of evaluating a beam spot diameter or a beam spot shape, there is a demand for an even greater enhancement in the evaluation accuracy of the beam spot diameter or beam spot shape in a scanning state.

In addition, positioning of a reference position is required in order to perform these evaluations.

For instance, Japanese Laid-Open Patent Publication No. HEI 8-86616 discloses a three-dimensional (3-D) image measurement apparatus equipped with a computer. This measurement apparatus is provided with a laser head for emitting a cross-shaped slit light to an object of measurement having a 3-D shape. The laser head is provided on a laser head bed so that it is rotatable on the intersection of the crossed slit and movable in a right-and-left direction and an up-and-down direction. This measurement apparatus is further provided with a CCD camera for photographing the measurement object, an image processing section for processing an image signal photographed by the CCD camera, and a laser head operation control section. In this 3-D image measurement apparatus, the lens center of the CCD camera and the center portion of the point end of the laser head are located on the X axis of a 3-D absolute coordinate system, and the photographing surface of the CCD camera is arranged in parallel to the X-Y plane.

This image measurement apparatus merely performs positioning of the area-type CCD element of the CCD camera by adjusting the area-type CCD element at a specific position in correspondence to the photographing position of the area-type CCD element and does not specify a reference pixel as a reference position for measurement. For this reason, there is a problem in that the offset between the positions of the reference pixel and laser light cannot be accurately grasped.

SUMMARY OF THE INVENTION

It is a first object of the present invention to provide a light beam characteristic evaluation method and a light beam characteristic evaluation apparatus which are capable of evaluating all characteristics required of a light beam.

A second object of the present invention is to provide a light beam characteristic evaluation method and a light beam characteristic evaluation apparatus which are capable of evaluating the diameter or shape of a light beam accurately even during scanning in a horizontal scanning direction (i.e., main scanning direction).

A third object of the present invention is to provide a light beam characteristic evaluation apparatus which is capable of performing positioning of a reference position accurately.

A fourth object of the present invention is to provide an adjustment apparatus for a write unit which is suitable for performing adjustment on the basis of results evaluated by employing the light beam characteristic evaluation apparatus.

The foregoing objects are accomplished by providing a light beam characteristic evaluation method comprising the steps of: providing a light beam source for emitting a light beam which scans a surface linearly; lighting the light beam source during a scanning period equivalent to 1 dot during scanning; and evaluating characteristics required of the light beam.

The foregoing objects are also accomplished by providing a light beam characteristic evaluation method comprising the steps of: providing at least two light beam detection means spaced at a predetermined distance in a scanning direction of a surface to be scanned; emitting a light beam to the light beam detection means provided on a scanning start side by lighting a light beam source which is employed to scan the surface linearly during a scanning period equivalent to 1 dot during scanning; emitting a light beam to the light beam detection means provided on a scanning end side by lighting the light beam source during the scanning period after elapse of a light-off period computed from a previously designed scanning speed and the predetermined distance; and evaluating scanning characteristics required of the light beam, based on a detection result of the light beam detection means provided on the scanning start side and a detection result of the light beam detection means provided on the scanning end side.

The light beam source may be a semiconductor laser. The light beam detection means may be area-type solid-state imaging elements. The scanning characteristics may be evaluated by computing an offset quantity between the position of the light beam on an imaging surface of the solid-state imaging element and a previously designed reference position.

The scanning period and the light-off period may be defined based on a clock signal generated by a clock generator.

The light beam source may be lit until the number of clock pulses equivalent to 1 dot is counted and put out until the number of clock pulses equivalent to the light-off period is counted.

The foregoing objects are also accomplished by a light beam characteristic evaluation apparatus comprising: a light beam source for scanning a surface; a lighting control circuit for lighting the light beam source during a scanning period equivalent to 1 dot during scanning; light beam detection means provided on the surface for detecting a light beam emitted from the light beam source; and evaluation processing means for evaluating characteristics required of the light beam on the basis of a detection result of the beam detection means.

The light beam source may be assembled into a write unit equipped with an optical scanning system. The light beam detection means may be an area-type solid-state imaging element, and the evaluation processing means may compute a writing position as a characteristic required of the light beam on the basis of a detection result of the area-type solid-state imaging element.

The area-type solid-state imaging element may be provided with at least two area-type solid-state imaging elements spaced at a predetermined distance in a horizontal scanning direction. Computation means may be provided for computing a light-off period from a previously designed scanning speed and the predetermined distance. After the light beam has been emitted on the light beam detection means provided on a scanning start side, the light beam source may be put out during the light-off period, and the light beam source may be lit again during the scanning period equivalent to 1 dot after elapse of the light-off period, whereby the light beam may be emitted on the light beam detection means provided on a scanning end side, and based on detection results of the light beam detection means, scanning characteristics required of the light beam may be evaluated.

The foregoing objects are also accomplished by providing a light beam characteristic evaluation apparatus comprising: a laser light source provided in a write unit having an optical scanning system, the laser light source being employed for scanning a surface; a lighting control circuit for lighting the laser light source during a scanning period equivalent to 1 dot during scanning; an area-type solid-state imaging element provided on the surface for detecting a light beam emitted from the laser light source; and evaluation processing means for evaluating a writing position as a characteristic required of the light beam on the basis of a detection result of the area-type solid-state imaging element.

The area-type solid-state imaging element may be provided with at least two area-type solid-state imaging elements spaced at a previously designed predetermined distance in a horizontal scanning direction. The laser light source may be put out after it has been lit during a scanning period equivalent to 1 dot toward the area-type solid-state imaging element provided on the scanning start side, and the laser light source may be lit again during the scanning period after elapse of a light-off period computed from a previously designed scanning speed and the predetermined distance. The evaluation processing means may compute a magnification error, by comparing a distance between a writing position detected by the area-type solid-state imaging element on the scanning start side and a writing position detected by the area-type solid-state imaging element on the scanning end side with the predetermined distance.

The area-type solid-state imaging element may be provided with three area-type solid-state imaging elements spaced in a horizontal scanning direction, one of the three area-type solid-state imaging elements being provided at a center position, one of the remaining area-type solid-state imaging elements being provided on a scanning start side, the other being provided on a scanning end side, and the area-type solid-state imaging element at the center position being provided at equal distances from the opposite two area-type solid-state imaging elements. The laser light source may be put out after it has been lit during a scanning period equivalent to 1 dot toward the area-type solid-state imaging element provided on the scanning start side, and the laser light source may be lit again during the scanning period toward the remaining area-type solid-state imaging elements after elapse of a light-off period computed from a previously designed scanning speed and the predetermined distance. The evaluation processing means may evaluate right-left image balance as the scanning characteristics, by comparing a distance between a writing position detected by the area-type solid-state imaging element provided on the scanning start side and a writing position detected by the middle area-type solid-state imaging element with a distance between a writing position detected by the middle area-type solid-state imaging element and a writing position detected by the area-type solid-state imaging element provided on the scanning end side.

The aforementioned light beam characteristic evaluation apparatus may further comprise a clock pulse generator for defining both the scanning period equivalent to 1 dot and the light-off period. The light beam source may be lit until the number of clock pulses equivalent to 1 dot is counted and put out until the number of clock pulses equivalent to the light-off period is counted.

The aforementioned light beam characteristic evaluation apparatus may further comprise computation means for computing the light-off period from a previously designed scanning speed and the distance.

The write unit may be provided with synchronous sensors for determining a write timing period on the scanning start and scanning end sides in the horizontal scanning direction. The laser light source may be lit continuously until a light beam is detected by the synchronous sensor on the scanning start side, and it may be put out once for 1-dot lighting after the light beam has been detected by the synchronous sensor present on the scanning start side.

The laser light source may be provided with two laser light sources and wherein writing to the surface to be scanned is possible by two light beams.

The evaluation processing means may compute a beam-to-beam pitch, based on both a position at which the area-type solid-state imaging element received a light beam emitted from one of the two laser light sources and a position at which the area-type solid-state imaging element received a light beam emitted from the other of the two laser light sources, and the evaluation processing means may evaluate the degree of parallelization between two light beams by computing the beam-to-beam pitch at least two or more points spaced in the horizontal scanning direction.

The evaluation processing means may compute beam centers of the area-type solid-state imaging elements in a vertical scanning direction (i.e., sub-scanning direction), and may evaluate a scanning line curvature of the light beam, based on the computed beam centers.

The write unit may be equipped with a synchronous sensor for determining a write timing period on a scanning start side. The area-type solid-state imaging element may be movable in a horizontal scanning direction, and the lighting control circuit may be controlled so as to light the laser light source for a period of 1 dot after a light-off period, related to a distance between the synchronous sensor and the area-type solid-state imaging element, has elapsed.

The light-off period may be computed from the distance and a previously set theoretical scanning speed.

The foregoing objects are also accomplished by providing a light beam characteristic evaluation apparatus comprising: a light beam source for scanning a surface; a lighting control circuit for lighting the light beam source during a scanning period equivalent to 1 dot during scanning; an area-type solid-state imaging element provided on the surface for detecting a light beam from the light beam source lit by the lighting control circuit; and evaluation processing means for computing a diameter of the light beam on the surface.

The beam diameter may be evaluated at at least two places in a scanning direction.

The light beam may be moved linearly in a horizontal scanning direction, and the computation means may compute both a beam diameter in the horizontal scanning direction and a beam diameter in a vertical scanning direction perpendicular to the horizontal scanning direction.

The evaluation processing means may compute a center position of the light beam from both the beam diameter in the horizontal scanning direction and the beam diameter in the vertical scanning direction.

The evaluation processing means may compute a beam shape present on the surface from both the beam diameter in the horizontal scanning direction and the beam diameter in the vertical scanning direction.

The evaluation processing means may compute a center position of the light beam, by computing both an intensity distribution of the beam diameter in the horizontal scanning direction and an intensity distribution of the beam diameter in the vertical scanning direction on each pixel of the area-type solid-state imaging element.

The foregoing objects are also accomplished by providing a light beam characteristic evaluation apparatus for evaluating a beam diameter on a first surface scanned by a light beam emitted from a laser light source which is provided in a write unit having an optical scanning system and also which is employed to perform only writing on a latent image carrier, the light beam characteristic evaluation apparatus comprising: a lighting control circuit for lighting the laser light source during a scanning period equivalent to 1 dot during scanning; an area-type solid-state imaging element provided on a second surface equivalent to the first surface for detecting a light beam from the laser light source lit by the lighting control circuit; and evaluation processing means for computing a diameter of the light beam on the second equivalent surface.

The light beam may be moved linearly in a horizontal scanning direction, and the computation means may compute both a beam diameter in the horizontal scanning direction and a beam diameter in a vertical scanning direction perpendicular to the horizontal scanning direction.

The evaluation processing means may compute a center position of the light beam from both the beam diameter in the horizontal scanning direction and the beam diameter in the vertical scanning direction.

The write unit may be equipped with a synchronous sensor for determining a write timing period of the latent image carrier, and the optical scanning system may be equipped with an f θ lens. The area-type solid-state imaging element may be arranged at an image height position equivalent to an optical axis position on the second equivalent surface, and the lighting control circuit may be controlled so as to light the laser light source for a period of 1 dot after a light-off period, related to a distance between the synchronous sensor and the area-type solid-state imaging element, has elapsed.

The evaluation processing means may evaluate a writing position, a magnification error, image balance, a scanning line curvature in a horizontal scanning direction, and a degree of parallelization of a light beam, based on the center position of the light beam.

The foregoing objects are also accomplished by providing a light beam characteristic evaluation method comprising the steps of: providing a light beam source for emitting a light beam which scans a surface linearly; lighting the light beam source during a scanning period equivalent to 1 dot during scanning; and computing a diameter or shape of the light beam.

The foregoing objects are also accomplished by providing an adjustment method comprising the steps of: providing a write unit incorporating an optical scanning system to form an electrostatic latent image on a surface of a latent image carrier by a light beam emitted from a laser light source; and moving the write unit relatively in a horizontal scanning direction against the latent image carrier in correspondence to an offset quantity of the light beam in the horizontal scanning direction, thereby adjusting the write unit.

The foregoing objects are also accomplished by providing an adjustment method comprising the steps of: providing a write unit incorporating an optical scanning system to form an electrostatic latent image on a surface of a latent image carrier by a light beam emitted from a laser light source; and moving the write unit relatively in a horizontal scanning direction against an image forming unit incorporating at least the latent image carrier in correspondence to an offset quantity of the light beam in the horizontal scanning direction, thereby adjusting the write unit.

The foregoing objects are also accomplished by an adjustment apparatus comprising: a write unit incorporating an optical scanning system to form an electrostatic latent image on a surface of a latent image carrier by a light beam emitted from a laser light source; an image forming unit incorporating at least the latent image carrier; and moving means for moving the write unit and the image forming unit relatively along a horizontal scanning direction in order to adjust an offset quantity of the light beam in the horizontal scanning direction.

The image forming unit may be provided with a developing unit.

The moving means may be constituted by a guide hole formed in a main body constitution wall of an image forming device and extending lengthwise in the horizontal scanning direction, and a support pin formed in either the write unit or the image forming unit and fitted into the guide hole.

The moving means may be constituted by an adjusting screw for moving either the write unit or the image forming unit in the horizontal scanning direction, and elastic means for urging either the write unit or image forming unit moved by the adjusting screw so that a point end of the adjusting screw abuts on the unit.

The moving means may be constituted by an adjusting screw for moving either the write unit or the image forming unit in the horizontal scanning direction and a boss portion provided in either the write unit or image forming unit moved by the adjusting screw, the adjusting screw meshing with the boss portion.

The foregoing objects are also accomplished by an adjustment method wherein a write unit, incorporating an optical scanning system to form an electrostatic latent image on a surface of a latent image carrier by a light beam emitted from a laser light source, is adjusted by moving the write unit relatively in a vertical scanning direction against the latent image carrier in correspondence to an offset quantity of the light beam in the vertical scanning direction, the vertical scanning direction being defined as a direction perpendicular to both a traveling direction of a light beam which is incident from the write unit toward the image forming unit and a horizontal direction.

The foregoing objects are also accomplished by an adjustment method wherein a write unit, incorporating an optical scanning system to form an electrostatic latent image on a surface of a latent image carrier by a light beam emitted from a laser light source, is adjusted by moving the write unit relatively in a vertical scanning direction against an image forming unit incorporating at least the latent image carrier in correspondence to an offset quantity of the light beam in the vertical scanning direction, the vertical scanning direction being defined as a direction perpendicular to both a traveling direction of a light beam which is incident from the write unit toward the image forming unit and a horizontal direction.

The foregoing objects are also accomplished by an adjustment apparatus comprising: a write unit incorporating an optical scanning system to form an electrostatic latent image on a surface of a latent image carrier by a light beam emitted from a laser light source; an image forming unit incorporating at least the latent image carrier; and moving means for moving the write unit and the image forming unit relatively along a vertical scanning direction defined as a direction perpendicular to both a traveling direction of a light beam which is incident from the write unit toward the image forming unit and a horizontal direction in order to adjust an offset quantity of the light beam in the vertical scanning direction.

The image forming unit may be provided with a developing unit.

The moving means may be constituted by a guide hole formed in a main body constitution wall of an image forming device and extending lengthwise in the vertical scanning direction, and a support pin formed in either the write unit or the image forming unit and fitted into the guide hole.

The moving means may be constituted by an adjusting screw for moving either the write unit or the image forming unit in the vertical scanning direction and elastic means provided in either the write unit or image forming unit moved by the adjusting screw, the elastic means being used for urging the moved unit so that a point end of the adjusting screw abuts on the unit.

The moving means may be constituted by an adjusting screw for moving either the write unit or the image forming unit in the vertical scanning direction and a boss portion provided in either the write unit or image forming unit moved by the adjusting screw, the adjusting screw meshing with the boss portion.

The foregoing objects are also accomplished by an adjustment method comprising the steps of: providing a write unit which incorporates both an optical scanning system and a synchronous sensor for determining a write timing period with respect to a latent image carrier in order to form an electrostatic latent image on a surface of the latent image carrier by a light beam emitted from a laser light source; and moving the synchronous sensor in a horizontal direction in correspondence to an offset quantity of the light beam of the write unit with respect to the latent image carrier in the horizontal scanning direction, thereby adjusting the offset quantity.

The foregoing objects are also accomplished by an adjustment apparatus comprising: a write unit incorporating both an optical scanning system and a synchronous sensor for determining a write timing period with respect to a latent image carrier in order to form an electrostatic latent image on a surface of the latent image carrier by a light beam emitted from a laser light source; and moving means for moving the synchronous sensor in a horizontal scanning direction in order to adjust an offset quantity of the light beam of the write unit with respect to the latent image carrier in the horizontal scanning direction.

The moving means may be constituted by a movable body for holding the synchronous sensor, a guide shaft for guiding the movable body in the horizontal scanning direction, an adjusting screw for moving the movable body by its point end portion abutting on the movable body, and means for urging the movable body in a direction which abuts on the point end portion of the adjusting screw.

The foregoing objects are also accomplished by a light beam characteristic evaluation method comprising the steps of: lighting a laser light source of a light beam which is employed to scan a surface linearly during a scanning period equivalent to 1 dot; moving an area-type solid-state imaging element which detects the light beam in order along a traveling direction of the light beam with the surface as a reference position; and obtaining a beam image at each position by the area-type solid-state imaging element.

Based on each beam image obtained by the area-type solid-state imaging element at each position in the traveling direction of the light beam, a beam diameter may be computed at the each position of the light beam, whereby a beam diameter with respect to a depth direction may be evaluated.

From the beam diameter and a depth, a depth curve representative of a relation of the beam diameter to the depth is computed, a beam waist position may be specified based on the depth curve, and from a difference between the beam waist position and the reference position, a beam waist position correction quantity may be computed.

The foregoing objects are also accomplished by a light beam characteristic evaluation apparatus comprising: a light beam source for emitting a light beam which scans a surface linearly; a 1-dot lighting control circuit for lighting the light beam source during a scanning period equivalent to 1 dot; an area-type solid-state imaging element for detecting the light beam, the element being movable in a traveling direction of the light beam with the surface as a reference position; and evaluation processing means for computing a beam diameter at each position in the traveling direction of the light beam, based on the light beam detected by the area-type solid-state imaging element.

The evaluation processing means may compute a depth curve representative of a relation of the beam diameter to a depth from the beam diameter and depth and specify a beam waist position on the basis of the depth curve. Furthermore, the evaluation processing means may compute a beam waist position correction quantity from a difference between the beam waist position and the reference position.

The foregoing objects are also accomplished by a light beam characteristic evaluation apparatus comprising: a write unit with an optical scanning system; a light beam source for emitting a light beam which scans a surface linearly, the light beam source being provided in the write unit; a 1-dot lighting control circuit for lighting the light beam source during a scanning period equivalent to 1 dot; an area-type solid-state imaging element for detecting the light beam, the element being movable in a traveling direction of the light beam with the surface as a reference position; and evaluation processing means for computing a beam diameter at each position in the traveling direction of the light beam, based on the light beam detected by the area-type solid-state imaging element; the write unit being equipped with a synchronous sensor for determining a write timing period on a scanning start side in a horizontal scanning direction; the laser light source being lit continuously until the light beam is detected by the synchronous sensor present on a scanning start side and also being put out once for 1-dot lighting after the light beam has been detected by the synchronous sensor present on the scanning start side; and the 1-dot lighting control circuit being controlled so that the laser light source is lit after elapse of the write timing period.

The aforementioned light beam characteristic evaluation apparatus may further comprise: computation means for computing the write timing period from both a distance in a horizontal direction between the synchronous sensor and the area-type solid-state imaging element and a previously designed scanning speed; and a clock pulse generator for defining both the scanning period equivalent to 1 dot and the write timing period. The light beam source is lit until a light beam is detected by the synchronous sensor, is put out until the number of clock pulses equivalent to the write timing period is counted since the synchronous sensor detected the light beam, and is lit by the 1-dot lighting control circuit until the number of clock pulses equivalent to 1 dot is counted.

The foregoing objects are also accomplished by an adjustment method wherein at least either an image forming unit or a write unit is moved so that a space therebetween is increased or decreased, in order to adjust an optical path length between a laser light source and a writing object surface of the image forming unit and based on a beam waist position correction quantity obtained by a light beam characteristic evaluation method comprising the steps of: (a) lighting the laser light source of a light beam which is employed to scan the writing object surface of the image forming unit linearly during a scanning period equivalent to 1 dot; (b) moving an area-type solid-state imaging element which detects the light beam in order along a traveling direction of the light beam with the writing object surface as a reference position, thereby obtaining a beam image at each position by the area-type solid-state imaging element; (c) based on each beam image obtained by the area-type solid-state imaging element at each position in a traveling direction of the light beam, computing a beam diameter at the each position of the light beam and thereby computing a beam diameter with respect to a depth direction; (d) from the beam diameter and a depth, computing a depth curve representative of a relation of the beam diameter to the depth;

(e) specifying a beam waist position on the basis of the depth curve; and (f) from a difference between the beam waist position and the reference position, computing the beam waist position correction quantity.

The foregoing objects are also accomplished by an adjustment apparatus which comprises optical path length adjustment means for moving at least either an image forming unit or a write unit so that a space therebetween is increased or decreased, in order to adjust an optical path length between a laser light source and a writing object surface of the image forming unit and based on a beam waist position correction quantity obtained by a light beam characteristic evaluation method comprising the steps of: (a) lighting the laser light source of a light beam which is employed to scan the writing object surface of the image forming unit linearly during a scanning period equivalent to 1 dot; (b) moving an area-type solid-state imaging element which detects the light beam in order along a traveling direction of the light beam with the writing object surface as a reference position, thereby obtaining a beam image at each position by the area-type solid-state imaging element; (c) based on each beam image obtained by the area-type solid-state imaging element at each position in a traveling direction of the light beam, computing a beam diameter at the each position of the light beam and thereby computing a beam diameter with respect to a depth direction; (d) from the beam diameter and a depth, computing a depth curve representative of a relation of the beam diameter to the depth; (e) specifying a beam waist position on the basis of the depth curve; and (f) from a difference between the beam waist position and the reference position, computing the beam waist position correction quantity.

In order to change an optical path length between a surface of a latent image carrier of the image forming unit and the write unit, the optical path length adjustment means may be constituted by a guide hole formed in a main body constitution wall of an image forming device and a guide pin formed in either the write unit or the image forming unit and fitted into the guide hole.

The foregoing objects are also accomplished by an adjustment method wherein an optical path length between a laser light source and a surface to be scanned is adjusted based on a beam waist position correction quantity obtained by a light beam characteristic evaluation method comprising the steps of: (a) lighting the laser light source of a light beam which is employed to scan the surface linearly during a scanning period equivalent to 1 dot; (b) moving an area-type solid-state imaging element which detects the light beam in order along a traveling direction of the light beam with the writing object surface as a reference position, thereby obtaining a beam image at each position by the area-type solid-state imaging element; (c) based on each beam image obtained by the area-type solid-state imaging element at each position in a traveling direction of the light beam, computing a beam diameter at the each position of the light beam and thereby computing a beam diameter with respect to a depth direction; (d) from the beam diameter and a depth, computing a depth curve representative of a relation of the beam diameter to the depth; (e) specifying a beam waist position on the basis of the depth curve; and (f) from a difference between the beam waist position and the reference position, computing the beam waist position correction quantity.

The foregoing objects are also accomplished by an adjustment apparatus which comprises optical path length adjustment means for adjusting an optical path length between a laser light source and a surface to be scanned, based on a beam waist position correction quantity obtained by a light beam characteristic evaluation method comprising the steps of: (a) lighting the laser light source of a light beam which is employed to scan the surface linearly during a scanning period equivalent to 1 dot; (b) moving an area-type solid-state imaging element which detects the light beam in order along a traveling direction of the light beam with the writing object surface as a reference position, thereby obtaining a beam image at each position by the area-type solid-state imaging element; (c) based on each beam image obtained by the area-type solid-state imaging element at each position in a traveling direction of the light beam, computing a beam diameter at the each position of the light beam and thereby computing a beam diameter with respect to a depth direction; (d) from the beam diameter and a depth, computing a depth curve representative of a relation of the beam diameter to the depth; (e) specifying a beam waist position on the basis of the depth curve; and (f) from a difference between the beam waist position and the reference position, computing the beam waist position correction quantity.

The laser light source may be equipped with a semiconductor laser for emitting a light beam, a collimator lens for collimating the light beam, and a lens barrel for holding the collimator lens. The lens barrel may be formed with a first screw portion along an optical axis direction. The constitution wall of the write unit may be formed with a second screw portion at a position at which the lens barrel is arranged, the first screw portion meshing with the second screw portion. The optical path length adjustment means may be constituted by the first and second screw portions.

The foregoing objects are also accomplished by a light beam characteristic evaluation apparatus which is employed in a method of evaluating characteristics required of a light beam by forming the light beam on an area-type imaging element installed on a first surface equivalent to a second surface to be scanned, the light beam being emitted from a laser light source which is employed to scan the second surface linearly, the light beam characteristic evaluation apparatus comprising: a reference laser light source for determining previously designed reference positions of the light beam present on the second surface in horizontal and vertical scanning directions; a holder member for holding the reference laser light source; an angular position determination member for holding the holder member so that the holder member is rotatable and determining a rotational angular position of the reference laser light source; and a positioning reference base for positioning the angular position determination member so that a center of rotation of the holder member is aligned with a previously designed emission line of the light beam; wherein a reference pixel equivalent to the reference position on the area-type imaging element is specified, by rotating the holder member on the center of rotation and receiving a reference light beam emitted from the reference laser light source at at least two rotational angular positions with the area-type imaging element.

The positioning reference base may extend in the horizontal scanning direction.

The reference laser light source may be a semiconductor laser.

The laser light source may be provided in a write unit incorporating an optical scanning system.

The evaluation may be performed by lighting the laser light source during a scanning period equivalent to 1 dot during scanning.

The foregoing objects are also accomplished by a light beam characteristic evaluation apparatus which is employed in a method of evaluating characteristics required of a light beam by forming the light beam on an area-type imaging element installed on a first surface equivalent to a second surface to be scanned, the light beam being emitted from a laser light source provided in a write unit having an optical scanning system for linearly scanning the second surface of a latent image carrier provided in an image forming unit, the light beam characteristic evaluation apparatus comprising: a positioning member for positioning the write unit with respect to the image forming unit; a reference laser light source for determining previously designed reference positions of a light beam on the second surface in horizontal and vertical scanning directions, the light beam being emitted from the laser light source; a holder member for holding the reference laser light source; an angular position determination member for holding the holder member so that the holder member is rotatable and determining a rotational angular position of the reference laser light source; and a positioning reference base for positioning the angular position determination member so that a center of rotation of the holder member is aligned with a previously designed emission line of the light beam emitted from the write unit, the positioning reference base being provided in a positioning base; wherein a reference pixel equivalent to the reference position on the area-type imaging element is specified, by rotating the holder member on the center of rotation and receiving a reference light beam emitted from the reference. laser light source at at least two rotational angular positions with the area-type imaging element.

The rotational angular positions may be symmetrical positions spaced 180 degrees.

The angular position determination member may be provided on the positioning reference base so that it can be relocated in the horizontal scanning direction.

The aforementioned light beam characteristic evaluation apparatus may further comprise adjustment means for adjusting an imaging surface of the area-type imaging element so that the imaging surface is located at the first surface.

The foregoing objects are also accomplished by a light beam characteristic evaluation apparatus which is employed in an evaluation method comprising the steps of: lighting a laser light source during a scanning period equivalent to 1 dot during scanning, the laser light source being provided in a write unit having an optical scanning system for linearly scanning a first surface of a latent image carrier of an image forming unit; forming the light beam on at least two or more area-type imaging elements spaced in a horizontal scanning direction and provided on a second surface equivalent to the first surface to be scanned; and evaluating characteristics required of the light beam; the light beam characteristic evaluation apparatus comprising: a positioning member for positioning the write unit with respect to the image forming unit; a reference laser light source for determining previously designed reference positions of a light beam on the first surface in horizontal and vertical scanning directions, the light beam being emitted from the laser light source; a cylindrical holder member for holding the reference laser light source; angular position determination members for determining a rotational angular position of the reference laser light source, the determination members having a circular fitting hole into which the cylindrical holder member is rotatably fitted; and a positioning reference base for positioning the angular position determination members so that a center of rotation of the cylindrical holder member is aligned with a previously designed emission line of the light beam emitted from the write unit, the positioning reference base being provided in a positioning base; wherein a reference pixel equivalent to the reference position on the area-type imaging element is specified, by rotating the cylindrical holder member and receiving a reference light beam emitted from the reference laser light source at at least two rotational angular positions with the area-type imaging elements.

The angular position determination member may be provided with an engagement pin and the cylindrical holder member is provided with an engagement hole which engages with the engagement pin.

The rotational angular positions may be symmetrical positions spaced 180 degrees.

The angular position determination member may be provided in the positioning reference base so that it can be relocated in the horizontal scanning direction.

The angular position determination members may be spaced in the horizontal scanning direction and provided in correspondence to the area-type imaging elements.

Once a reference pixel of a certain area-type imaging element has been specified by rotating the cylindrical holder member, the specification of reference pixels of the remaining area-type imaging elements is performed without rotating the cylindrical holder member.

BRIEF DESCRIPTION OF THE DRAWINGS

The above and other objects and advantages will become apparent from the following detailed description when read in conjunction with the accompanying drawings wherein:

FIGS. 19(a) through 19(j) are each an explanatory diagram for explaining an example of the characteristics which are evaluated by the light beam characteristic evaluation apparatus according to the present invention;

FIG. 19(a) is a diagram showing the offset of writing positions in the horizontal scanning direction;

FIG. 19(b) is a diagram showing the offset of writing positions in the vertical scanning direction;

FIG. 19(c) is a diagram used to explain pitch fluctuation present on the surfaces of a polygon mirror in the horizontal scanning direction;

FIG. 19(d) is a diagram used to explain pitch fluctuation present on the surfaces of the polygon mirror in the vertical scanning direction;

FIG. 19(e) is a diagram used to explain a magnification error;

FIG. 19(f) is a diagram used to explain the inclined angle of a scanning line;

FIG. 19(g) is a diagram used to explain magnification error deviation;

FIG. 19(h) is a diagram used to explain a scanning line curvature;

FIG. 19(i) is a diagram used to explain a depth curve;

FIG. 19(j) is a diagram used to explain a beam-to-beam pitch;

FIG. 42(a) is a plan view of the positioning block member shown in FIGS. 39 and 41;

FIG. 42(b) is a view taken in a direction of arrow c4 in FIG. 42(a);

FIG. 42(c) is a view taken in a direction of arrow c5 in FIG. 42(a);

FIG. 42(d) is a view taken in a direction of arrow c6 in FIG. 40(c);

FIG. 43(a) is a side view of the LD holder plate shown in FIG. 41;

FIG. 43(b) is a view taken in a direction of arrow c7 in FIG. 43(a);

FIG. 45(a) is a partially enlarged view showing the LD holder plate and the positioning block member and also showing the state before the LD holder plate is rotated 180 degrees;

FIG. 45(b) is a partially enlarged view showing the LD holder plate and the positioning block member and also showing the state after the LD holder plate has been rotated 180 degrees;

FIG. 52(a) is an explanatory diagram of a structure for adjusting a writing position in the horizontal scanning direction by moving a sheet loading position, and is a schematic view of the inner construction of an image forming unit;

FIG. 52(b) shows an arrangement of LEDs shown in FIG. 52(a);

FIG. 52(c) shows a side guide attached to a sheet loading tray;

DETAILED DESCRIPTION OF THE PREFERRED EMBODIMENTS

Embodiments of the present invention will hereinafter be described in detail in reference to the drawings.

Figure 1:
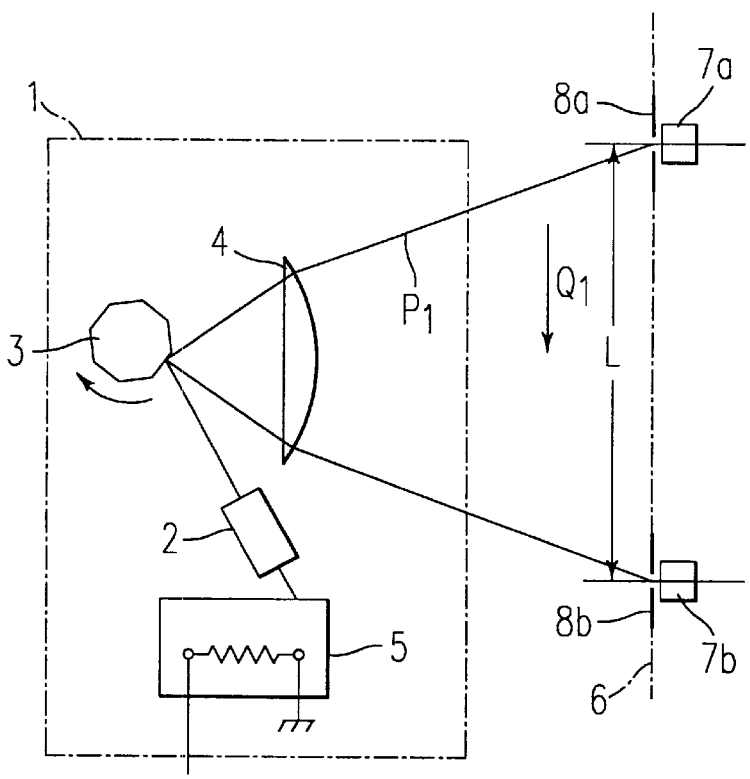
FIG. 1 is an explanatory diagram showing a conventional light beam scanning characteristic evaluation apparatus.
Figure 2:
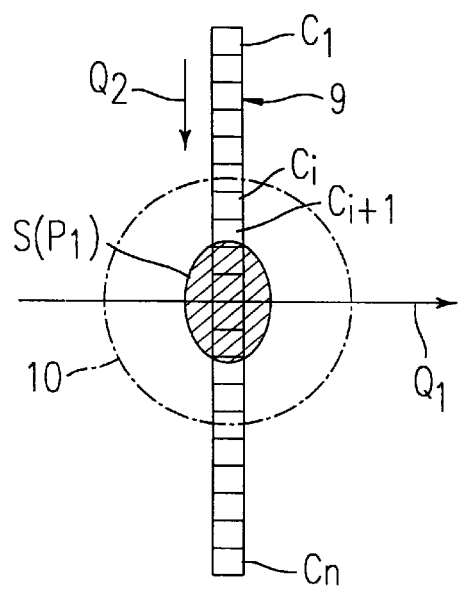
FIG. 2 is an explanatory diagram showing the conventional light beam scanning characteristic evaluation apparatus and also showing how the diameter of a light beam is measured with a one-dimensional CCD during scanning.
Figure 3:
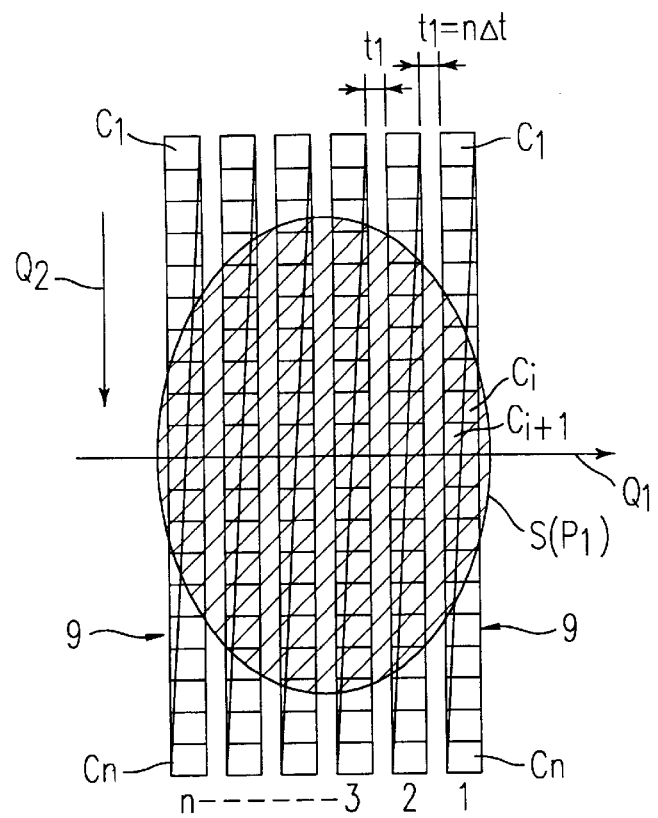
FIG. 3 is an explanatory diagram when the diameter of the light beam is measured during scanning with the one-dimensional CCD shown in FIG. 2 on the assumption that the light beam shown in FIG. 2 is stationary.
Figure 4:
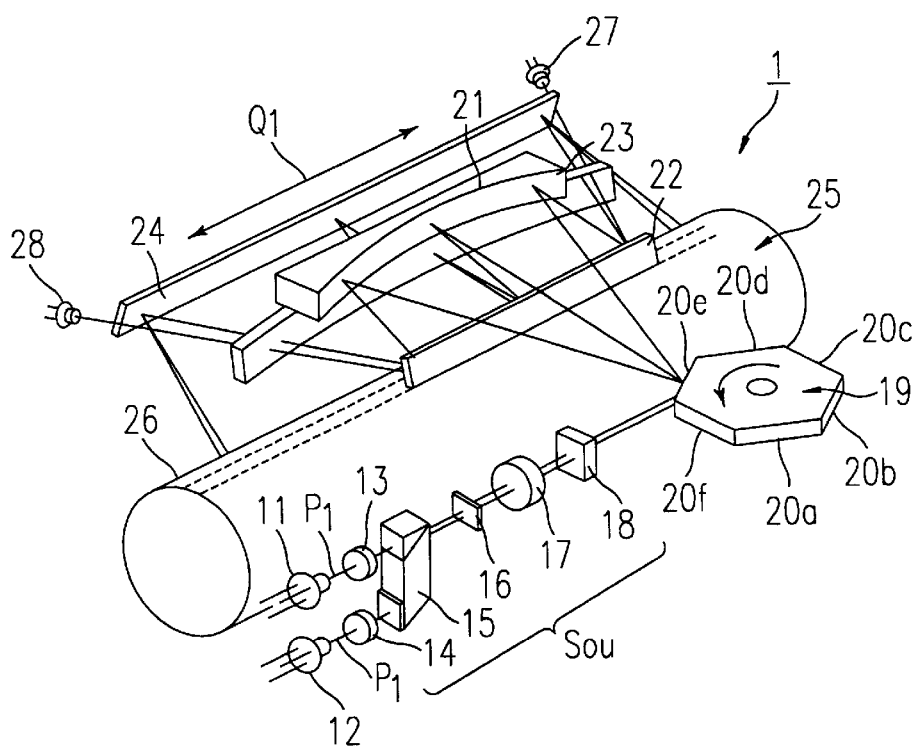
FIG. 4 is a perspective view showing the interior constitution of a write unit according to the present invention.

FIG. 4 shows a perspective view of an example of the positional relation between a write unit with a light beam source (laser light source) and a photosensitive drum. The light beam source is an object of evaluation which is evaluated by a light beam characteristic evaluation method according to the present invention. The photosensitive drum is a latent image carrier to which a beam of light emitted from the write unit is written.

In FIG. 4, reference numerals 11 and 12 denote laser diodes (semiconductor lasers), 13 and 14 denote collimator lenses. Reference numeral 15 denotes an optical member for synthesizing optical paths, 16 a quarter-wave plate, and 17 and 18 beam shaping systems. These optical elements 11 through 18 constitute a laser light source section (light beam source) Sou. Two light beams P1 emitted from the laser light source section Sou are collimated by the collimator lenses 13 and 14 and are guided to a polygon mirror 19 constituting part of an optical scanning system. The light beams P1 are reflected and deflected in a horizontal scanning direction (i.e., main scanning direction) Q1 by the surfaces 20a to 20f of the polygon mirror 19.

The reflected and deflected light beams are guided to reflecting mirrors 21 and 22 constituting part of an optical fθ system 23. The light beams reflected and deflected by the reflecting mirror 22 are passed through the optical fθ system 23 and are guided to an inclined reflecting mirror 24. The inclined reflecting mirror 24 guides the light beams to the surface 26 of a photosensitive drum 25 serving as a latent image carrier 25. The surface 26 of the photosensitive drum 25 is scanned linearly in the horizontal scanning direction Q1 by the light beams P1. This surface 26 is a surface which is scanned by the light beams P1, and writing is performed on this surface.

The laser light source section Sou, polygon mirror 19, reflecting mirrors 21 and 22, fθ lens 23, and reflecting mirror 24 are mounted in the write unit 1. The photosensitive drum 25 is mounted in an image forming unit (described later).

Synchronous sensors 27 and 28 are provided on the longitudinal opposite sides of the reflecting mirror 24 (in the horizontal scanning direction Q1 of the light beam) in the write unit 1. The first synchronous sensor 27 is employed to determine writing start timing, while the second synchronous sensor 28 is employed to determine writing end timing.

The characteristics of the light beams P1 emitted from this write unit 1 are an object of evaluation. In FIG. 4, although writing to the surface 26 of the photosensitive drum 25 is performed with two scanning lines, the case of a single laser diode and the case of two laser diodes are essentially the same in the evaluation principle of the characteristics of the light beam. Therefore, for the case of a single laser diode, the light beam characteristic evaluation items according to the present invention will be described in reference to Table 1.

TABLE 1

| Number of CCD cameras | Characteristic evaluation items | | Remarks |
|---|---|---|---|
| | Case of 1 beam | Case of 2 beams | |
| 1 | a) Writing position in a horizontal scanning direction | Writing position in a horizontal scanning direction | |
| | b) Writing position in a vertical scanning direction | Writing position in a vertical scanning direction | |
| | c) Pitch fluctuation in a horizontal scanning direction | Pitch fluctuation in a horizontal scanning direction | Positional offset in a horizontal scanning direction at each surface of a polygon mirror |
| | d) Surface tilt in a vertical scanning direction | Surface tilt in a vertical scanning direction | Positional offset in a vertical scanning direction at each surface of a polygon mirror |
| | e) Beam diameter in a horizontal scanning direction | Beam diameter in a horizontal scanning direction | |
| | f) Beam diameter in a vertical scanning direction | Beam diameter in a vertical scanning direction | |
| | m) | Beam-to-beam pitch | Beam-to-beam distance in a vertical scanning direction between a plurality of beams |
| 2 | g) Magnification error | Magnification error | Horizontal scanning component |
| | h) Scanning line tilt | Scanning line tilt | Vertical scanning component |
| | k) Scanning period | Scanning period | |
| | l) Depth | Depth | |
| 3 or more | i) Magnification error deviation | Magnification error deviation | Horizontal scanning component |
| | j) Scanning line curvature | Scanning line curvature | Vertical scanning component |

As shown in Table 1, the light beam characteristic evaluation items include a) writing position in the horizontal scanning direction (i.e., main scanning direction), b) writing position in the vertical scanning direction (i.e., sub-scanning direction), c) pitch fluctuation in the horizontal scanning direction, d) surface tilt in the vertical scanning direction, e) beam diameter in the horizontal scanning direction, f) beam diameter in the vertical scanning direction, g) magnification error, h) scanning line tilt, i) magnification error deviation, j) scanning line curvature, k) scanning period, l) depth, and m) beam-to-beam pitch. (A write unit which can emit a plurality of light beams at the same time is described in U.S. Pat. No. 96,675,722. In the embodiment of the present invention, since two laser diodes (LDs) 11 and 12 are arranged in the vertical scanning direction, a beam-to-beam pitch is in the vertical scanning direction.)

The evaluation items will hereinafter be described in detail.

a) Evaluation of a writing position in the horizontal scanning direction:

A light beam emitted from the LD is reflected by the polygon mirror 19. The reflected light beam is incident on the photosensitive body through the optical fθ lens system. The position at which writing is performed on this photosensitive body is evaluated in the horizontal direction, or the timing is evaluated.

For instance, as shown in FIG. 19(a), assume that a predetermined writing position center (write timing) is "O" and also a position written to an area-type imaging element (described later) is "zz." In this case, the offset quantity between the writing position center O and the writing position zz is Δx in the horizontal direction. This offset quantity Δx is evaluated.

b) Evaluation of a writing position in the vertical scanning direction:

A light beam emitted from the LD is reflected by the polygon mirror 19. The reflected light beam is incident on the photosensitive body through the fθ lens optical system. The position at which writing is performed on this photosensitive body is evaluated in the vertical direction, or the timing is evaluated.

For instance, as shown in FIG. 19(b), assume that a predetermined writing position center (write timing) is "O" and also a position written to an area-type imaging element (described later) is "zz." In this case, the offset quantity between the writing position center O and the writing position zz is Δy in the vertical direction. This offset quantity Δy is evaluated.

c) Evaluation of pitch fluctuation in the horizontal scanning direction:

By writing a light beam many times along the horizontal scanning direction, a desired image is formed. The polygon mirror 19 is formed with six mirrors, and writing is performed by reflecting a light beam with the six mirrors. For this reason, there are cases where a position at which a light beam is written changes depending upon an accuracy in each mirror.

Therefore, by reflecting a light beam at the surfaces of the polygon mirror 19, fluctuations in the center positions in the horizontal scanning direction of beam spots S corresponding to the surfaces are evaluated.

For example, in the case of six mirrors (six surfaces 20a to 20f), a light beam is reflected by each of the surfaces 20a to 20f of the polygon mirror 19 and is fetched in a CCD camera (described later). Assume that the positions of the beam light written to the area-type imaging element of the CCD camera were the ones shown in FIG. 19(c).

Also, assume that with respect to a reference center position O, the center positions of the beam light reflected by the surfaces 20a to 20f were kz1, kz2, kz3, kz3, kz4, kz5, and kz6 and that the offset quantities in the horizontal scanning direction were Δx1, Δx2, and Δx3.

In this case, if an average value Δx of the fluctuations in the horizontal scanning direction of the surfaces, Δx= (2Δx1+2Δx2+2Δx3)/6.

With this, it can be evaluated how a pitch varies depending upon an accuracy in each surface of the polygon mirror 19.

In this example, although the reference center position O is employed to evaluate fluctuations in the center positions, fluctuations in pitches in the horizontal scanning direction may be evaluated by employing any of the center positions of the beam spots reflected by the surfaces of the polygon mirror 19 as a reference position.

For instance, the center position of the first fetched beam spot S may be employed as reference. By computing a center position between beam spots S, the center position of the beam spot S with the minimum error may be employed as a reference position. Also, the beam spot S with the highest coincidence rate may be employed as reference.

d) Evaluation of surface tilt in the vertical scanning direction:

By writing a light beam many times along the horizontal scanning direction, a desired image is formed. The polygon mirror 19 is formed with six mirrors, and writing is performed by reflecting a light beam with the six mirrors. For this reason, there are cases where a position at which a light beam is written changes depending upon an accuracy in each mirror.

Therefore, by reflecting a light beam at the surfaces of the polygon mirror 19, fluctuations in the center positions in the horizontal scanning direction of beam spots S corresponding to the surfaces are evaluated.

For example, in the case of six mirrors (surfaces 20a to 20f), a light beam is reflected by each of the surfaces 20a to 20f of the polygon mirror 19 and is fetched in a CCD camera (described later). Assume that the positions of the beam light written to the area-type imaging element of the CCD camera were the ones shown in FIG. 19(d).

Also, assume that with respect to a reference center position O, the center positions of the beam light reflected by the surfaces 20a to 20f were kz1, kz2, kz3, kz3, kz4, kz5, and kz6 and that the offset quantities in the vertical scanning direction were Δy1, Δy2, and Δy3.

In this case, if an average value Δy of the fluctuations in the vertical scanning direction of the surfaces, Δy=(2Δy1+ 2Δy2+2Δy3)/6.

With this, it can be evaluated how a pitch varies depending upon an accuracy in each surface of the polygon mirror 19.

In this example, although the reference center position O is employed to evaluate fluctuations in the center positions, surface tilt in the vertical scanning direction may be evaluated by employing any of the center positions of the beam spots reflected by the surfaces of the polygon mirror 19 as a reference position.

For instance, the center position of the first fetched beam spot S may be employed as reference. By computing a center position between beam spots S, the center position of the beam spot S with the minimum error may be employed as a reference position. Also, the beam spot S with the highest coincidence rate may be employed as reference.

e) Evaluation of a beam diameter in the horizontal scanning direction:

The beam diameter of the light beam spot S in the horizontal scanning direction is evaluated.

f) Evaluation of a beam diameter in the vertical scanning direction:

The beam diameter of the light beam spot S in the vertical scanning direction is evaluated.

g) Evaluation of a magnification error:

Whether or not the space between two beam spots S has a predetermined space is evaluated. That is, magnification is evaluated by whether the space is shorter or longer than a predetermined space.

For example, as shown in FIG. 19(e), if a ratio between the distance L4 and the distance L5 is computed, the magnification error can be evaluated. The distance L4 represents a distance between previously designed writing reference positions Z1 and Z2 on transfer paper corresponding to two points on a manuscript in the horizontal scanning direction Q1, while the distance L5 represents a distance between the writing positions Z1' and Z2' on a scanned surface actually obtained by measurement.

h) Evaluation of scanning line tilt:

If a light beam is emitted in the horizontal scanning direction, a single scanning line will be obtained. Whether or not this scanning line is parallel to the horizontal scanning line is evaluated.

For example, as shown in FIG. 19(f), by a difference between the offset quantity do and the offset quantity dl and the distance L6, the inclined angle θ of the scanning line and the total offset quantity Δd are evaluated. The offset quantity d0 represents the offset quantity in the vertical scanning direction Q3 of the writing position Z1' obtained by measurement performed on the horizontal scanning start side, while the offset quantity d1 represents the offset quantity in the vertical scanning direction Q3 of the writing position Z2' obtained by measurement performed on the horizontal scanning end side.

i) Evaluation of magnification error deviation:

In the aforementioned item g), a magnification error is evaluated by evaluating the writing positions of two beam spots S. But in the evaluation of magnification error deviation, three or more beam spots are fetched into area-type imaging elements and the magnification between spots are compared, whereby deviation between spaces is evaluated.

For example, as shown in FIG. 19(g), if the distance L7 and the distance L8 are computed, magnification error deviation (right-left balance) can be evaluated. The distance L7 is a distance between the middle writing position Zm' and the horizontal scanning start side writing position Z1' obtained by measurement, while the distance L8 is a distance between the middle writing position Zm' and the horizontal scanning end side writing position Z2' obtained by measurement.

j) Evaluation of scanning line curvature:

In the aforementioned item h), whether or not a light beam has been emitted in parallel to the horizontal scanning direction is evaluated by the positions at which two beam spots S are written. But the evaluation of scanning line curvature is performed, by fetching 3 or more beam spots S into area-type imaging elements and evaluating the inclination between beam spots in the horizontal scanning direction.

For example, as shown in FIG. 19(h), if the offset quantity d2 in the vertical scanning direction Q3 of the writing position Z1 on the writing start side obtained by measurement, the offset quantity d4 in the vertical scanning direction Q3 of the middle writing position Zm' obtained by measurement, and the offset quantity d3 in the vertical scanning direction. Q3 of the writing position Z2' on the writing end side obtained by measurement are computed, scanning line curvature can be evaluated.

k) Evaluation of a scanning period:

The scanning period by a light beam can be computed by counting the period between the time that a beam spot is fetched in one of two CCD cameras and the time that the beam spot is fetched in the other. In addition, a scanning speed can be computed by dividing the distance between the two CCD cameras with the scanning period.

Note that one of the two CCD cameras may be replaced with synchronous sensors (scanning start detection and scanning end detection sensors) provided in the write unit 1 for synchronous detection. The details will be described later.

l) Evaluation of a depth:

By moving the CCD camera in a direction perpendicular to the horizontal scanning direction (i.e., in the same direction as the optical axis of a light beam emitted to the CCD camera) with a light beam locked in the horizontal scanning direction, the beam diameter in the traveling direction of the light beam is measured, whereby a depth at a designed position is evaluated.

For example, if the CCD camera is moved in sequence at regular intervals in the traveling direction of a light beam and stopped and if the diameter D of the beam spot S is computed in sequence at the stopped positions, a beam diameter curve (depth curve) can be obtained as shown in FIG. 19(*i*). Reference character Bw denotes a beam waist. In this manner, a light beam depth can be evaluated.

m) Evaluation of a beam-to-beam pitch:

The pitches between a plurality of light beams emitted at the same time are evaluated.

For example, as shown in FIG. 19(*i*), if the center positions KK and KK' of two beam spots S received by a single area-type imaging element are computed and the space ΔKK in the vertical scanning direction, a pitch space ΔKK between two light beams can be evaluated.

Figure 5:
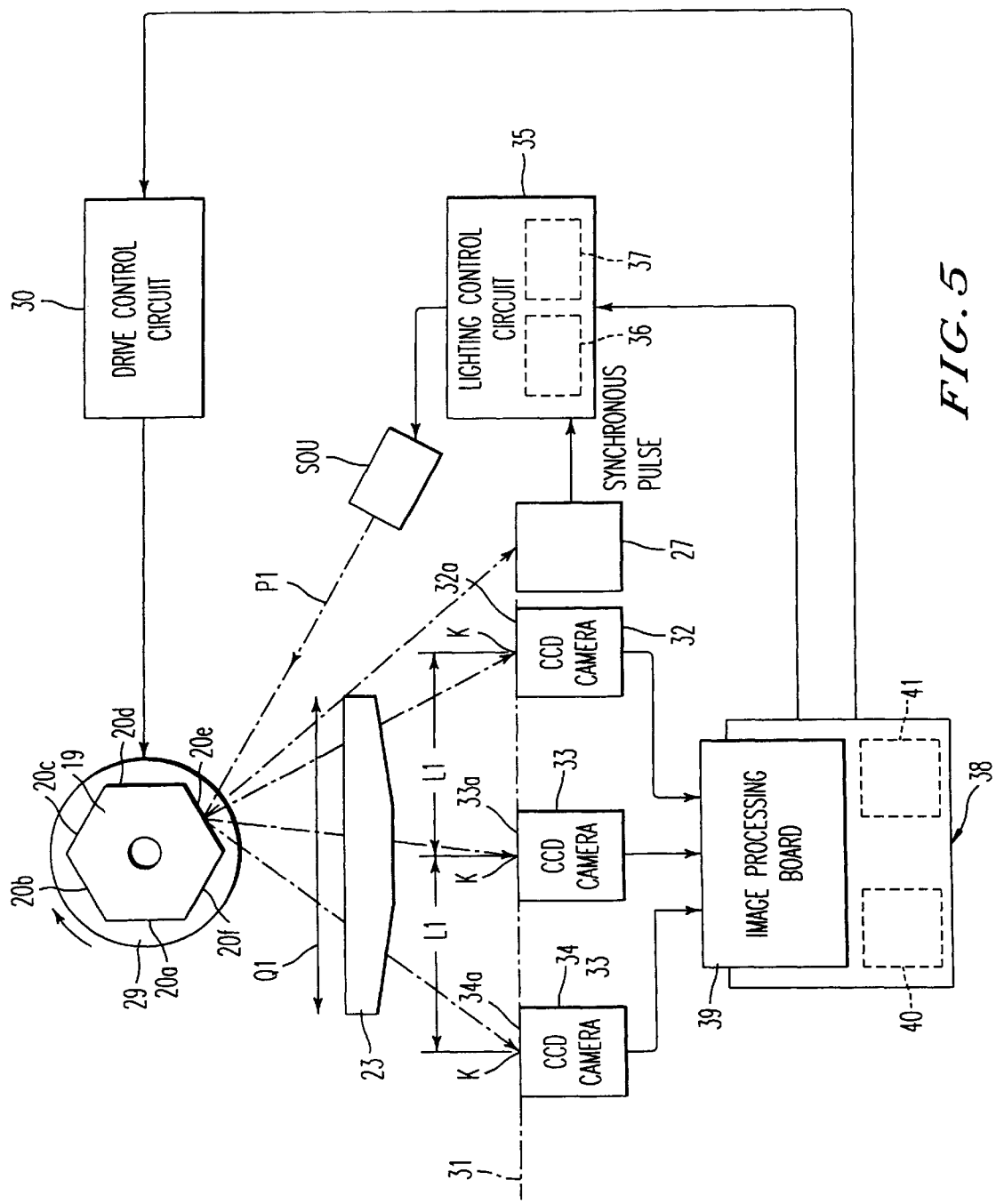
FIG. 5 is a diagram for explaining the principles of a light beam characteristic evaluation apparatus according to a first embodiment of the present invention, three CCD cameras being spaced in a horizontal scanning direction.

The light beam characteristic evaluation apparatus shown in FIG. 5 can evaluate all evaluation items a to k and m except for the evaluation item i): evaluation of a depth.

(First embodiment of evaluation apparatus)

An embodiment of an evaluation apparatus will be described with reference to FIG. 5.

In FIG. 5, reference numeral 29 denotes a pulse motor for driving the polygon mirror and reference numeral 30 denotes a drive control circuit for controlling drive of the pulse motor. On a surface 31 equivalent to the surface 26 of the photosensitive drum 25, the area-type imaging elements (imaging surfaces) 32*a* to 34*a* of CCD cameras 32 to 34 as light beam detection means are provided at regular intervals from the scanning start side of the light beam P1 to the scanning end side.

In more detail, the CCD cameras 32 to 34 are disposed at a light irradiation start position (of the sheet maximum size), light irradiation completion position, and intermediate position of a light-irradiated member (i.e., latent image carrier) upon which a light beam is cast which has been emitted from a write unit provided in an image forming apparatus (e.g., a copying machine). In this way, a position to be used in practice can be evaluated.

The laser diode 11 or 12 is lit and controlled by a 1-dot lighting control circuit 35. The 1-dot lighting control circuit 35 is equipped with a clock pulse generator 36 for generating a clock pulse for clocking and a count circuit 37 for counting a clock pulse. The synchronous pulse of the synchronous sensor 27 is input to the 1-dot lighting control circuit 35.

The 1-dot lighting control circuit 35 and the drive control circuit 30 are controlled by a control circuit 38 consisting of a personal computer (PC). The control circuit 38 is provided with an image processing input board 39. In this embodiment, the input board 39 employs an image processing board with a three-input system, for example, an input system for red (R), green (G), and blue (B).

The first area-type imaging element 32*a* is provided on a horizontal scanning start side. The third area-type imaging element 34*a* is provided on a horizontal scanning end side. The second area-type imaging element 33*a* is provided at a horizontal scanning center position between the first and second area-type imaging elements 32*a* and 34*a*. The image outputs of the area-type imaging elements 32*a* to 34*a* are fetched in the control circuit 38 through the input board 39. The control circuit 38 has a computation circuit (computation means) 40 and an evaluation processing circuit 41.

Figure 6:
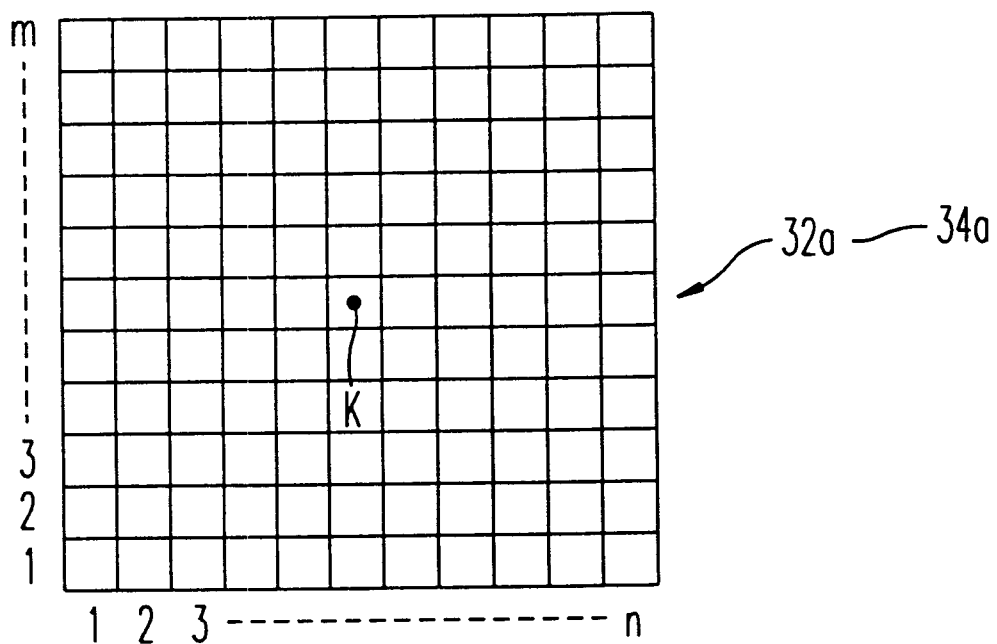
FIG. 6 is a conceptual diagram showing the area-type imaging element of the CCD camera shown in FIG. 5.
Figure 7:
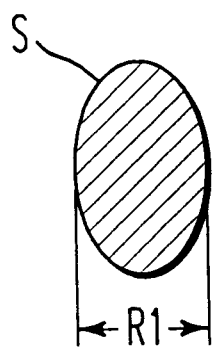
FIG. 7 is a diagram for explaining a previously set theoretical ideal image (beam spot) which should be described on a scanned surface by the write unit shown in FIG. 4.

As shown in FIG. 6, a reference pixel K is set as a coordinate origin for an arithmetic process from among the pixels of each of the area-type imaging elements 32*a* to 34*a*. This reference pixel K is equivalent to a previously designed writing reference position. The setting of this reference pixel K will be described later. For now, assume that the distance between the reference pixels K of adjacent area-type imaging elements 32*a* and 33*a* (33*a* and 34*a*) is set to L1. Also, assume that a previously designed ideal image (beam spot S) which should be described on a surface to be scanned is the one shown in FIG. 7. Reference character R1 denotes the diameter of the ideal beam spot S.

Figure 8:
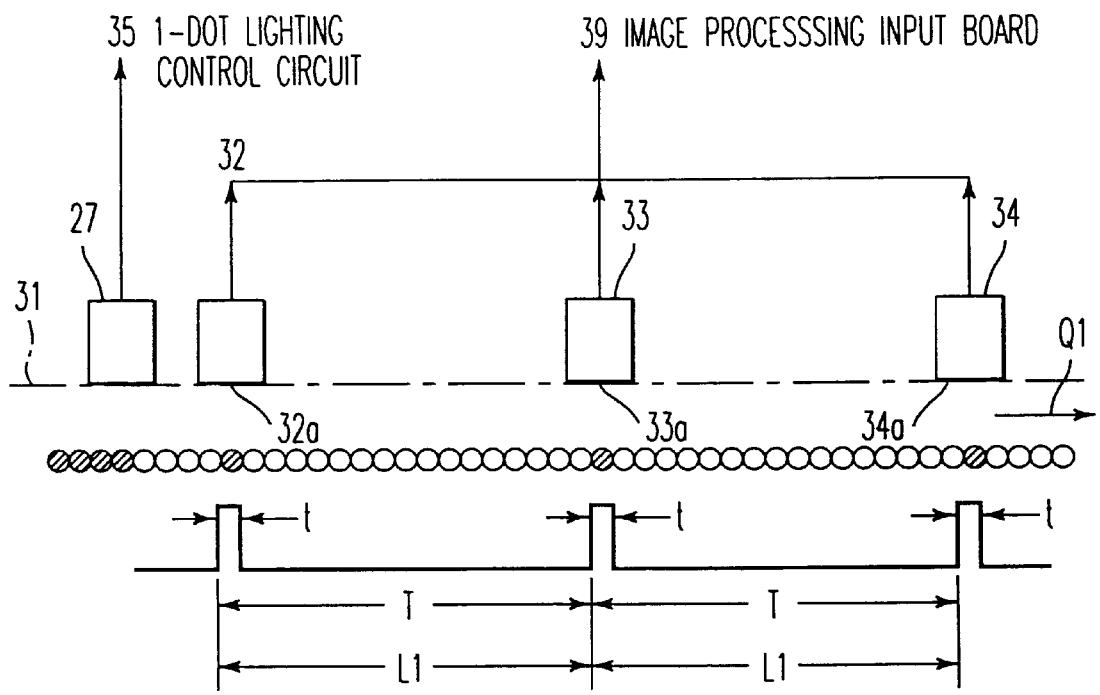
FIG. 8 is an explanatory diagram for explaining the 1-dot control timing of the light beam shown in FIG. 5.

The control circuit 38 has been calibrated so that the reference pixel K is at the position of a coordinate origin. As shown in FIG. 8, the computation circuit 40 compute a scanning period T between the area-type imaging elements from the distance L and a previously designed scanning speed and also computes a scanning period t equivalent to 1 dot from the diameter R of the previously designed beam spot S measured in the scanning direction and the scanning period T. A signal representative of the scanning period T and the 1-dot scanning period t is input to the count circuit 37 of the control circuit 35.

The scanning period T and the 1-dot scanning period t are determined by the number of clock pulses output from the clock generator 36. If the count circuit 37 counts the number of clocks equivalent to the scanning period T since the time the laser diode 11 or 12 was put out, the 1-dot lighting control circuit 35 will light the laser diode 11 or 12 being in a light-off state. Also, if the count circuit 37 counts the number of clocks equivalent to the 1-dot scanning period t since the time the laser diode 11 or 12 was lit, the 1-dot lighting control circuit 35 will put out the laser diode 11 or 12 being in a light-on state. In this sense, the scanning period T prescribes the light-off period of the laser diode 11 or 12, i.e., a write timing period.

The laser diode 11 or 12 is controlled so as to light continuously by the 1-dot control circuit 35 until a synchronous clock pulse from the synchronous sensor 27 is input. If the synchronous clock pulse from the synchronous sensor 27 is input, the laser diode 11 or 12 will be put out once by the 1-dot lighting control circuit 35. If the scanning period T elapses, the laser diode 11 or 12 will be lit only for the 1-dot scanning period t by the 1-dot lighting control circuit 35 and again it will be put out until the scanning period T elapses. If the scanning period T elapses, the laser diode 11 or 12 will be lit again for only the 1-dot scanning period t and then it will be put out. And if the synchronous clock pulse of the second synchronous sensor 28 is input, the 1-dot lighting control circuit 35 will again light the laser diode 11 or 12 after a return period (about 2T) to the scanning start side has elapsed.

In FIG. 8, the circular black mark represents the formation state of the beam spot S (light-on state of the laser diode 11 or 12) equivalent to 1 dot, while the circular white mark represents the non-formation state of the beam spot S (light-off state of the laser diode 11 or 12) equivalent to 1 dot.

Figure 9:
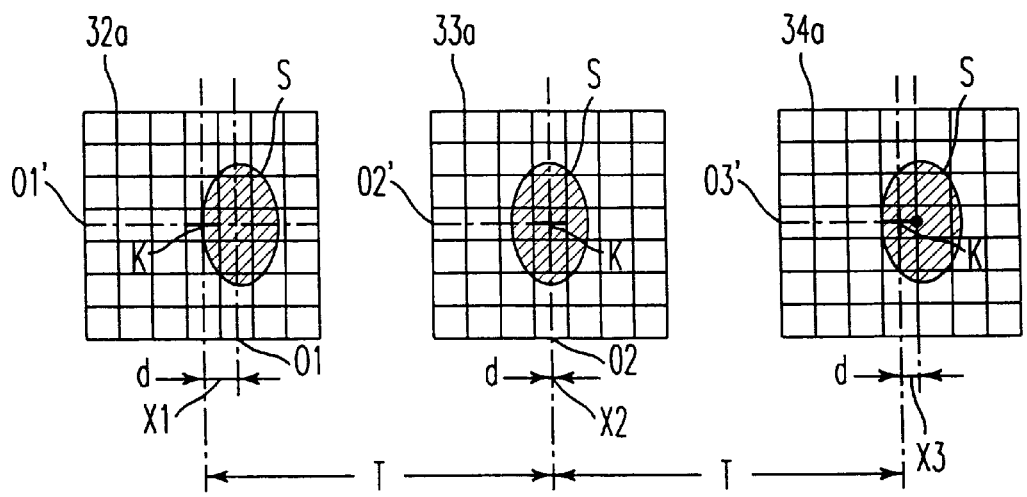
FIG. 9 is a diagram showing beam spots formed on the area-type imaging elements of the CCD cameras shown in FIG. 5.

Thus, if the laser-diode 11 or 12 is lit during a scanning period equivalent to 1 dot during scanning by the 1-dot lighting control circuit 35, as shown in FIG. 9, beam spots S will be formed on the area-type imaging elements 32a to 34a.

If the center positions O1, O2, and O3 of the beam spots S in the horizontal scanning direction Q1 are computed with the evaluation processing circuit 41, the offset quantities din the horizontal direction Q1 with respect to the reference pixels K can be computed. By way of example, FIG. 9 shows that the center position O1 on the writing start side (image sensor 32a) is offset to the right by X1, the center position O3 on the writing end side (image sensor 34a) is offset to the right by X3, and that the offset quantity of the center position O2 at the center position (imaging device 33a) is d=X2=0.

If the center positions O1', O2', and O3' of the beam spots S in the vertical scanning direction Q3 are computed with the evaluation processing circuit 41, the offset quantities d' in the vertical direction Q3 with respect to the reference pixels K can be computed. In FIG. 9 the offset quantities d' in the vertical scanning direction are d'=0.

In FIG. 8, while it has been described that the distance L1 between the first area-type imaging element 32a on the horizontal scanning start side and the second area-type imaging element 33a at the center position is equal to the distance L1 between the third area-type imaging element 34a on the horizontal scanning end side and the second area-type imaging element 33a at the center position, the present invention is not to be limited to this arrangement.

(Second embodiment of the evaluation apparatus)

Figure 10:
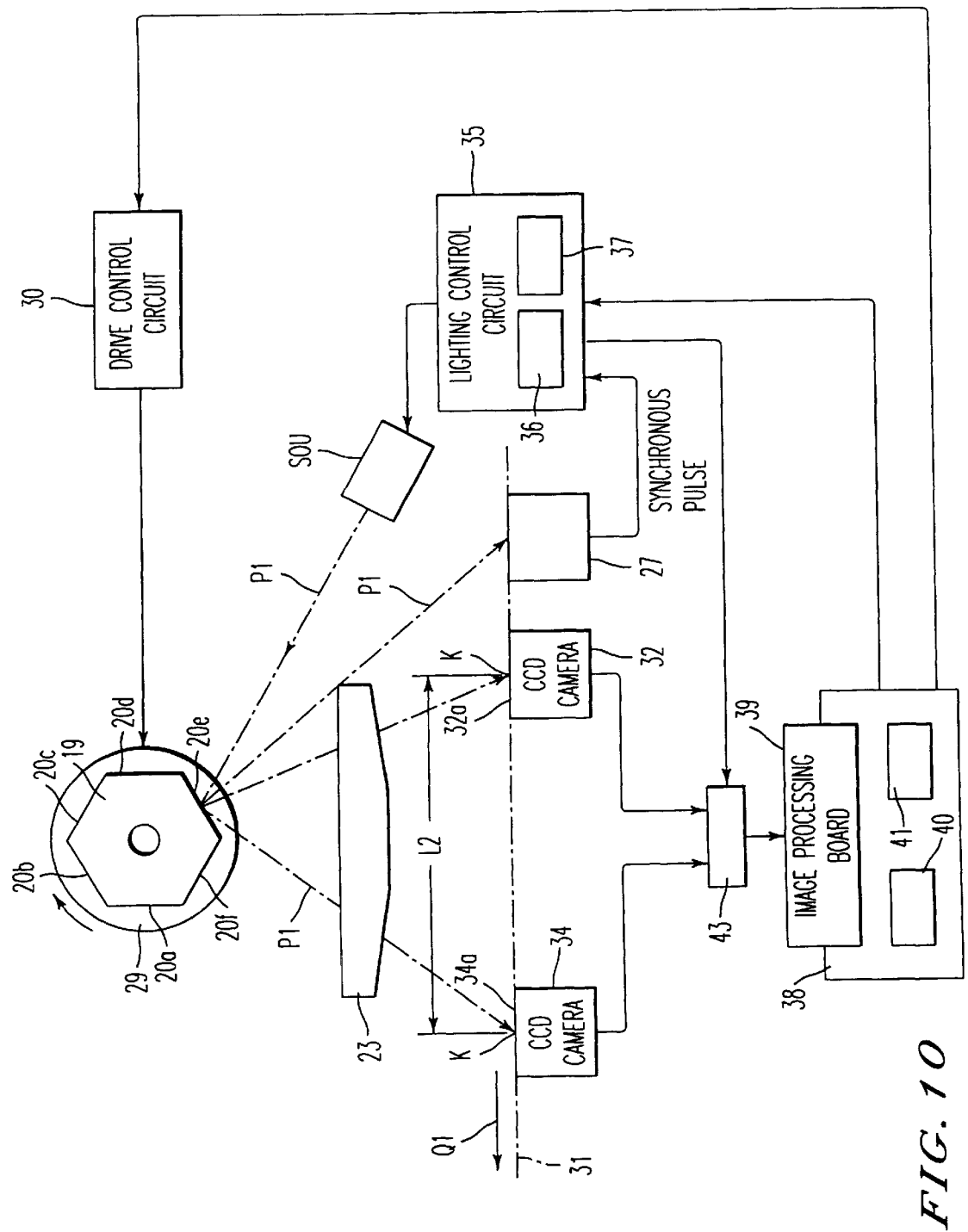
FIG. 10 is a diagram for explaining the evaluation apparatus according to a second embodiment of the present invention, two CCD cameras being spaced in the horizontal scanning direction.
Figure 11:
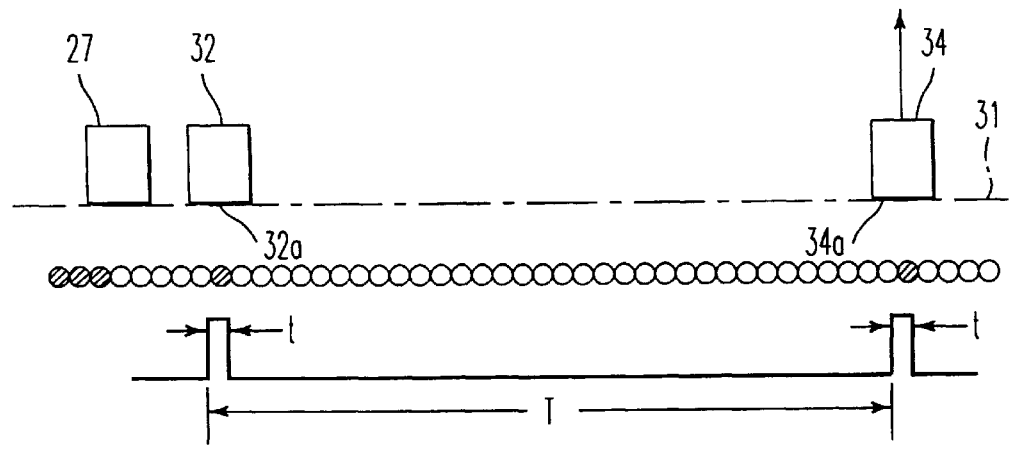
FIG. 11 is an explanatory diagram for explaining the 1-dot control timing of the light beam shown in FIG. 10.

FIG. 10 shows a second embodiment of this evaluation apparatus. This evaluation apparatus employs a single image processing board as the input board 39 and also evaluates offset quantities with respect to two previously designed writing reference positions. This evaluation apparatus is provided with an input board change-over switch 43. The 1-dot lighting control circuit 35 controls the input board change-over switch 43 so that an image is fetched from the third area-type imaging element 34a at the same time as the fetching of an image from the first area-type imaging element 32a. Because the remaining constitution is identical with the evaluation apparatus shown in FIG. 8, a detailed description thereof is not given by applying the same reference numerals. FIG. 11 shows the control timing by the 1-dot lighting control circuit 35, and the scanning period (light-off period) T is computed by dividing the distance L2 between the area-type imaging elements 32a and 34a with a previously designed scanning speed.

In this light beam characteristic evalutaion apparatus, since the two CCD camera are spaced in the horizontal scanning direction, evaulation items of Table 1 above a through h, k, and m are evaluable. As a matter of course, if three CCD cameras are disposed as in the embodiment shown in FIG. 5, evaluation items a through k, and m are evaluable.

(Third embodiment of the evaluation apparatus)

Figure 12:
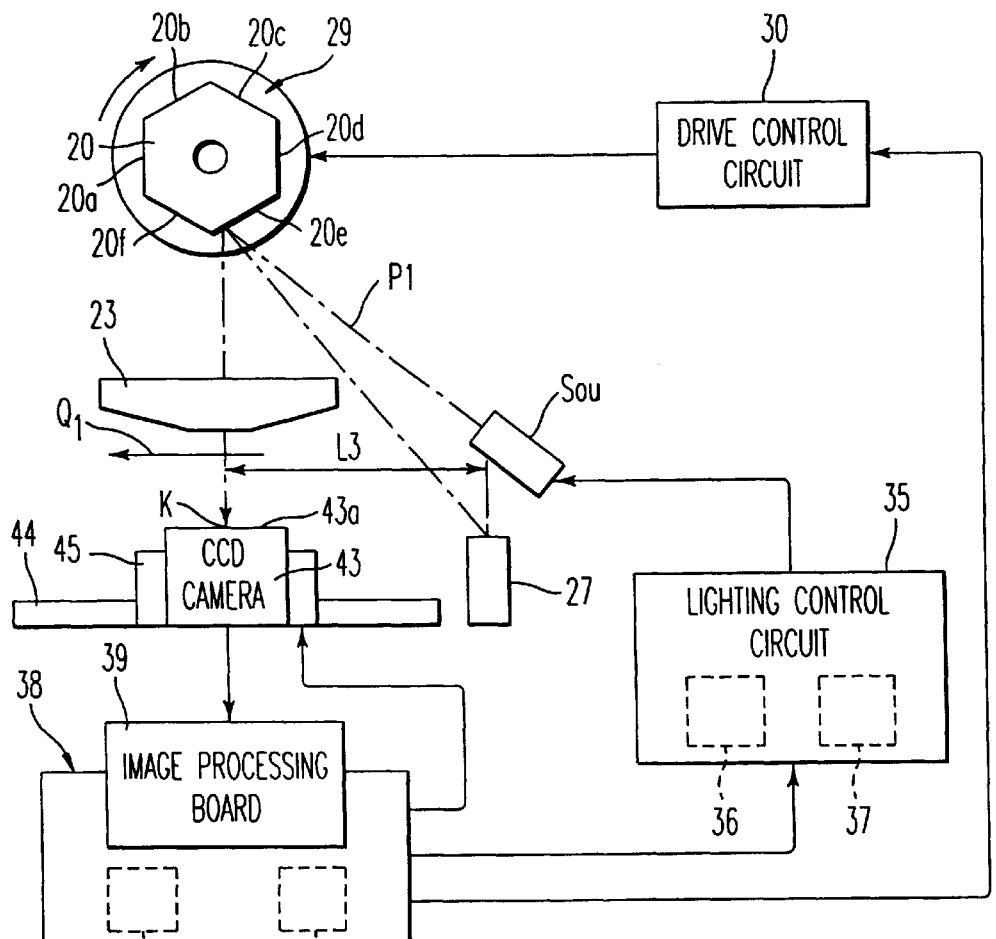
FIG. 12 is a diagram for explaining the evaluation apparatus according to a third embodiment of the present invention, a single CCD camera being provided at a center position in the horizontal scanning direction.

FIG. 12 shows a third embodiment of this evaluation apparatus. This evaluation apparatus employs a single image processing board as the input board 39 and also evaluates an offset quantity with respect to a single previously designed writing reference position.

This evaluation apparatus is provided with a single CCD camera 43. This CCD camera 43 is mounted on a movable body 45 installed on a guide shaft 44 extending lengthwise in the horizontal scanning direction. Since the movable body 45 is controlled so as to reciprocate along the guide shaft 44 by the control circuit 38, the CCD camera 43 can be set to a desired writing reference position.

In other words, when the CCD camera 43 is moved in the horizontal scanning direction, evaluation items a through f, k, and m can be evaluated at a desired position. Additionally, if a position of the CCD camera 43 is set at the same position as that of the evaluation apparatus shown in FIGS. 5 and 10, evaluation items a through k, and m can be evaluated in the same way.

If the distance from the synchronous sensor 27 to the CCD camera 43 is assumed to be L3 and if the distance L3 is divided by a previously designed writing speed, the scanning period T (see FIG. 13) required from the synchronous sensor 27 to the reference pixel K of the area-type imaging element 43a of the CCD camera 43 can be computed.

Figure 14:
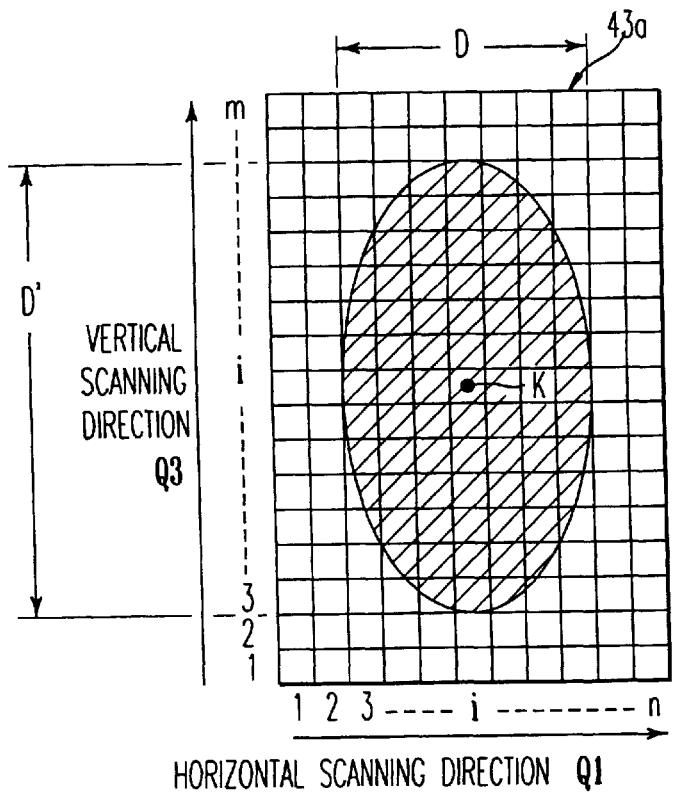
FIG. 14 is an explanatory diagram of the beam spot (laser spot) formed on the area-type imaging element of the CCD camera shown in FIG. 12.

Therefore, if the laser light source section Sou is put out during the period from the detection of the synchronous clock pulse by the synchronous sensor 27 to the scanning period T and if the laser light source section Sou is lit during the 1-dot scanning period t by the 1-dot lighting control circuit 35 at the same time as the elapse of the scanning period T, the laser spot S equivalent to 1 dot can be formed on the area-type imaging element 43a of the CCD camera 43a during scanning, as shown in FIG. 14.

The center position of the beam spot S of each evaluation apparatus mentioned above is obtained in the following way.

The pixels on the area-type imaging element 43a are defined by Zij. Z1j, Z2j, . . . , Zij, . . . , and Znj mean pixels arranged in the horizontal scanning direction Q1, while Zi1, Zi2, . . . , Zij, . . . , and Zim mean pixels arranged in the vertical scanning direction Q3. Reference character i (integer from 1 to n) means the i-th point as counted from the left, while reference character j (integer from 1 to m) means the j-th point as counted from the bottom.

Figure 15:
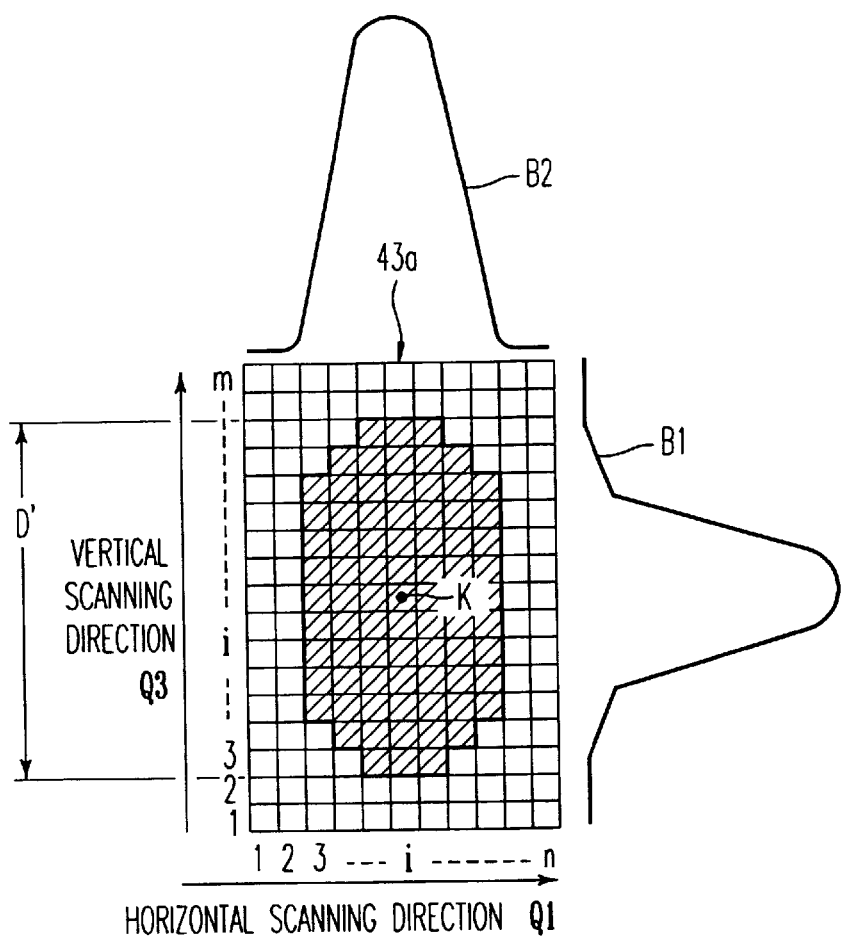
FIG. 15 is an explanatory diagram used to explain how a light beam intensity distribution curve is obtained based on the beam spot shown in FIG. 14.

Therefore, if the total sum Wj (Wj=Z1j+Z2j+Zij+Znj) of the signals output from the pixels Z1j, Z2j, . . . , Zij, . . . , and Znj in the horizontal scanning direction Q1 is computed in sequence from j=1 to j=m in the vertical scanning direction Q3, as shown in FIG. 15, the light beam intensity distribution curve B1 in the vertical scanning direction Q3 can be computed. Similarly, if the total sum Wi (Wi=Zi1+Zi2+Zij+Zim) of the signals output from the pixels Zi1, Zi2, . . . , Zij, . . . , and Zim in the vertical scanning direction Q3 is computed in sequence from j=1 to j=n in the horizontal scanning direction Q1, as shown in FIG. 15, the light beam intensity distribution curve B2 in the horizontal scanning direction Q1 can be computed.

Figure 16:
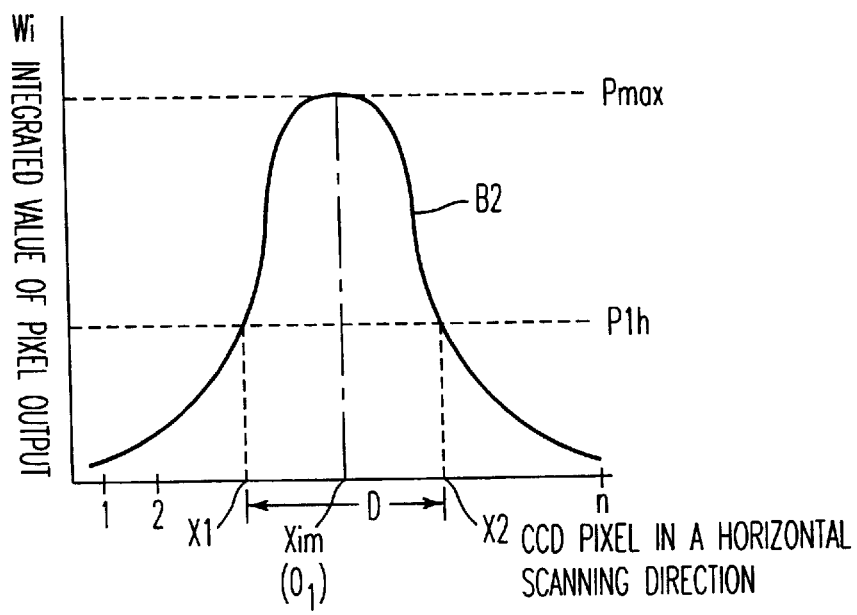
FIG. 16 is a light beam intensity distribution curve diagram used to explain how the center position of a light beam is computed based on the light beam intensity distribution curve shown in FIG. 15 by an evaluation processing circuit.

FIG. 16 is an example of the light beam intensity distribution curve computed in the aforementioned manner, the light beam intensity distribution curve B2 in the horizontal scanning direction Q1 being shown.

An evaluation processing circuit 41 sets a threshold value P1h to the light beam intensity distribution curve B2, also specifies the addresses X1 and X2 of pixels in the horizontal scanning direction Q1 which correspond to intensities traversing the threshold value P1h, and computes the address Xim of a pixel equivalent to the average value of the sum of the addresses Xl and X2. With this, the center position O1 of the light beam P1 in the horizontal scanning direction Q1 is computed. From the difference between this center position O1 and reference pixel K, the offset quantity of the center position O1 in the horizontal scanning direction Q1 is computed. By performing a similar process on the light beam intensity distribution curve B1, the center position O1' of the light beam P1 in the vertical scanning direction Q3 is computed and the offset quantity d' of the center position O1' in the vertical scanning direction Q3 is also computed from the difference between the center position O1' and reference pixel K.

Also, by computing the difference D between the addresses X1 and X2, the beam diameter D of the light beam P1 in the horizontal scanning direction Q1 is computed. The beam diameter D' in the vertical scanning direction Q3 is computed by performing a similar process on the light beam intensity distribution curve B1.

Note that the threshold value P1h used herein is set at a position of 1/e (natural logarithm)2 from the peak Pmax.

As previously described, the center positions O1 and O1' of the light beam P1 are computed based on the total sum of the output signals output from the pixels Z1j, Z2j, ..., Zij, ..., and Znj arranged in the horizontal scanning direction Q1 and the total sum of the output signals output from the pixels Zi1, Zi2, ..., Zij, ..., and Zim arranged in the vertical scanning direction Q3, respectively. However, the present invention is not limited to this method. For instance, by describing the light beam intensity distribution curves B1 and B2 from pixels near the peak Pmax and then computing the peaks of these beam intensity distribution curves B1 and B2 as the center of the light beam P1, the pixel corresponding to these peaks may be computed as the center pixel of the light beam P1.

In addition, the output of each pixel has been quantized. Therefore, by expressing a distribution of the quantized pixel outputs in a three-dimensional manner, pixels equivalent to the position of gravity may be used as the center positions O1 and O1' of the light beam P1 in the horizontal scanning direction Q1 and vertical scanning direction Q3.

Figure 13:
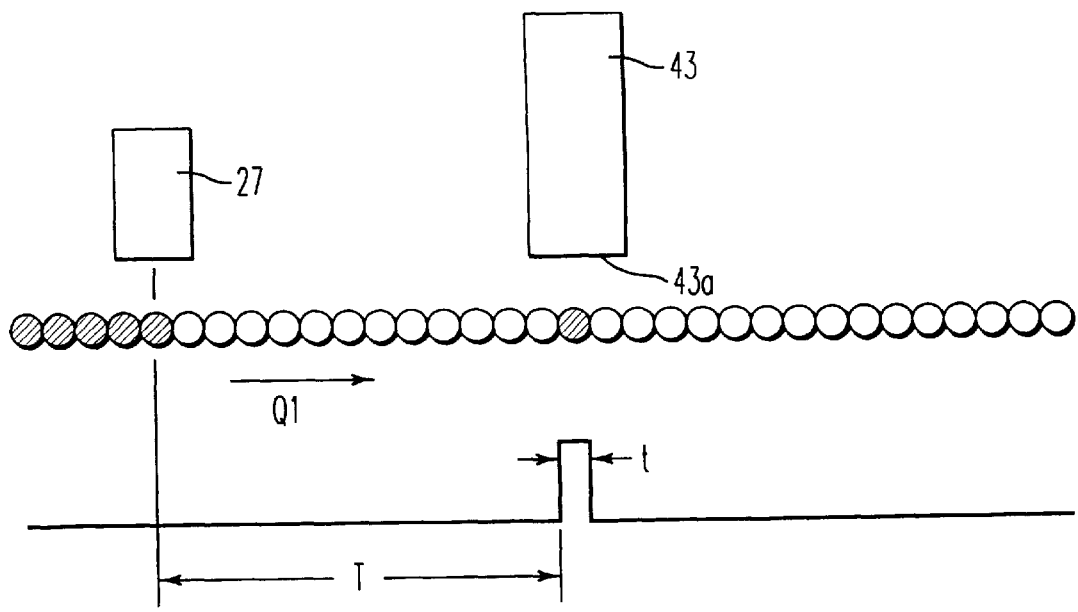
FIG. 13 is an explanatory diagram for explaining the 1-dot control timing of the light beam shown in FIG. 12.

Note that even if the CCD camera 43 were arranged at a previously designed reference writing position (i.e., at the position of image height O meaning the optical axis of the optical fθ system 23), an accurate beam shape cannot be obtained if the beam diameter is measured at a position slightly offset from the reference writing position. For this reason, the scanning period T shown in FIG. 13 is corrected based on the offset quantity d, whereby the laser light source section Sou can also be lit at the position of image height O.

(Fourth embodiment of the evaluation apparatus)

Figure 17:
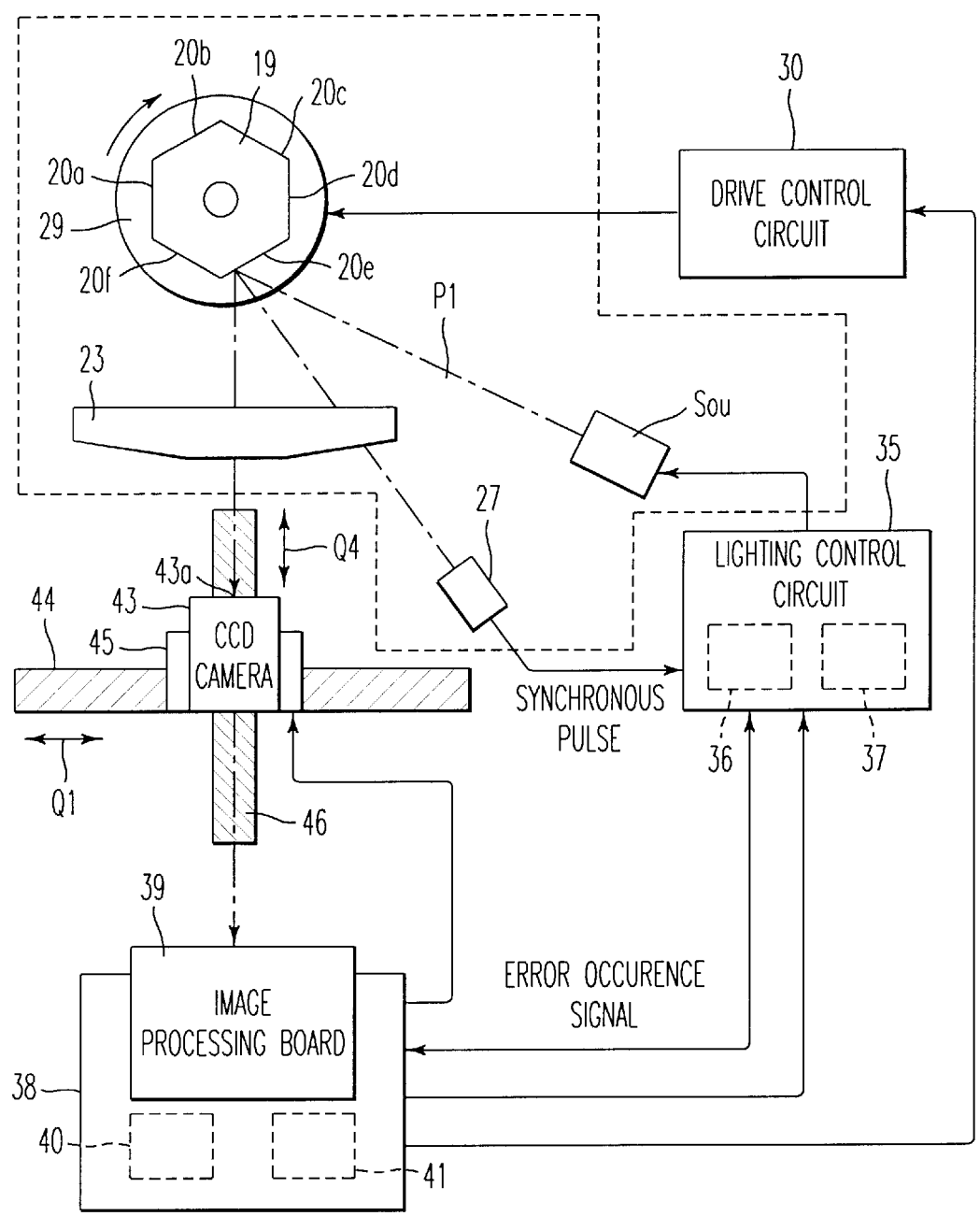
FIG. 17 is a diagram for explaining the evaluation apparatus according to a fourth embodiment of the present invention, a single CCD camera being constituted so that it is moved in both the horizontal scanning direction and the vertical scanning direction.

FIG. 17 shows a fourth embodiment of this evaluation apparatus. In this embodiment, there is provided a guide shaft 46 in a depth direction (i.e., optical-axis direction) Q4 crossing at a right angle with a horizontal scanning direction Q1. A movable body 45 is provided so that it can reciprocate along a guide shaft 44 in the horizontal scanning direction Q1 and along the guide shaft 46 in the depth direction Q4. According to this constitution, the characteristics of a light beam can be evaluated at a previously designed desired writing reference position by employing a single CCD camera 43.

In the fourth embodiment, evaluation items a through k, and m can be evaluated and, in addition, evaluation item i can be evaluated because the CCD camera 43 is moved in the depth direction. Note that a moving means for moving the CCD camera 43 in the depth direction can be provided in the evaluation apparatus shown in FIGS. 5, 10, and 12. If so, the depth of evaluation item i can be evaluated also by the use of the evaluation apparatus shown in FIGS. 5, 10, and 12.

A proceeding direction (i.e., depth direction) Q4 of a light beam is evaluated in the following way.

Figure 31A:
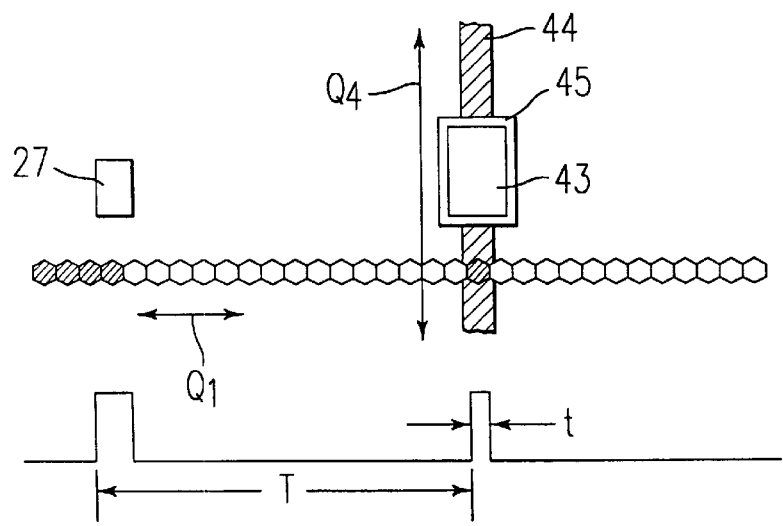
FIG. 31(a) is an explanatory diagram used in a light beam characteristic evaluation apparatus of a fourth embodiment of the present invention and is an explanatory diagram of the light beam characteristic evaluation apparatus which evaluates the depth curve of a light beam by moving a CCD camera in the horizontal scanning and vertical scanning directions.
Figure 31B:
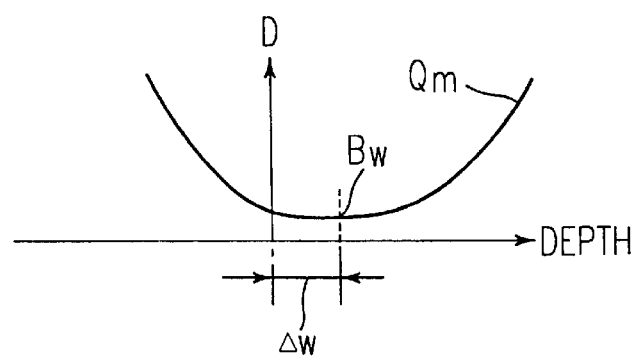
FIG. 31(b) is a diagram showing an example of the depth curve obtained by the beam characteristic evaluation apparatus shown in FIG. 31(a)

As shown in FIG. 31(a), the CCD camera 43 is attached to the movable body 45, and the movable body 45 is mounted on the guide shaft 44 extending in the depth direction Q4. The movable body 45 is moved in the depth direction Q4 of the light beam P1 successively at equal intervals, and the beam diameter D (see FIGS. 14 and 16) of the beam spot S of the light beam P1 is successively calculated at each stopping position. Thus, a beam diameter curve (depth curve) Qm with respect to the depth direction Q4 can be obtained as shown in FIG. 31(b).

In this embodiment, the beam diameter curve Qm is calculated with respect to the horizontal scanning direction Q1. However, a beam diameter curve with respect to the vertical scanning direction Q3 may be calculated.

The position of the beam waist Bw is evaluated from this beam diameter curve Qm, and a beam waist position correction quantity $\Delta W$ is determined from a previously designed desired writing reference position in the depth direction Q4 and the evaluated position of the beam waist Bw.

Figure 18:
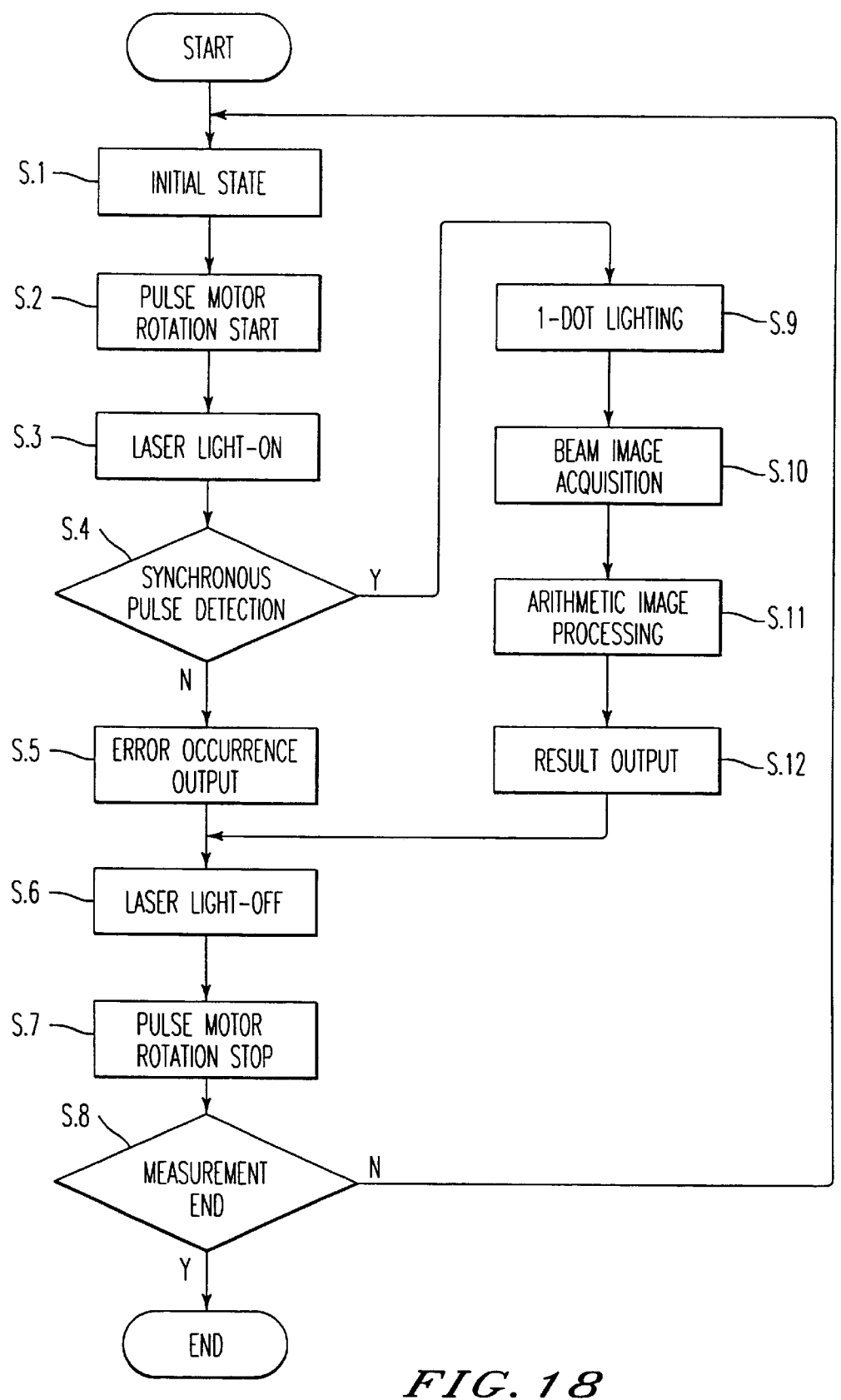
FIG. 18 is a flowchart showing an example of the process performed by the light beam characteristic evaluation apparatus shown in FIG. 17.

FIG. 18 shows how the evaluation apparatus shown in FIG. 17 is controlled. The control circuit is first set to its initial state (step 1) and then rotation of the pulse motor 29 is started (step 2). At the time of the elapse of the time period which means that the pulse motor 29 is assumed to have reached a steady revolution speed, the control circuit 38 outputs a signal toward the 1-dot lighting control circuit 35 so that the laser diode 11 or 12 (laser light source section Sou) is lit. On the other hand, the 1-dot lighting control circuit 35 detects whether or not a synchronous clock pulse has been input from the synchronous sensor 27 (step 4). When the synchronous clock pulse is not detected after elapse of a predetermined period, the 1-dot lighting control circuit 35 outputs an error occurrence signal toward the control circuit 38 (step 5). In response to the error occurrence signal, the control circuit 38 outputs a signal toward the 1-dot lighting control circuit 35 so that the laser diode 11 or 12 (laser light source section Sou) is put out (step 6). Based on the error occurrence signal, the control circuit 38 stops rotation of the pulse motor 29 (step 7) and then judges whether or not the measurement has ended (step 8).

In step 4, when the synchronous clock pulse is detected within a predetermined period, the 1-dot lighting control circuit 35 puts out the laser diode 11 or 12 (laser light source section Sou) at the same time as the synchronous clock pulse detection. At the time the count circuit 37 has counted the number of clock pulses based on the scanning period T, the 1-dot lighting control circuit 35 outputs a lighting signal which causes the laser diode 11 or 12 (laser light source section Sou) to light for a period of 1 dot (step 9). The control circuit 38 obtains the image of the beam spot S by this 1-dot lighting (step 10). The evaluation processing circuit 41 performs an arithmetic process on the basis of the image of the actually obtained beam spot S, thereby evaluating the characteristics required of the light beam P1 (step 11). And the evaluation processing circuit 41 outputs the result of evaluation to a monitor (not shown) or storage means (not shown) (step 12). Thereafter, the control circuit 38 outputs a signal toward the 1-dot lighting control circuit 35 to put out the laser diode 11 or 12 (laser light source section Sou) (step 6) and then stops drive of the pulse motor 29 (step 7). When measurements are repeated, steps 1 through 12 are carried out again.

The characteristic evaluation of the light beam is performed by processing the center positions O1 and O1', beam diameters D1 and D1', and offset quantities d and d' of the light beam P1.

By computing a ratio of beam diameters D1 and D1', it can be evaluated whether the shape of the light beam P1 is an ellipse long in the horizontal scanning direction Q1, or an ellipse near a circle, or an ellipse long in the vertical scanning direction Q3.

(Detailed structure of the evaluation apparatuses 1 to 4)

The following evaluation apparatus is presently being used as an embodiment.

Figure 35:
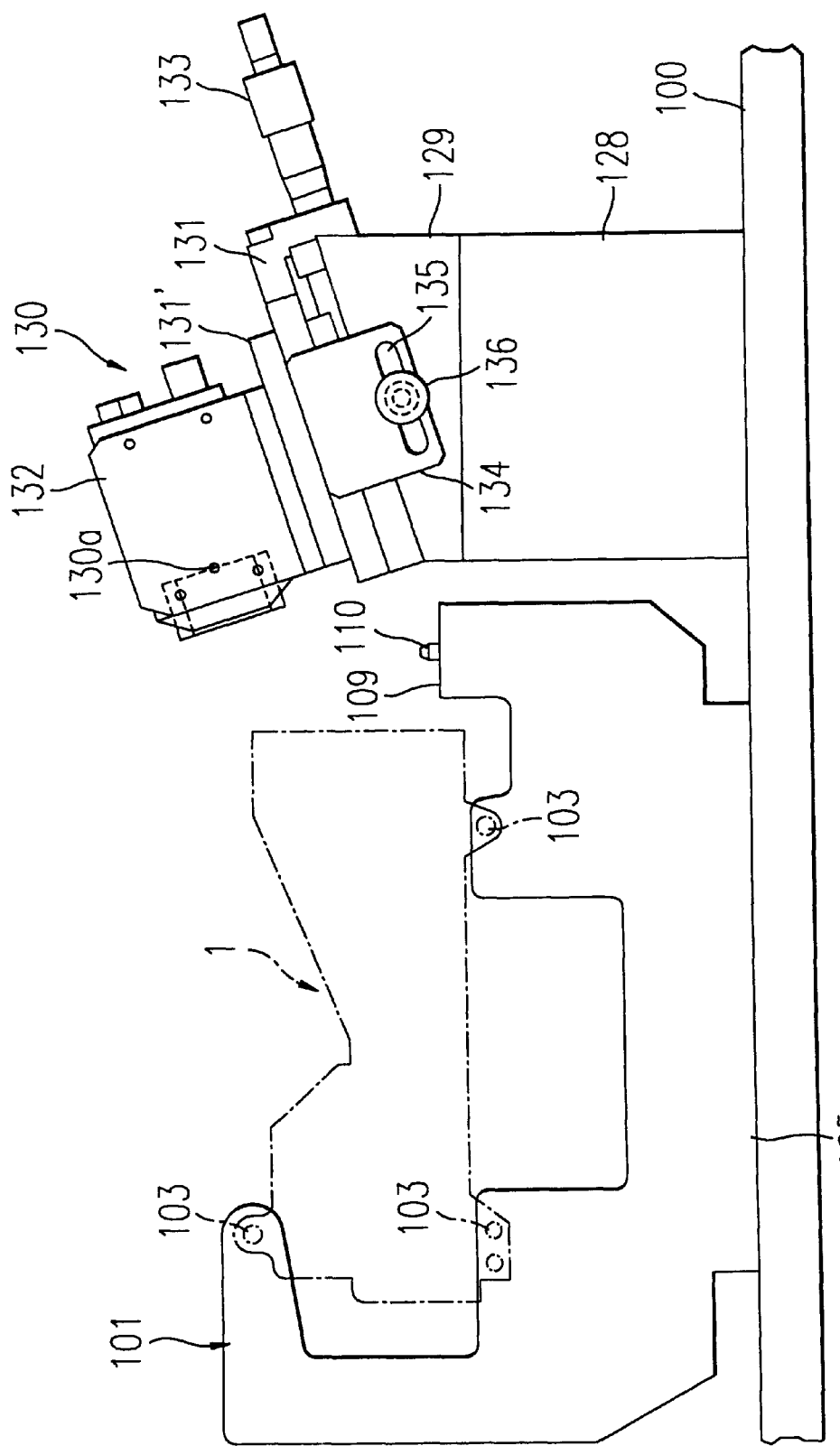
FIG. 35 shows a detailed structure of the evaluation apparatuses 1–4, and is a side view showing the mounted state of the write unit onto an image forming device.
Figure 36:
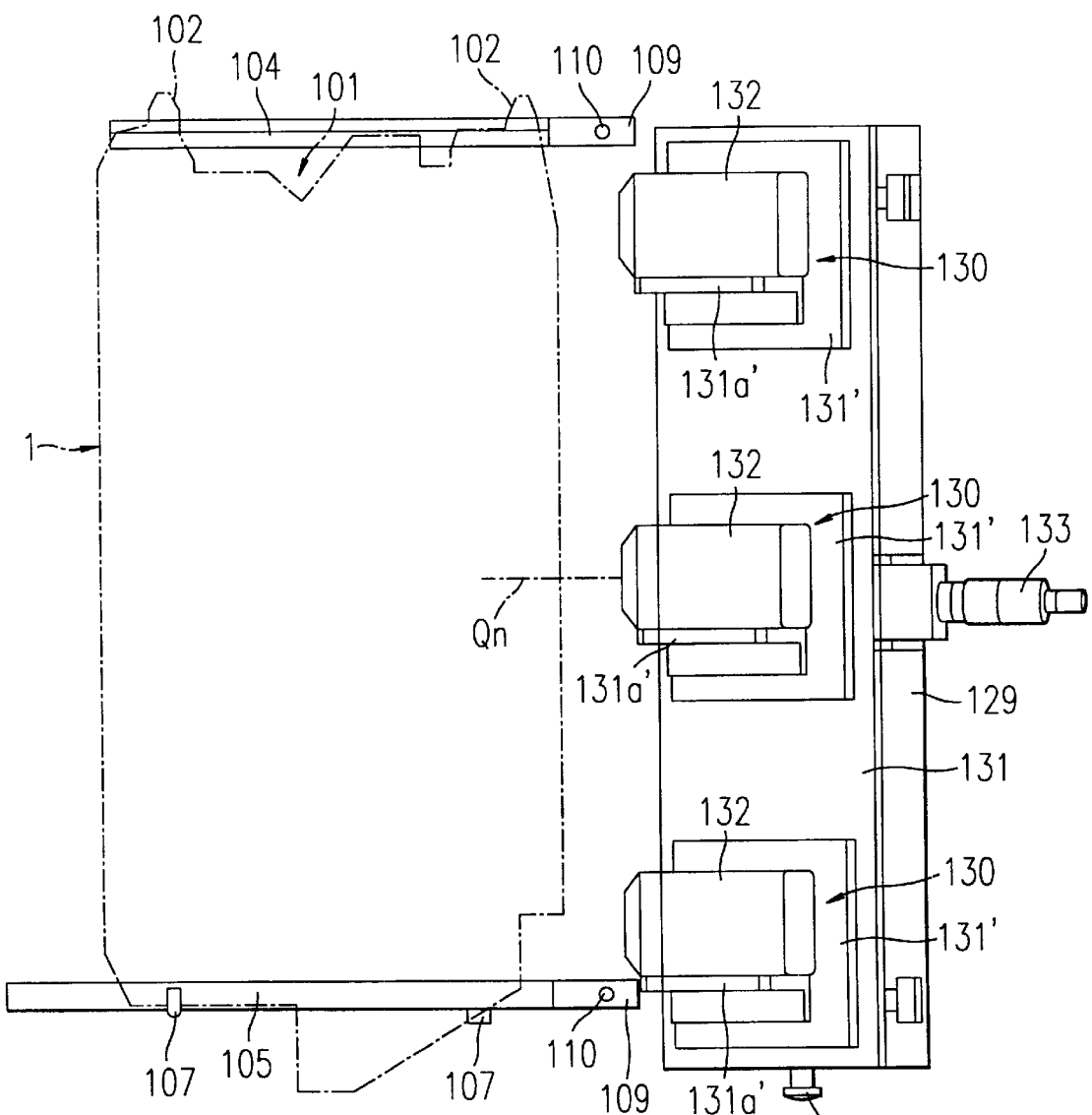
FIG. 36 is a plan view showing the mounted state of the write unit onto the image forming device.

FIGS. 35 and 36 show the mounted state of a write unit 1 onto an image forming device. Reference numeral 100 denotes the base of the image forming device. To this base 100 a write unit positioning member 101 is fixed as shown in FIGS. 35 and 36.

Figure 37:
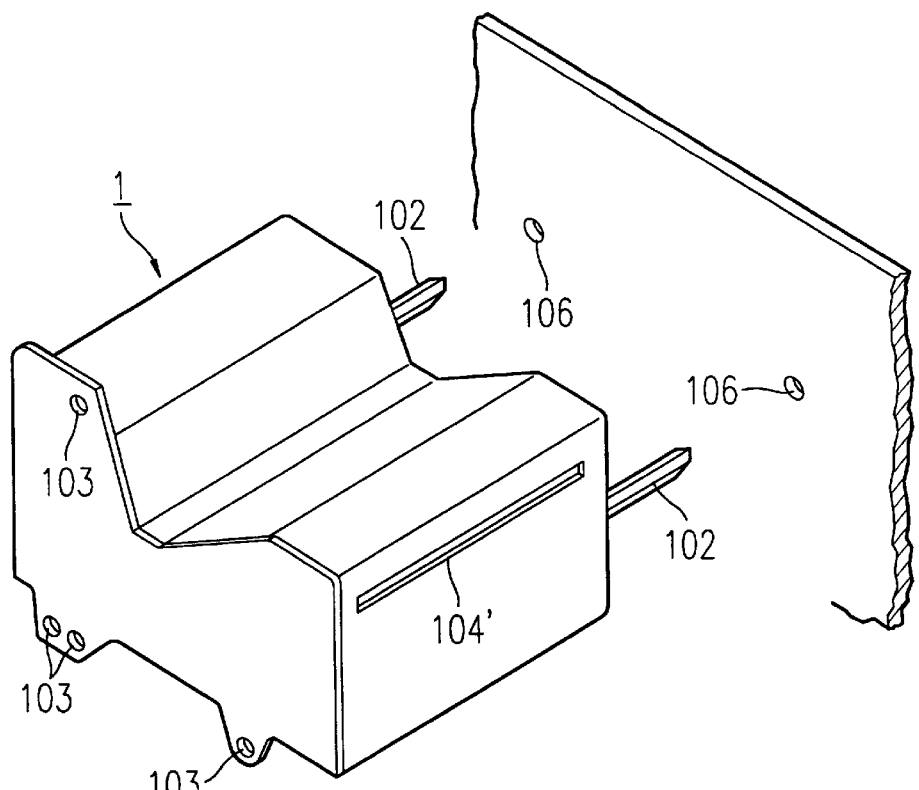
FIG. 37 is a diagram showing the exterior configuration of the write unit shown in FIGS. 35 and 36.

The write unit 1 has an exterior configuration shown in FIG. 37. One side wall of this write unit 1 is provided with positioning protrusions 102 and 102, while the other side wall is provided with positioning holes 103 and 103. This write unit 1 is formed with a long and narrow slit hole 104' extending in the horizontal scanning direction. From this long and narrow slit hole 104' a laser beam P1 is emitted toward a photosensitive drum (not shown).

Figure 38:
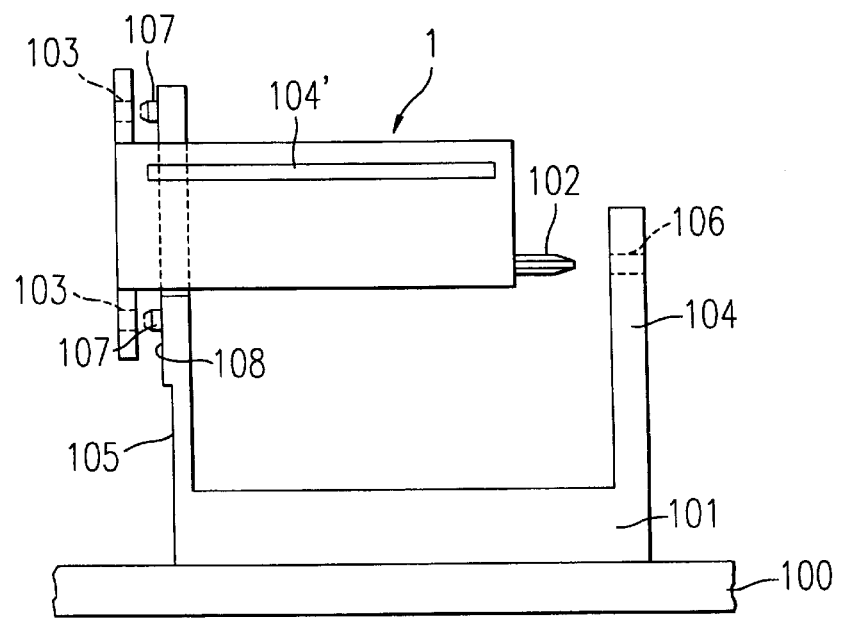
FIG. 38 is a front view showing the mounted state of the write unit onto the image forming device.
Figure 39:
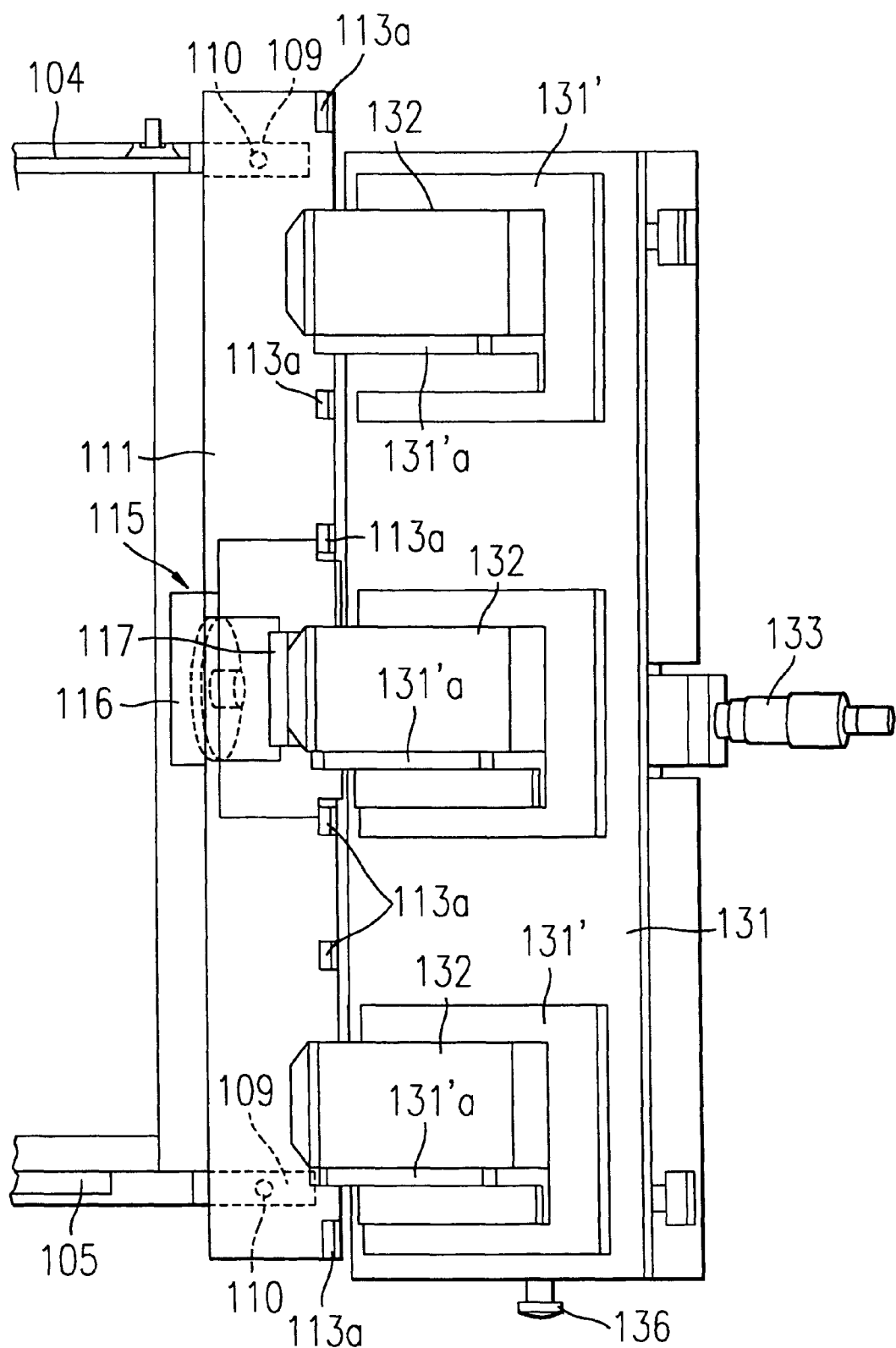
FIG. 39 is a partially enlarged plan view showing the layout relation between a positioning reference base and CCD cameras attached to a reference base attaching portion.
Figure 40A:
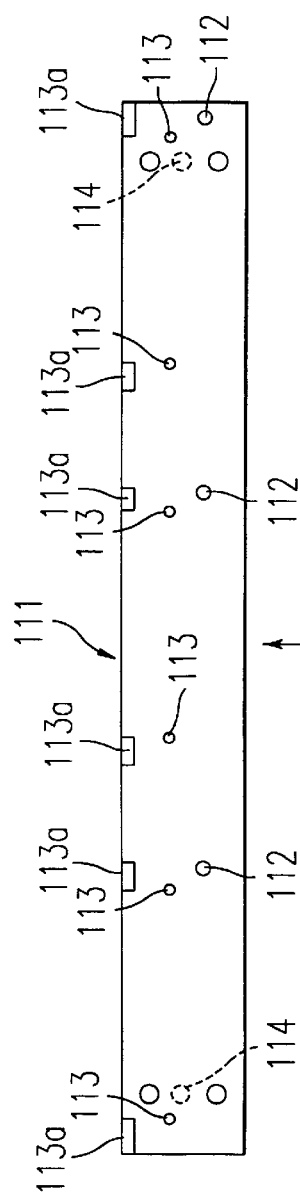
FIG. 40(a) is a plan view of the positioning reference base shown in FIG. 39.
Figure 40B:
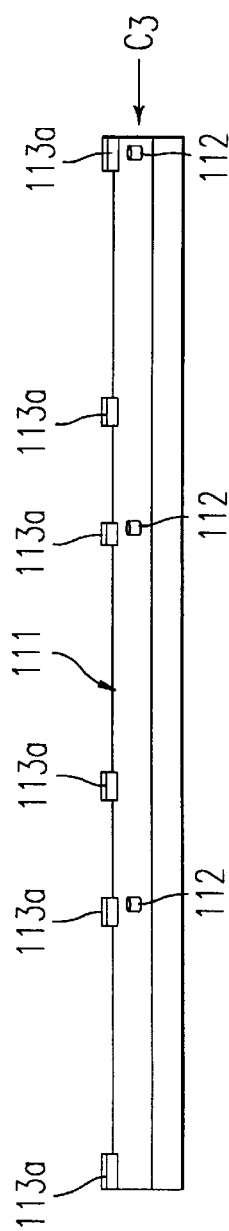
FIG. 40(b) is a view taken in a direction of arrow c1 in FIG. 40(a)
Figure 40C:
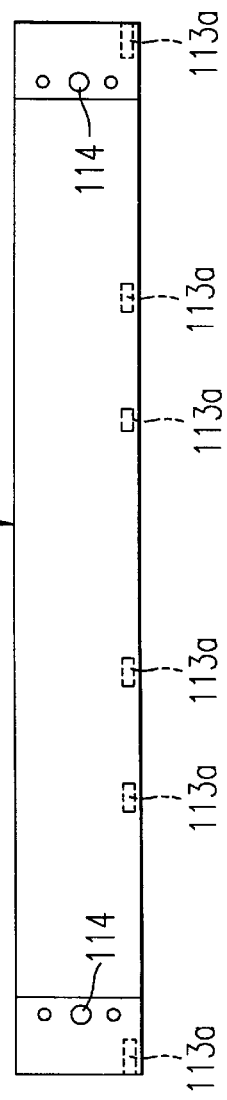
FIG. 40(c) is a view taken in a direction of arrow c2 in FIG. 40(b)
Figure 40D:
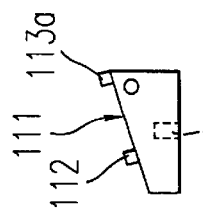
FIG. 40(d) is a view taken in a direction of arrow c3 in FIG. 40(b)

The write unit positioning member 101 has standing wall portions 104 and 105. as shown in FIGS. 36, 38, and 39. The first standing wall portion 104 is formed with a through hole 106, while the second standing wall portion 105 have positioning pins 107 rigidly attached thereto. The exterior wall 108 of the second standing wall portion 105 constitutes a surface for positioning the write unit 1 in the horizontal scanning direction. The point end portion of the write unit positioning member 101 serves as a reference base attaching portion 109 as shown in FIG. 39. Reference base attaching pins 110 are protruded from the reference base attaching portion 109.

To this reference base attaching portion 109 a positioning reference base 111 shown in FIGS. 40(a) through 40(d) is attached. This positioning reference base 111 extends lengthwise in the horizontal scanning direction. The upper surface of the positioning reference base 111 is formed with positioning pins 112 and positioning block attaching holes 113. The lower portion of the positioning reference base 111 is formed with fitting holes 114 into which the reference base attaching pins 110 are fitted.

Figure 41:
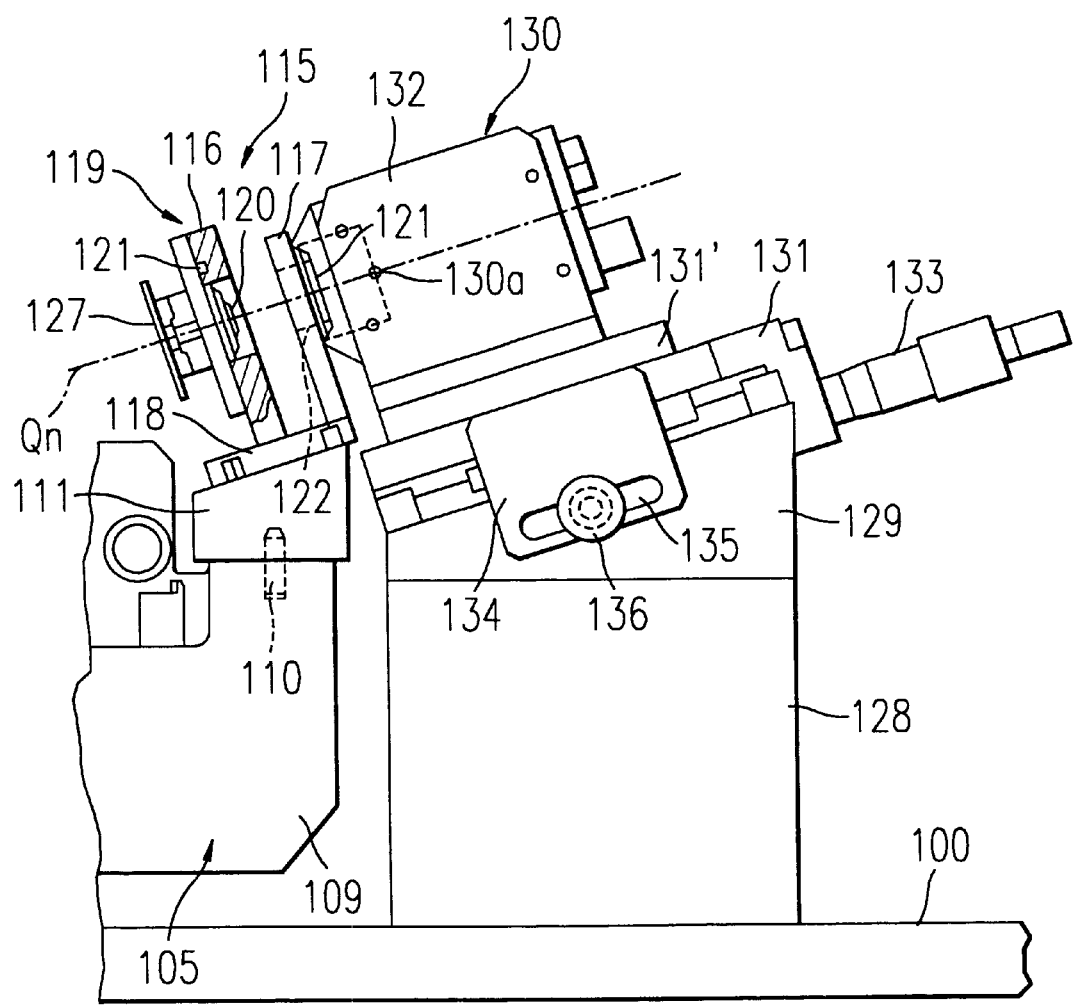
FIG. 41 is a partially enlarged plan view showing the layout relation between the positioning reference base and CCD cameras attached to the reference base attaching portion.

The upper surface of the positioning reference base 111 is inclined, and on this upper surface, standing plate portions 113a are spaced and formed in the longitudinal direction. As shown in FIG. 41, a positioning block member 115 is attached to the upper surface of the positioning reference base 111 and serves as an angular positioning determination member. In this embodiment, this positioning block member 115 has standing plate portions 116 and 117 and a flat plate portion 118 as shown in FIGS. 42(a) through 42(d). As shown in FIG. 41, an LD holder plate 119 as a cylindrical holder member is attached to the standing plate 116. The standing plate 116 is formed with a circular fitting hole 120, and an engagement pin 121 is rigidly attached to the standing plate 116. The second standing plate 117 is formed with an abutting portion 117a which is engaged by a CCD camera. The abutting portion 117a is formed with a throughhole 122. The circular fitting hole 120 is finished into a precisely true circular shape.

The LD holder plate 119 is formed with a cylindrical boss portion 123 as shown in FIG. 43(a). The exterior shape of this cylindrical boss portion 123 is also finished precisely. The cylindrical boss portion 123 is fitted into the circular fitting hole 120. The disc portion 119a of the LD holder plate 119, as shown in FIG. 43(b), is formed with laser diode positioning holes 124, later diode attaching holes 125, and angular positioning determination engagement holes 126. In this embodiment, the angular positioning determination engagement holes 126 are provided around the cylindrical boss portion 123 at intervals of 90 degrees.

As shown in FIG. 41, a reference laser diode (semiconductor laser) 127 is attached to the LD holder plate 119 and serves as a reference laser light source for determining a previously designed reference position. An attaching base 128 is fixed to the base 100, and a support base 129 is fixed to the attaching base 128. The support base 129 is provided with a slidable base 131. This slidable base 131 is provided with a CCD camera unit 130. The CCD camera unit 130 is constituted by an attaching base 131' and a CCD camera 132. An abutting plate 131a' is stood up in the attaching base 131'. A micrometer 133 is attached to the slidable base 131. The micrometer 133 functions as adjustment means which adjusts the imaging surface 130a of the area-type imaging element so that the imaging surface 130a is located at a surface equivalent to a surface to be scanned. The point end portion of the CCD camera unit 130 abuts on the abutting portion 117a.

The slidable base 131 is formed with a bent plate portion 134 as shown in FIG. 35. The bent plate portion 134 is formed with an elongated hole 135 extending in the sliding direction of the slidable base 131. The CCD camera unit 130 is adjusted in the sliding direction by the micrometer 133 so that the imaging surface of the area-type imaging element 130a is located at the surface 31 equivalent to the surface of the photosensitive drum to be scanned. Then, the CCD camera unit 130 is locked to the support base 129 by tightening the bent plate portion 134 with a locking screw 136.

Figure 44:
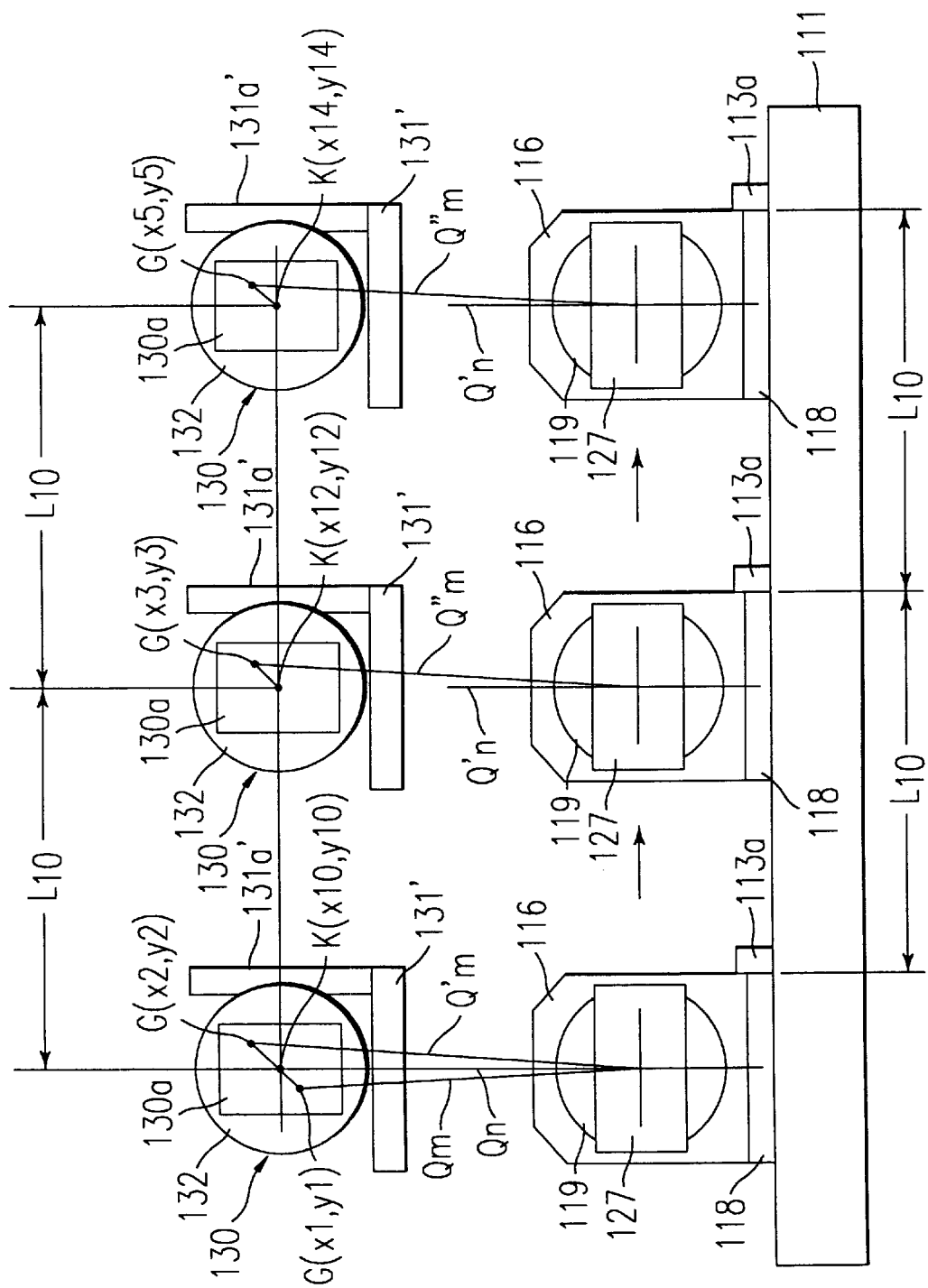
FIG. 44 is a diagram used to explain how a reference pixel of an area-type CCD camera unit is specified by a reference laser light source.

In this embodiment, three CCD camera units 130 are provided at regular intervals in the longitudinal direction of the positioning reference base 111. As shown in FIG. 44, the interval is L10. In the figure, the left CCD camera unit 130 is provided at the writing start side position. The middle CCD camera unit 130 is provided at the writing center position. The right CCD camera unit 130 is provided at the writing end side position.

As described in the first embodiment of the present invention, a laser light source section Sou and an optical scanning system are provided interiorly of the write unit 1. The surface of the photosensitive drum is scanned by this laser light source section, whereby writing is performed.

As shown in FIG. 41, the center of the circular fitting hole 120 is aligned with a previously designed emission locus (emission line) Qn of the laser beam P1 in the horizontal scanning direction and vertical scanning direction. However, the reference laser light emitted from the reference laser diode 127 is not necessarily emitted along this emission locus Qn. Only emitting the laser light beam by itself cannot specify the reference pixel K as the reference position of the area-type imaging element 130a present on the extension line of the emission locus Qn with the reference laser light.

Hence, the reference laser diode 127 is first opposed to the CCD camera unit 130 on the writing start side. As shown in FIG. 45(a), the LD holder plate 119 is fitted into the circular fitting hole 120. Then, the engagement pin 121 is fitted into one of the angular position determination engagement holes 120 of the LD holder plate 119. Next, the LD holder plate 119 is rotated on the center of the circular fitting hole 120, whereby the circumferential wall 126a of the angular position determination engagement hole 126 of the LD holder plate 119 is brought into contact with the engagement pin 121 in the direction of rotation. With this, the angular positioning of the reference laser diode 127 is performed.

And the reference laser diode 127 is lit with a lighting control circuit (not shown). The 1-dot lighting control circuit 35 of the write unit 1 may be employed. At this time, assume that the emission direction of the laser beam was a direction of Qm as shown in FIG. 44. Also, assume that the coordinates of the light-received pixel G of the area-type imaging element 130a which received the laser beam in the emission direction Qm were x1 and y1 (G(x1, y1)). Next, as shown in FIG. 45(b), the fitting between the engagement pin 121 and the angular position determination engagement hole 120 is released. Then, the LD holder plate 119 is rotated 180 degrees so that the engagement pin 121 is fitted into the angular position determination engagement hole 126'. Furthermore, the circumferential wall 126'a of the angular position determination engagement hole 126' of the LD holder plate 119 is brought into contact with the engagement pin 121 in the direction of rotation, whereby the angular positioning of the reference laser diode 127 is performed.

And the reference laser diode 127 is lit with a lighting control circuit (not shown). The 1-dot lighting control circuit 35 of the write unit 1 may be employed. At this time, assume that the emission direction of the laser beam was a direction of Qm' as shown in FIG. 44. Also, assume that the coordinates of the light-received pixel G of the area-type imaging element 130a which received the laser beam in the emission direction Qm' were x2 and y2 (G(x2, y2)).

Hence, the coordinates K(X10, Y10) of the reference pixel K present on the extension line of the emission locus Qn on the writing start side are computed by the following equations:

$$X10=\{(x1-x2)/2\}+x2$$

$$Y10=\{(y1-y2)/2\}+y2$$

Therefore, the position of the reference pixel K can be computed with a high degree of accuracy without employing a laser whose optical emission axis has been closely adjusted as the reference laser diode 127.

Next, a description will be made in the case of locating the positioning block member 115 in opposition to the middle CCD camera unit 130 and computing the coordinates K(X12, Y12) of the reference pixel K present on the extension line of a previously designed center emission locus Qn'.

First, the reference laser diode 127 is opposed to the middle CCD camera unit 130 and lit.

At this time, assume that the emission direction of the laser beam was a direction of Qm". Also, assume that the coordinates of the light-received pixel G of the area-type imaging element 130a which received the laser beam in the emission direction Qm" were x3 and y3 (G(x3, y3)).

The difference between the coordinates K(X12, Y12) of the reference pixel K present on the extension line of the emission locus Qn' at the writing center position and the coordinates K(X10, Y10) of the reference pixel K present on the extension line of the reference pixel on the writing start side is equal to the difference between the coordinates G(x3, y3) of the light-received pixel G of the area-type imaging element 130a which received the laser beam in the emission direction Qm" and the coordinates G(x2, y2) of the light-received pixel G of the area-type imaging element 130a which received the laser beam in the emission direction Qm'.

Therefore, $$X12-X10=x3-x2$$

$$Y12-Y10=y3-y2$$

Hence, $$X12=X10+x3-x2=\{(x1-x2)/2\}+x3$$

$$Y12=Y10+y3-y2=\{(y1-y2)/2\}+y3$$

Similarly, the coordinates K(X14, Y14) of the reference pixel K of the image sensor 130a of the CCD camera 132 provided on the writing end side are computed by the following equations with the coordinates of the light-received pixel G as G(x5, y5):

$$X14=\{(x1-x2)/2\}+x5$$

$$Y14=\{(y1-y2)/2\}+y5$$

Therefore, once the coordinates of the reference pixel K of a certain CCD camera 132 has been specified by rotating the LD holder plate 119, the specification of the reference pixels K of the remaining CCD cameras 132 can be performed without rotating the LD holder plate 119.

Note in FIG. 39 that the positioning block member 115 as an angular position determination member is provided at the center position.

By moving the slidable base 131 in the longitudinal direction thereof by the micrometer 133, it is possible to measure the beam diameter in the depth direction.

In this embodiment of the present invention, although a single positioning block member 115 is relocated so that the reference pixel K can be computed at each position, a single positioning block member 115 may be provided on the positioning reference base 111 so that it is slidable. Also, positioning block members 115 may be provided at the writing start side position, writing center position, and the writing end side position, respectively.

(Variation)

Figure 46:
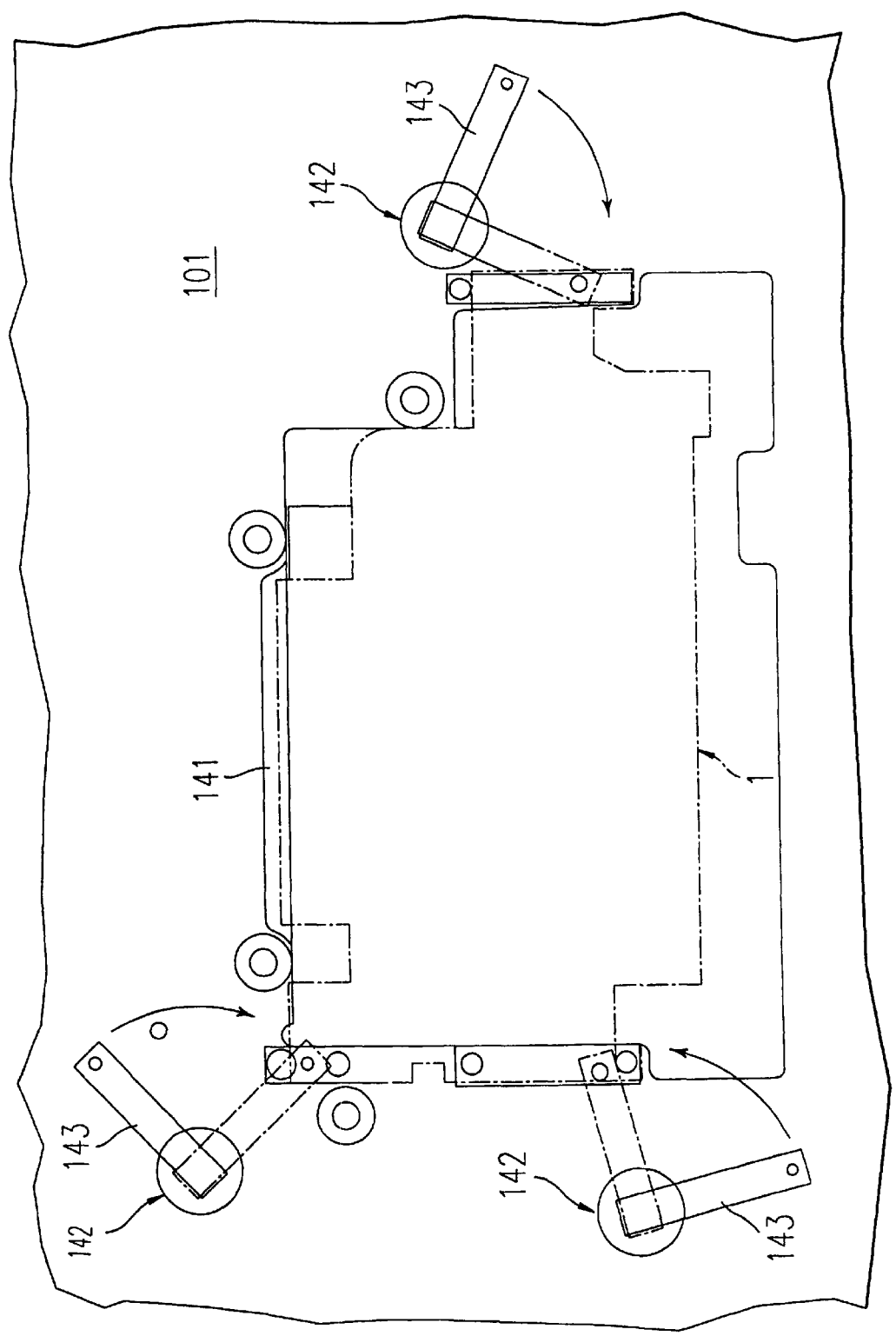
FIG. 46 is a plan view showing the mounted state of a write unit onto an image forming device.
Figure 47:
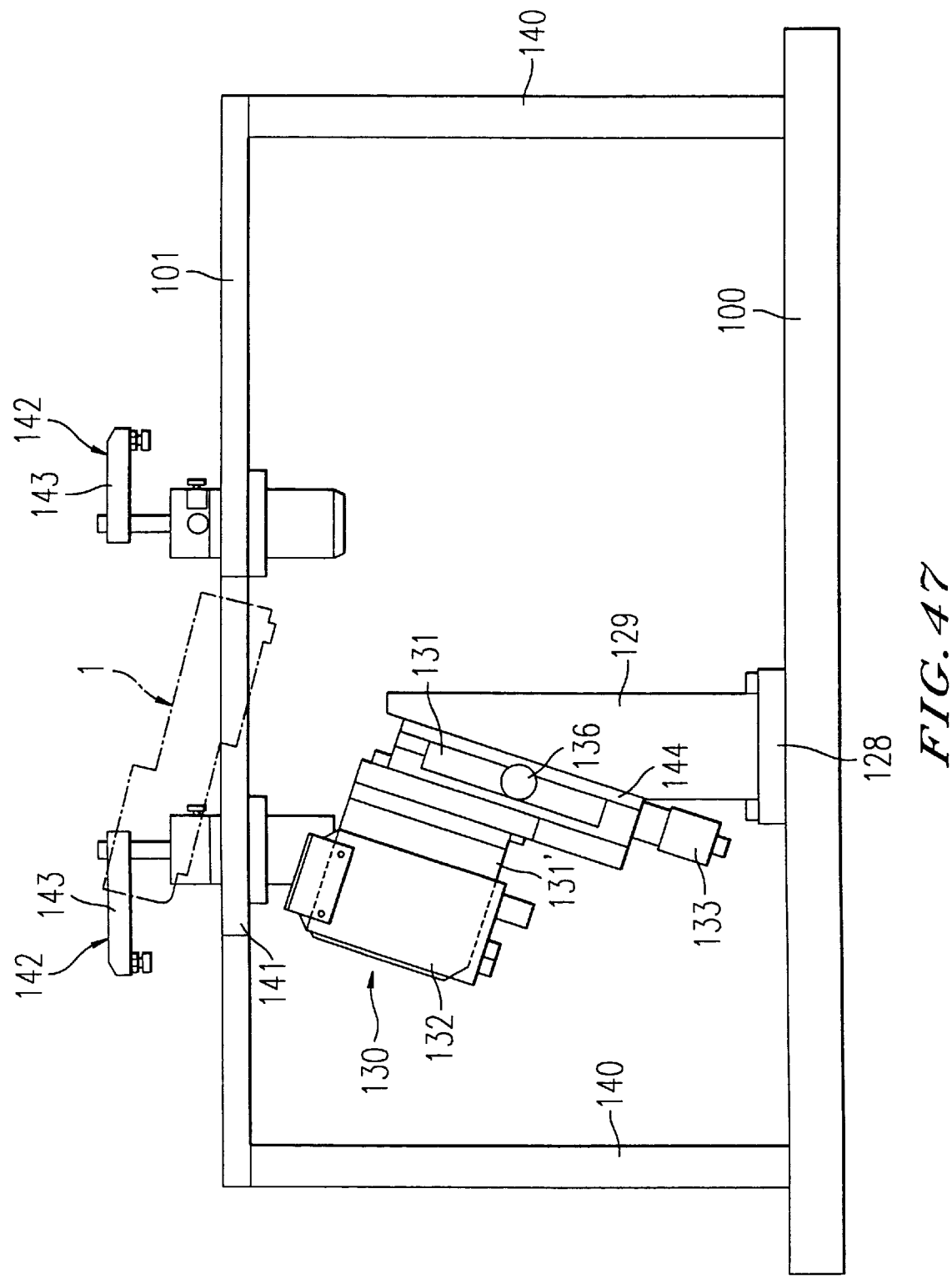
FIG. 47 is a side view showing the mounted state of the write unit onto the image forming device and also showing the state before the write unit is clamped.
Figure 48:
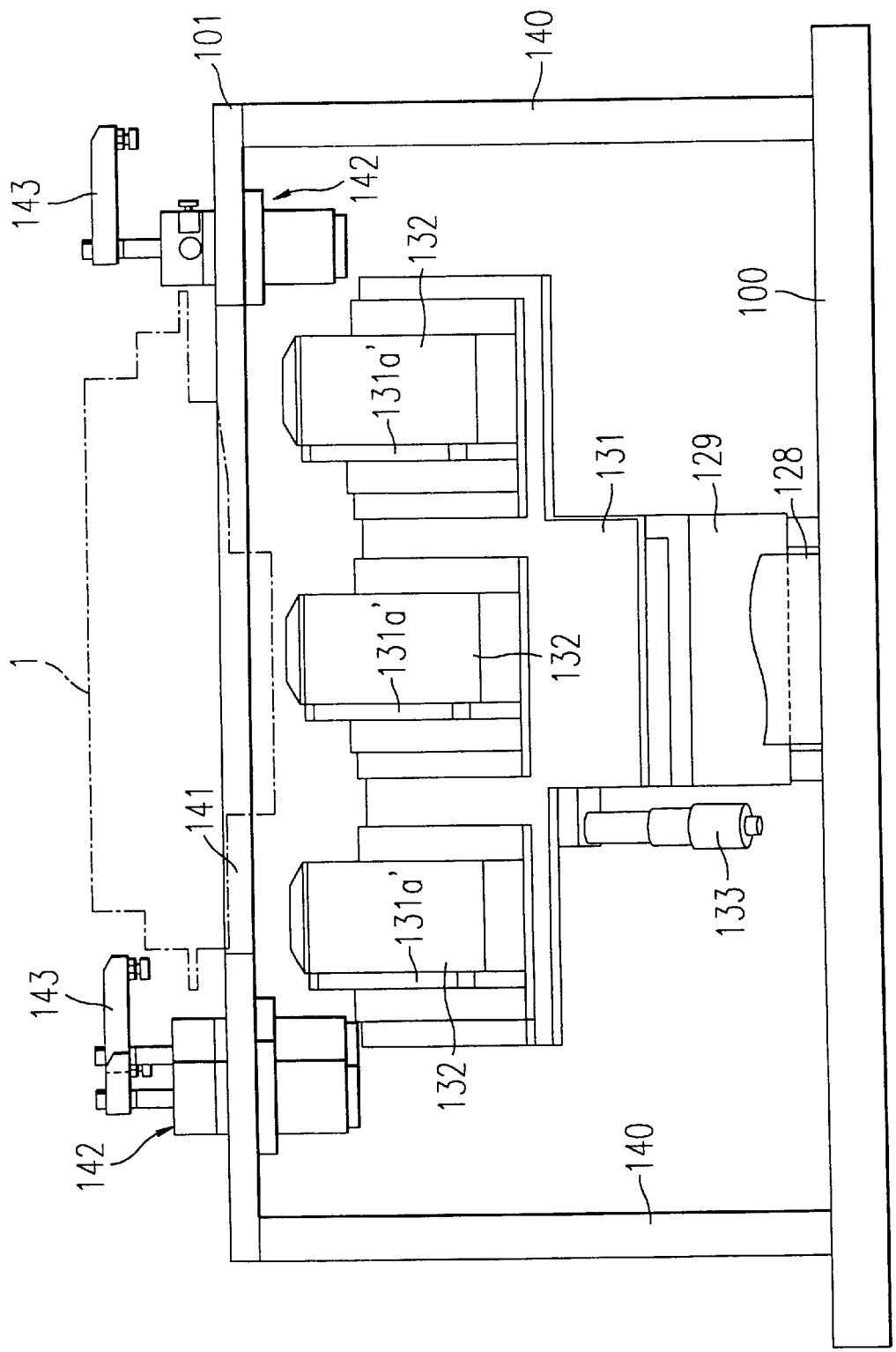
FIG. 48 is a front view showing the mounted state of the write unit and also showing the state before the write unit is clamped.

FIGS. 46 through 51 show a variation of the aforementioned detailed structure. FIGS. 46 through 48 show the attached state of a write unit 1 to an image forming device. Columns 140 are stood up in a base 100. To the upper ends of the columns 140 a write unit positioning member 101 is fixed. In this variation, the write unit positioning member 101 is constituted by a flat plate. The write unit positioning member 101 is formed with an opening 141 at the center thereof. The write unit positioning member 101 is provided with three clamp devices 142. Each clamp device 142 has a clamp lever 143. The write unit 1 is fixed to the write unit positioning member 101 by the clamp devices 142. An attaching base 128 is fixed to the base 100. To the attaching base 128 a support base 129 is fixed. The support base 129 is provided with a slidable base 131.

A CCD camera unit 130 is provided on the slidable base 131. The CCD camera unit 130 is constituted by a CCD camera 132 and an attaching base 131'. An abutting portion 131'a is stood up in the attaching base 131, and a micrometer 133 is attached to the sidable base 131. The micrometer 133 fulfills a role of adjusting the imaging surface 130a of the area-type imaging element so that the imaging surface 130a is located at a surface equivalent to a surface to be scanned.

Figure 49:
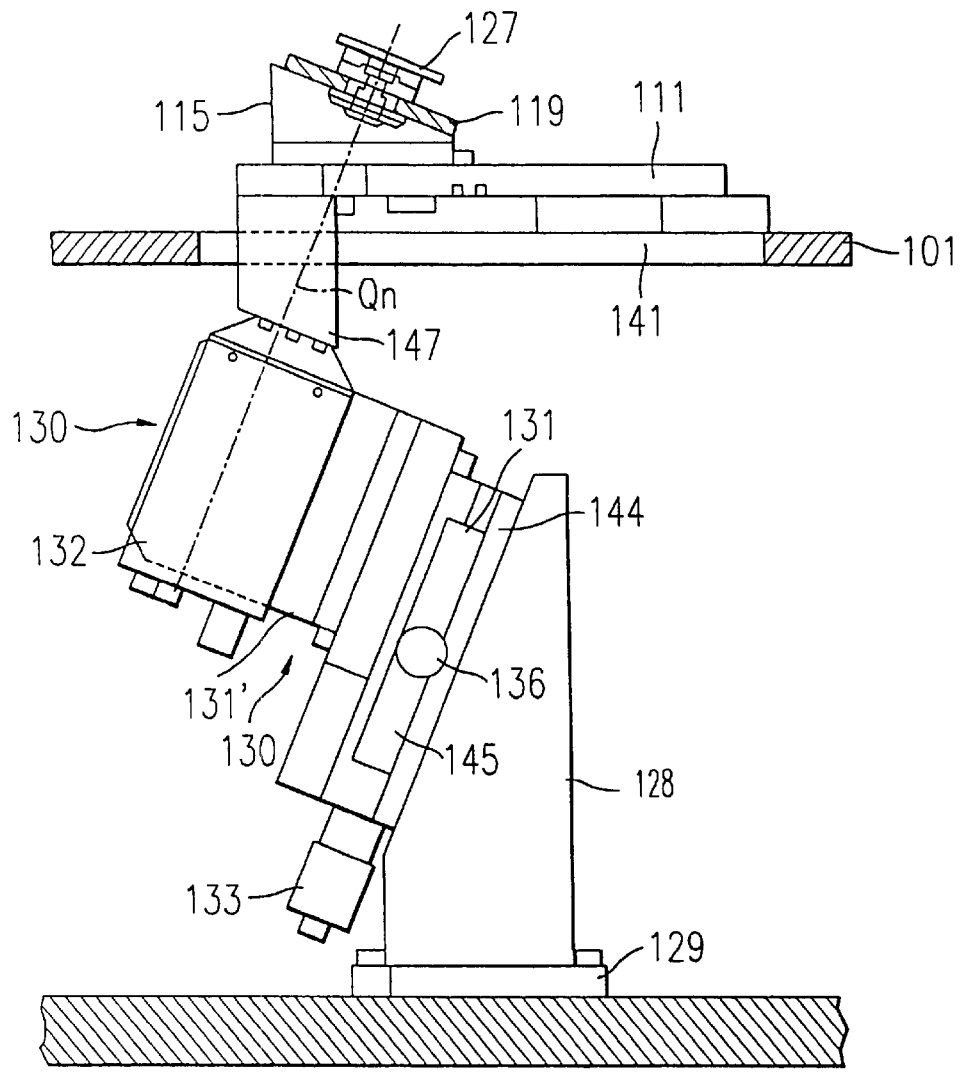
FIG. 49 is a plan view showing the positional relation between the CCD camera unit and the reference laser diode attached to the support base shown in FIG. 47.

As shown in FIG. 49, a clamp frame 144 is fixed to the support base 129. The slidable base 131 is formed with a guide hole 145 extending in the sliding direction of the slidable base 131. The slidable base 131 is locked to the support base 129 by tightening a locking screw 136.

Figure 51:
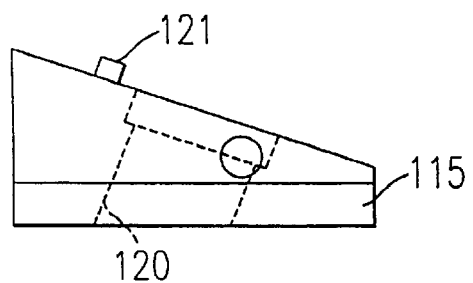
FIG. 51 is an enlarged side view of the positioning block shown in FIG. 49.
Figure 50:
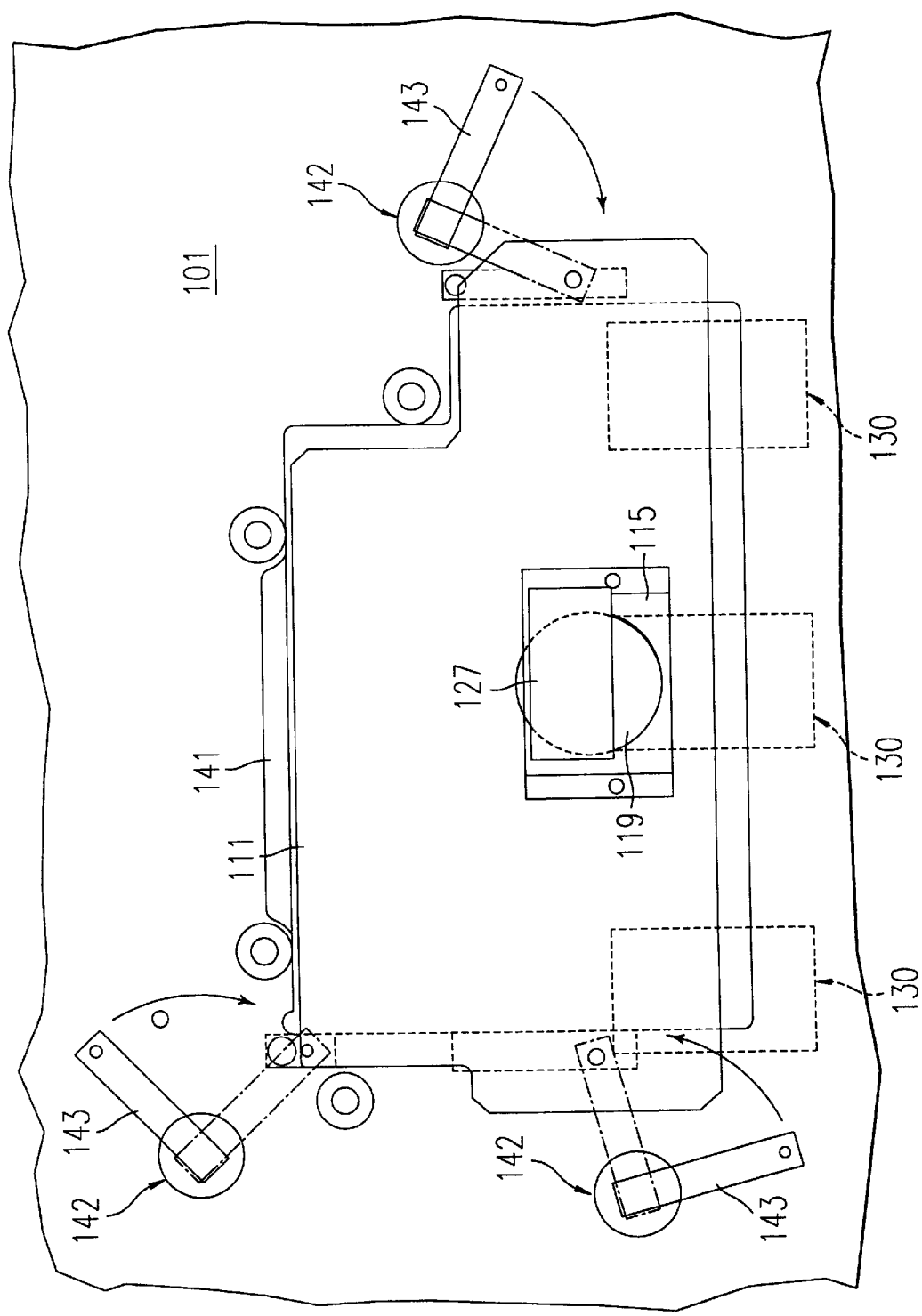
FIG. 50 is a plan view showing the positioning reference base and the positioning block attached to the write unit.

As shown in FIG. 50, a positioning reference base 111 is attached to the write unit positioning member 101. This positioning reference base 111 is fixed to the write unit positioning member 101 by the clamp device 142. The lower portion of this positioning reference base 111 is formed with an abutting portion 147. As shown in FIG. 51, a positioning block member 115 is attached to the upper portion of this positioning reference base 111.

The angular positioning block member 115 is formed with a circular fitting hole 120 and an engagement pin 121. To this angular positioning member 115 an LD holder plate 119 is attached. To this LD holder plate 119 a reference laser diode 127 is attached. The center of the circular fitting hole 120 is oriented in the same direction as a previously designed emission locus Qn.

In this variation, when specification of the reference pixel K is performed with the reference laser diode 127, the write unit 1 is removed from the write unit positioning member 101 and then the reference laser diode 127 is set to the write unit positioning member 101. When the laser light source of the write unit 1 is evaluated, the reference laser diode 127 and the positioning reference base 111 are removed and the write unit 1 is set to the write unit positioning member 101.

(Adjustment apparatus based on evaluation results)

A description will be hereinafter given of an adjustment apparatus based on evaluation results of the evaluation apparatuses 1 to 4.

Figure 20:
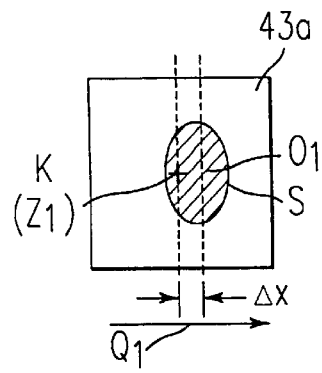
FIG. 20 is a diagram used to explain a structure for adjusting writing positions in the horizontal direction and is an explanatory diagram showing a state in which the center of a light beam is offset from a reference position present on a writing start side.

FIG. 20 relates to an adjustment apparatus based on the evaluation of evaluation item a.

(Structure for adjusting a writing position in the horizontal direction by the movement of a synchronous sensor)

There is discussed the constitution of adjustment means for a writing start position in the case where the beam center O1 of a beam spot S is offset by ΔX in a horizontal scanning direction with respect to reference pixel K (writing reference position Z1) on a writing start side, as shown in FIG. 20.

In the case where the beam center O1 is offset by ΔX in a horizontal scanning direction Q1 with respect to the reference position Z1 on a writing start side, adjustment is performed by moving a synchronous sensor 27 in the horizontal scanning direction Q1 perpendicular to a progressing direction of a light beam.

Figure 21:
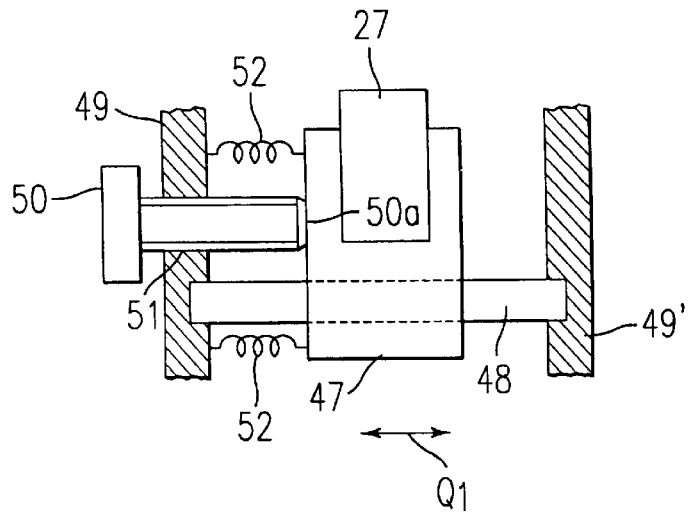
FIG. 21 is a partially sectional view showing an example of the writing position adjustment means for adjusting the horizontal scanning offset of the beam center from the reference position present on the writing start side shown in FIG. 20 and is a partially sectional conceptual view showing the positional adjustment structure of a synchronous sensor.

This synchronous sensor 27, as shown in FIG. 21, is attached to a movable body 47. The movable body 47 is provided on a guide shaft 48 so that it is movable along the guide shaft 48, the guide shaft 48 extending in the horizontal scanning direction Q1. The guide shaft 48 is extended between constitution walls 49 and 49' constituting part of a write unit 1. The constitution wall 49 is provided with an adjusting screw 50, which in turn meshes with a screw portion 51 formed in the constitution wall 49.

A tension spring 52 as an urging means is provided between the movable body 47 and the constitution wall 49, the movable body 47 being urged toward the constitution wall 49. The point end portion 50a of the adjusting screw 50 abuts on the wall portion of the movable body 47.

Figure 22:
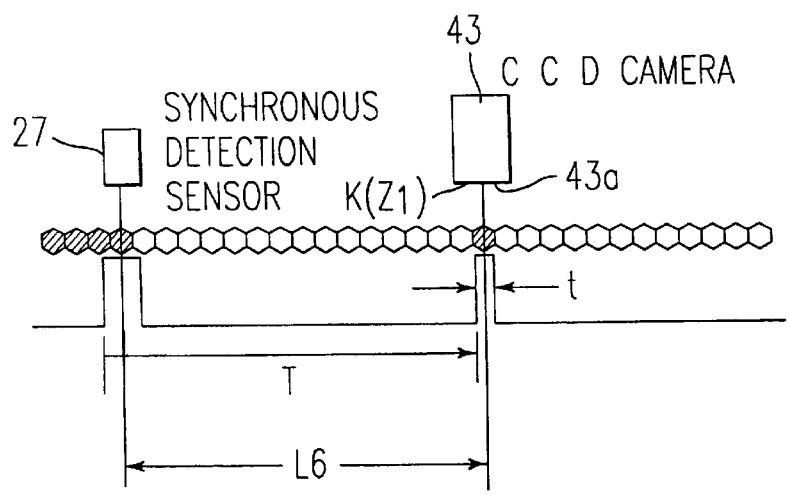
FIG. 22 is a diagram for explaining the writing adjustment timing that is performed by the synchronous sensor.

If the movable body 47 is moved slightly in the horizontal scanning direction Q1 by rotating the adjusting screw 50 positively or reversely, as shown in FIG. 22, the distance L6 from the synchronous sensor 27 to the writing reference pixel K (reference position Z1) will be adjusted, whereby the beam center O1 can be aligned with the previously designed writing reference position Z1 in the horizontal scanning direction, and the write timing correction of a writing start position becomes possible.

(Structure 1 for adjusting a writing position in the horizontal scanning direction by the movement of the write unit or the image forming unit)

Although the above-mentioned example performs the write timing correction of a writing start position by moving the synchronous sensor 27 in the horizontal scanning direction, this variation performs the adjustment of write timing by moving a write unit 1 and an image forming unit 53 relatively in the horizontal scanning direction Q1.

Figure 23:
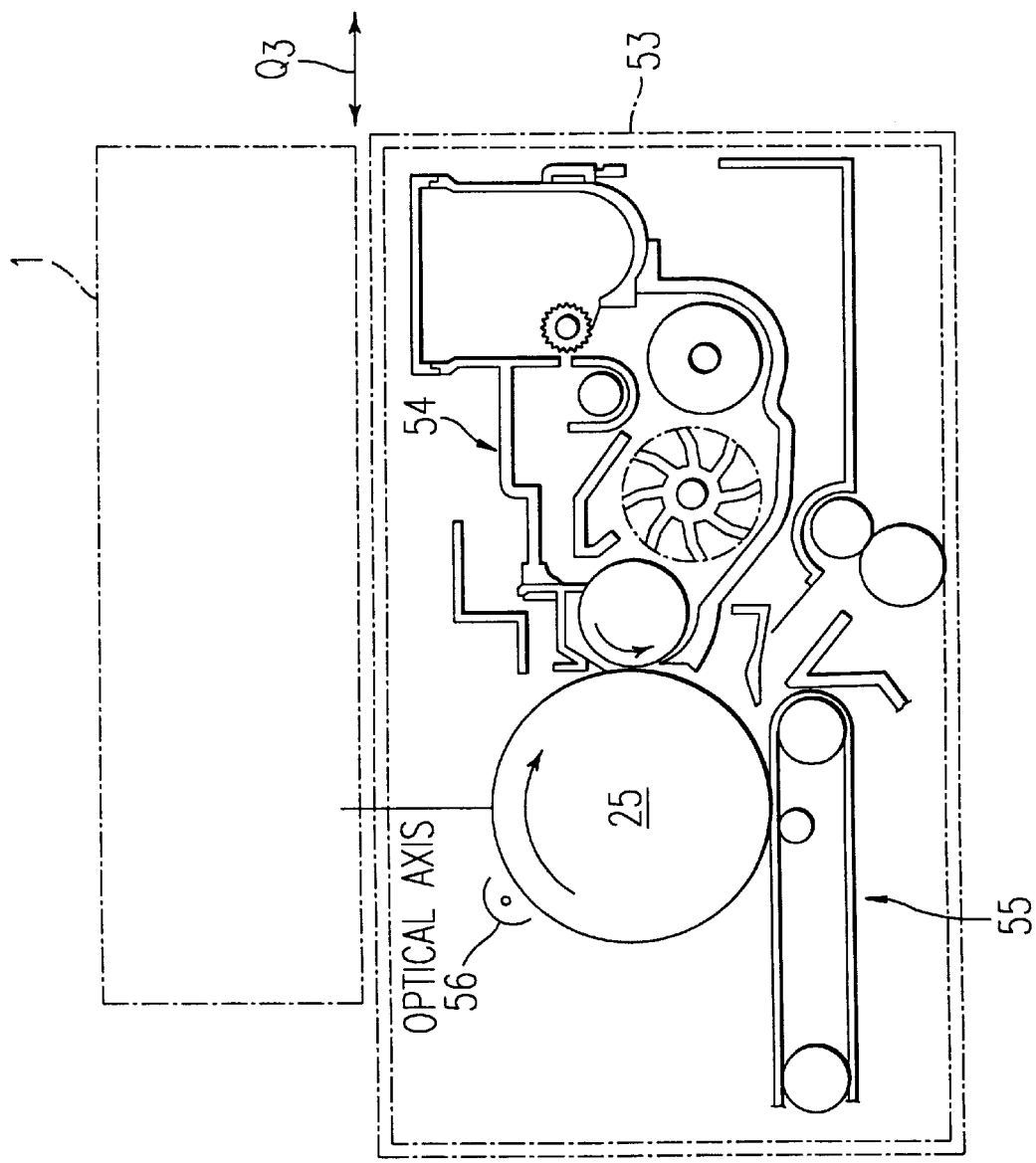
FIG. 23 is an explanatory diagram of structure 1 for adjusting a writing position in a horizontal scanning direction by moving a write unit or an image forming unit, showing the relative positional relation between the write unit and the image forming unit.

FIG. 23 shows the positional relation between the write unit 1 and the image forming unit 53. In this embodiment, at least the image forming unit 53 is provided with a developing roller unit 54, a transferring unit 55, and a charging unit 56 in the rotational area of a photosensitive drum 25. Note that the transferring unit 55 and the charging unit 56 may be formed integrally with each other. Also, the cleaning means and discharging means (not show) for the latent image carrier may be provided integrally with the image forming unit 53. Note that the vertical scanning direction Q3 is perpendicular to the optical axis of a light beam cast on the photosensitive drum 25.

Figure 24:
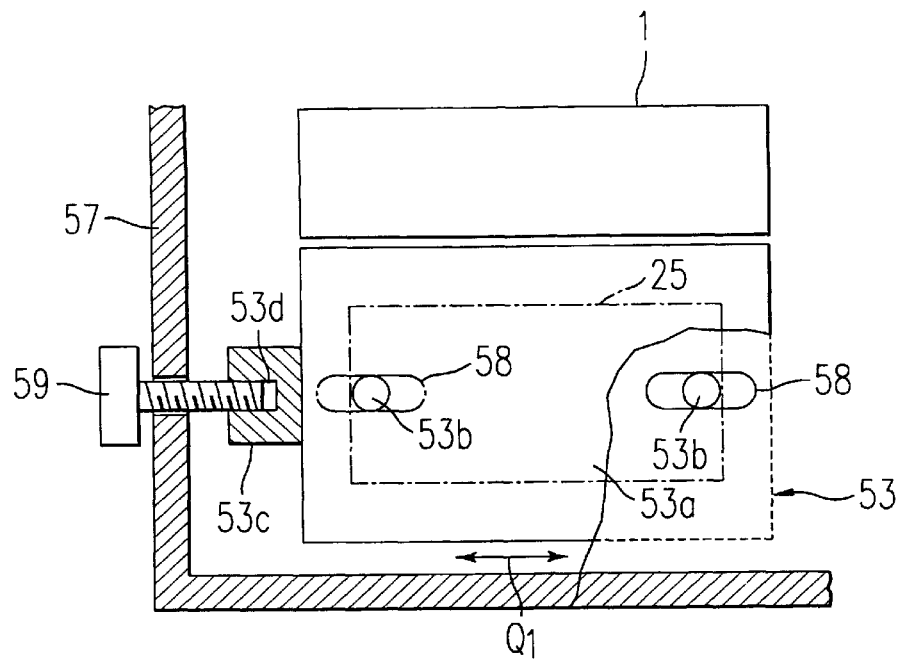
FIG. 24 is a partially sectional conceptual view showing an adjustment structure which adjusts writing start timing by moving the image forming unit relatively against the write unit shown in FIG. 23 in the horizontal scanning direction.

The main body constitution wall 57 of the image forming device, as shown in FIG. 24, is formed with guide holes 58 extending lengthwise in the horizontal scanning direction Q1. The image forming unit constitution wall 53a constituting the image forming unit 53 is provided with protruding support pins 53b and a protruding boss portion 53c. The boss portion 53c is formed with a screw portion 53d. The support pins 53b are fitted in the guide holes 58, respectively.

The main body constitution wall 57 is provided with an adjusting screw 59, which in turn meshes with the screw portion 53d of the boss portion 53c. If the adjusting screw 59 is adjusted, the image forming unit 53 will be moved in the horizontal scanning direction Q1 relatively against the write unit 1, whereby the position of the light beam P1 will be adjusted in the horizontal scanning direction Q1 with respect to the image forming unit 53 (or the photosensitive drum 25). With this adjustment, the write timing correction of the previously designed writing start position is performed in the horizontal scanning direction.

(Structure 2 for adjusting a writing position in the horizontal scanning direction by the movement of the write unit or the image forming unit)

Figure 25:
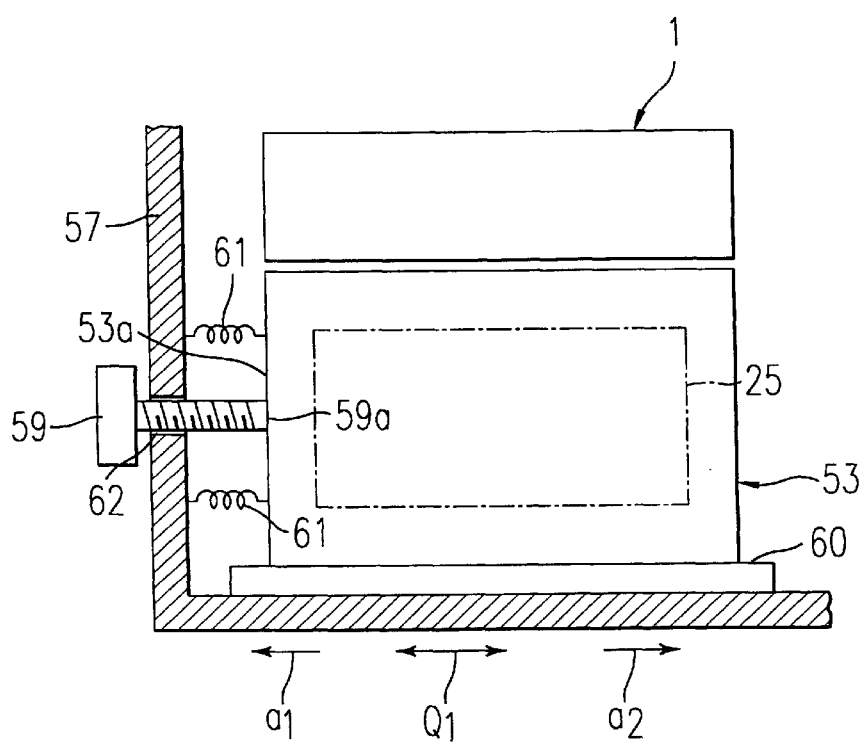
FIG. 25 is an explanatory diagram of structure 2 for adjusting a writing position in the horizontal scanning direction by moving the write unit or the image forming unit, and is a partially sectional conceptual view showing an adjustment structure which adjusts writing start timing by moving the image forming unit relatively against the write unit shown in FIG. 23 in the horizontal scanning direction.

In Structure 1, the image forming unit 53 is moved in the horizontal scanning direction Q1 by adjusting the adjusting screw 59 meshing with the screw portion 53d of the boss portion 53c, whereby the position of the light beam P1 with respect to the image forming unit 53 is adjusted in the horizontal scanning direction Q1. However, in this variation, as shown in FIG. 25, the image forming unit 53 is mounted on a guide rail 60 extending in the horizontal scanning direction Q1 and is movable in the horizontal scanning direction Q1. The image forming unit 53 is urged toward the main body constitution wall 57 by an elastic member such as a spring 61. The adjusting screw 59 meshes with a screw portion 62 formed in the main body constitution wall 57. The point end portion 59a of the adjusting screw 59 abuts on the image forming unit constitution wall 53a of the image forming unit 53.

If the adjusting screw 59 is rotated in a direction which weakens the pushing force of the point end portion 59a of the adjusting screw 59 to the image forming unit constitution wall 53a, the image forming unit 53 will be moved in a direction of arrow a1 by the urging force of the spring 61. On the other hand, if the adjusting screw 59 is rotated in the opposite direction which increases the pushing force of the point end portion 59a of the adjusting screw 59 to the image forming unit constitution wall 53a, the image forming unit 53 will be moved in a direction of arrow a2 against the urging force of the spring 61 by the pushing force of the adjusting screw 59. With this movement, the position of the light beam P1 with respect to the image forming unit 53 is adjusted in the horizontal scanning direction Q1.

(Structure 3 for adjusting a writing position in the horizontal scanning direction by the movement of the write unit or the image forming unit)

Figure 26:
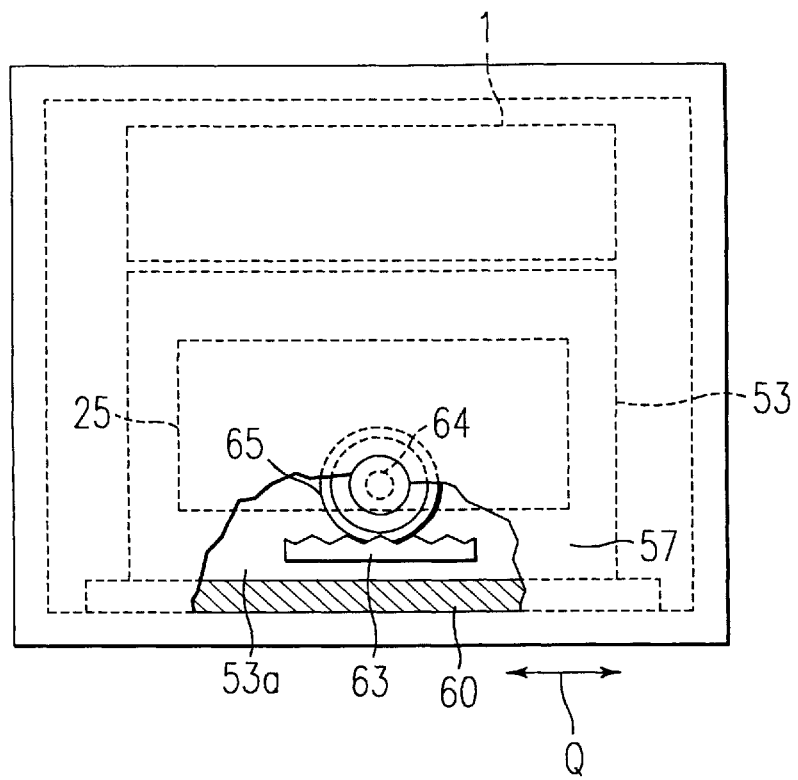
FIG. 26 is an explanatory diagram of structure 3 for adjusting a writing position in the horizontal scanning direction by moving the write unit or the image forming unit, and is a partially sectional conceptual view showing an adjustment structure which adjusts writing start timing by moving the image forming unit relatively against the write unit shown in FIG. 23 in the horizontal scanning direction.

In Structure 3, as shown in FIG. 26, the image forming unit 53 is mounted on the guide rail 60 extending in the horizontal scanning direction Q1 and is movable in the horizontal scanning direction Q1. In addition, the image forming unit 53 is formed with a rack portion 63. On the other hand, the main body constitution wall 57 is provided with an adjusting shaft 64 having a control knob portion. The shaft portion of the adjusting shaft 64 is provided with a pinion 65, which in turn meshes with the rack portion 63. The mesh between the pinion 65 and the rack portion 63 makes it possible to move the image forming unit 53 in the horizontal scanning direction Q1.

(Structure 4 for adjusting a writing position in the horizontal scanning direction by the movement of the write unit or the image forming unit)

Figure 27:
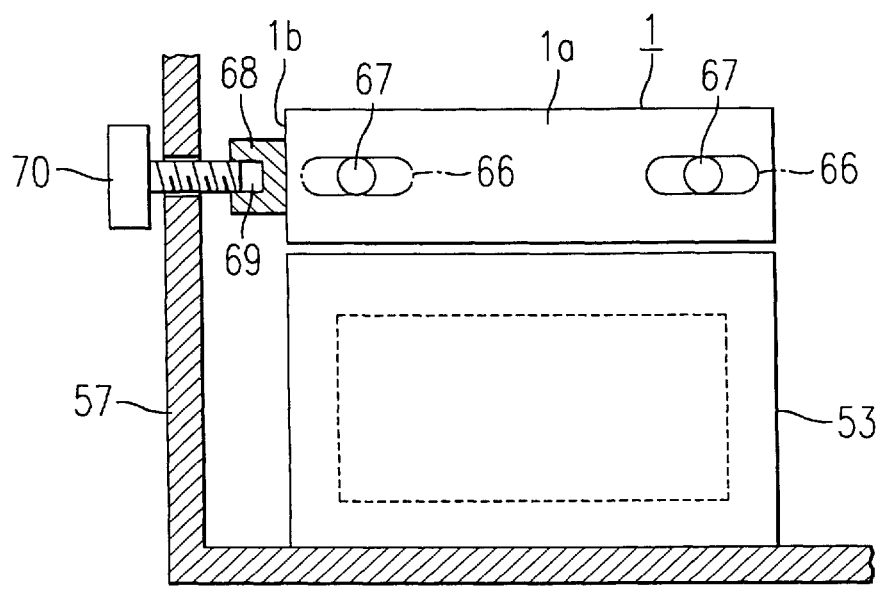
FIG. 27 is an explanatory diagram of structure 4 for adjusting a writing position in the horizontal scanning direction by moving the write unit or the image forming unit, and is a partially sectional conceptual view showing an adjustment structure which adjusts writing start timing by moving the image forming unit relatively against the write unit shown in FIG. 23 in the horizontal scanning direction.

As previously described, Structure 1 to Structure 3 have performed the positioning of the light beam P1 to the image forming unit 53 by moving the image forming unit 53 in the horizontal scanning direction Q1. But, this variation, as shown in FIG. 27, performs the positioning of the light beam P1 to the image forming unit 53 by moving the write unit 1 in the horizontal scanning direction Q1, while the image forming unit 53 remains stationary. The main body constitution wall 57 is provided with guide holes 66 at places corresponding to the write unit 1, the guide holes 66 extending lengthwise in the horizontal scanning direction Q1. The write unit constitution wall 1b is provided with protruding support pins 67 and a protruding boss portion 68. The boss portion 68 is formed with a screw portion 69, and the support pins 67 are fitted into the guide holes 66.

The main body constitution wall 57 is provided with an adjusting screw 70, which in turn meshes with the screw portion 69 of the boss portion 68. If the adjusting screw 70 is adjusted, the write unit 1 will be moved in the horizontal scanning direction Q1 relatively against the image forming unit 53, whereby the position of the light beam P1 will be adjusted in the horizontal scanning direction Q1 with respect to the image forming unit 53.

(Structure 5 for adjusting a writing position in the horizontal scanning direction by the movement of the write unit or the image forming unit).

As previously described, Structure 1 to Structure 4 have performed the positioning of the light beam P1 to the image forming unit 53 in the horizontal scanning direction Q1 by providing the image forming unit 53 downward and the write unit 1 upward. But, this variation performs the positioning of the light beam P1 to the image forming unit 53 in the horizontal scanning direction Q1 by providing the write unit 1 downward and the image forming unit 53 upward.

Figure 28:
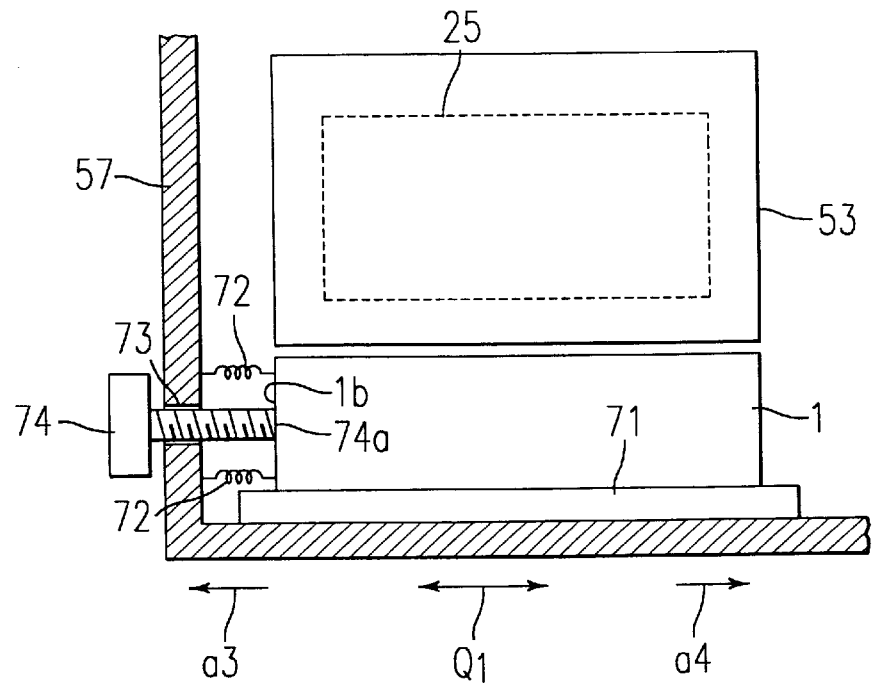
FIG. 28 is an explanatory diagram of structure 5 for adjusting a writing position in the horizontal scanning direction by moving the write unit or the image forming unit, and is a partially sectional conceptual view showing an adjustment structure which adjusts writing start timing by moving the image forming unit relatively against the write unit shown in FIG. 23 in the horizontal scanning direction.

As shown in FIG. 28, the image forming unit 53 is stationary, while the write unit 1 is mounted on a guide rail 71 extending in the horizontal scanning direction Q1 so that it is movable. The write unit 1 is urged toward the main body constitution wall 57 by a spring 72. The adjusting screw 74 meshes with a screw hole 73 formed in the main body constitution wall 57. The point end portion 74a of the adjusting screw 74 abuts on the write unit constitution wall 1b.

If the adjusting screw 74 is rotated in a direction which weakens the pushing force of the point end portion 74a of the adjusting screw 74 to the write unit constitution wall 1b, the write unit 1 will be moved in a direction of arrow a3 by the urging force of the spring 72. On the other hand, if the adjusting screw 74 is rotated in the opposite direction which increases the pushing force of the point end portion 74a of the adjusting screw 74 to the write unit constitution wall 1b, the write unit 1 will be moved in a direction of arrow a4 against the urging force of the spring 72 by the pushing force of the adjusting screw 74. With this movement, the position of the light beam P1 to the image forming unit 53 is adjusted in the horizontal scanning direction Q1.

(Structure for adjusting a writing position in the horizontal scanning direction by the movement of a sheet loading position)

FIG. 52 shows a structure for adjusting a writing position by moving a sheet loading position in the horizontal scanning direction Q1.

In this embodiment, as shown in FIG. 52(a), side race LED1 to LEDn are provided so that they face the surface 26 of the photosensitive drum 25. The LED1 to LEDn are arranged in a direction corresponding to the horizontal scanning direction Q1 as shown in FIG. 52(b).

The LED1 to LEDn are lit and controlled according to sheet size. These LED1 to LEDn are employed according to sheet size so that developing toner does not adhere to the side race of the photosensitive drum 25 (conveyance direction(vertical scanning direction Q3)). In other words, the LED1 to LEDn are employed to exposure the opposite end portions of the photosensitive drum 25.

The image forming unit 53 is provided with sheet loading trays 100 and 101. To the sheet loading tray 100 a side guide fixing plate attaching portion 102 is attached. This side guide fixing plate attaching portion 102 is provided with a side guide fixing plate 103. To this side guide fixing plate 103 a side guide 104 is attached so that it is slidable according to sheet size. The sliding direction of the side guide 104 corresponds to the horizontal scanning direction (perpendicular to a sheet conveying direction).

The side guide fixing plate 103 is slidable against the side guide fixing plate attaching portion 102 in the same direction as the side guide 104. The side guide fixing plate 103 is provided with an elongated hole 105 so that a writing position can be adjusted based on a writing position correction quantity based on the evaluation results of the first to the fourth evaluation apparatuses. Memory corresponding to the writing position correction quantity is provided within this elongated hole 105. After this adjustment, the side guide fixing plate 103 is fixed to the side guide fixing plate attaching portion 102 by screws.

For example, in the case of a sheet of A3 size long sideways, LED 1, LED2, LEDn-1, and LEDn are lit by a CPU. In the case where a writing position must be corrected in the horizontal scanning direction Q1 by a quantity equivalent to a single LED (in FIG. 52(b), when a writing position is offset upward), LED lighting control for each size is shifted by that quantity and executed. In the case of a sheet of A3 size long sideways, LED1, LEDn-2, LEDn-1, and LEDn are lit.

That is, if a writing position is moved and adjusted in the horizontal scanning direction Q1, it will be sufficient if a sheet conveying direction is moved. Furthermore, during conveyance of a sheet to the photosensitive drum 25, the sheet may be slid in the horizontal scanning direction Q1 while being conveyed.

(Structure for adjusting a writing position in the vertical scanning direction by the movement of the write unit or image forming unit)

Figure 29:
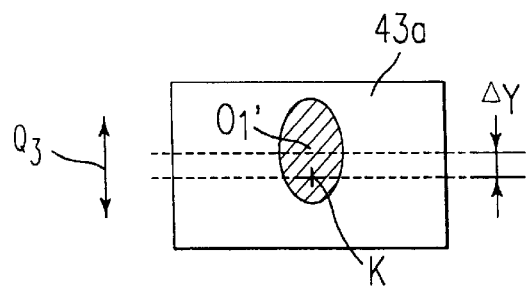
FIG. 29 is an explanatory diagram of structure for adjusting a writing position in a vertical scanning direction by moving the write unit or the image forming unit, and is an explanatory diagram showing the state in which the center of a light beam is offset from a reference position present on a writing start side in the vertical scanning direction.

This adjustment structure performs adjustment along the vertical scanning direction perpendicular to the traveling direction and horizontal scanning direction Q1 of a light beam which is emitted from the write unit and incident on the photosensitive drum, based on the result of the evaluation (evaluation item b) of a writing position in the vertical scanning direction shown in FIG. 29, obtained by the first to the fourth evaluation apparatuses.

That is, this positional adjustment structure adjusts write timing by moving the write unit 1 and the image forming unit 53 relatively in the vertical scanning direction Q3.

That is, this adjustment structure relates to the adjustment means of the writing start position when the beam center O1' of the beam spot S is offset by ΔY in the vertical scanning direction Q3, as shown in FIG. 29.

Figure 30:
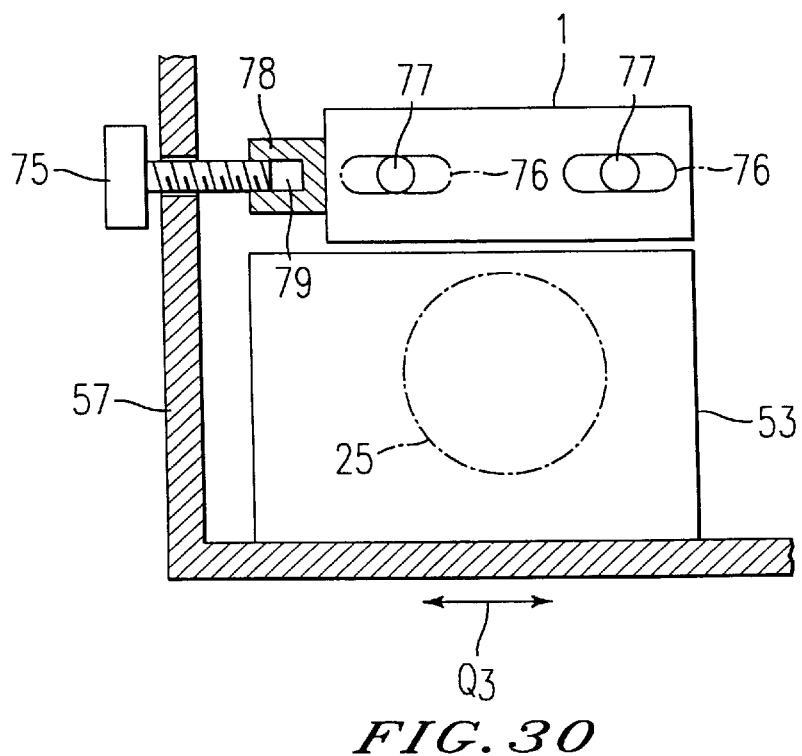
FIG. 30 is an explanatory diagram of structure for adjusting a writing position in the vertical scanning direction by moving the write unit or the image forming unit, and is a partially sectional conceptual view showing an adjustment structure which adjusts writing start timing by moving the image forming unit relatively against the write unit shown in FIG. 23 in the vertical scanning direction.

The main body constitution wall 57, as shown in FIG. 30, is provided with an adjusting screw 75 constituting part of a moving means and is formed with guide holes 76 extending in the vertical scanning direction Q3. The write unit 1 is provided with support pins 77 and is formed with a boss portion 78. The boss portion 78 is formed with a screw portion 79. The adjusting screw 75 meshes with the screw portion 79 of the boss portion 79. If the adjusting screw 75 is adjusted, the write unit 1 will be moved in the vertical scanning direction Q3 relatively against the image forming unit 53. With this movement, the position of the light beam P1 is adjusted in the vertical scanning direction Q3 with respect to the image forming unit 53.

In this adjustment structure, although the position of the light beam P1 is adjusted in the vertical scanning direction Q3 with respect to the image forming unit 53 by moving the write unit 1 in the vertical scanning direction Q3, the position of the light beam P1 to the image forming unit 53 may be adjusted by moving the image forming unit 53 in the vertical scanning direction Q3. In this case, the image forming unit 53 is formed with support pins 76 and a boss portion 78 which constitute part of a moving means.

In addition, the moving means may be constituted by a pinion which is rotated by an adjusting shaft with a control knob portion, and a rack meshing with this pinion.

(Structure for adjusting a depth by a laser diode (LD) unit)

Based on the appropriate beam waist correction quantity ΔW obtained in the depth evaluation, the fourth embodiment of the present invention moves the collimator lens 13 and 14 along the optical path of the light beam P1, thereby adjusting the optical path length. The optical path length adjustment means will hereinafter be described in reference to FIG. 32.

A base 81 for attaching the laser diode 11 (12) is fixed to the write unit constitution wall 1b by means of screws 82. This attaching base 81 is provided with an attaching hole 83 for the laser diode 11 (12) and an attaching hole 84 for the collimator lens 13 (14). The laser diode 11 (12) is fitted into the attaching hole 83 and fixed. The collimator lens 13 (14) is held by a lens barrel 85. The outer circumferential portion of the lens barrel 85 is formed with a male screw portion 86. The inner circumferential wall of the attaching hole 84 is formed with a female screw portion 87. The male screw portion 86 of the lens barrel 85 meshes with the female screw portion 87 of the attaching base 81. With this arrangement, the lens barrel 85 is held by the attaching base 81 so that it is movable in the axial direction of the attaching base 81.

The positional adjustment of the beam waist Bw is performed by rotating the lens barrel 85. That is, it is done by moving the collimator lens 13 (14) in the optical axis direction Q5 of the collimator lens 13 (14) with respect to the laser diode 11 (12). After adjustment of this beam waist Bw, the lens barrel 85 is fixed to the attaching base 81, for example, by an adhesive agent.

(Depth adjusting structure 1 for adjusting a depth by the write unit or the image forming unit).

Figure 33:
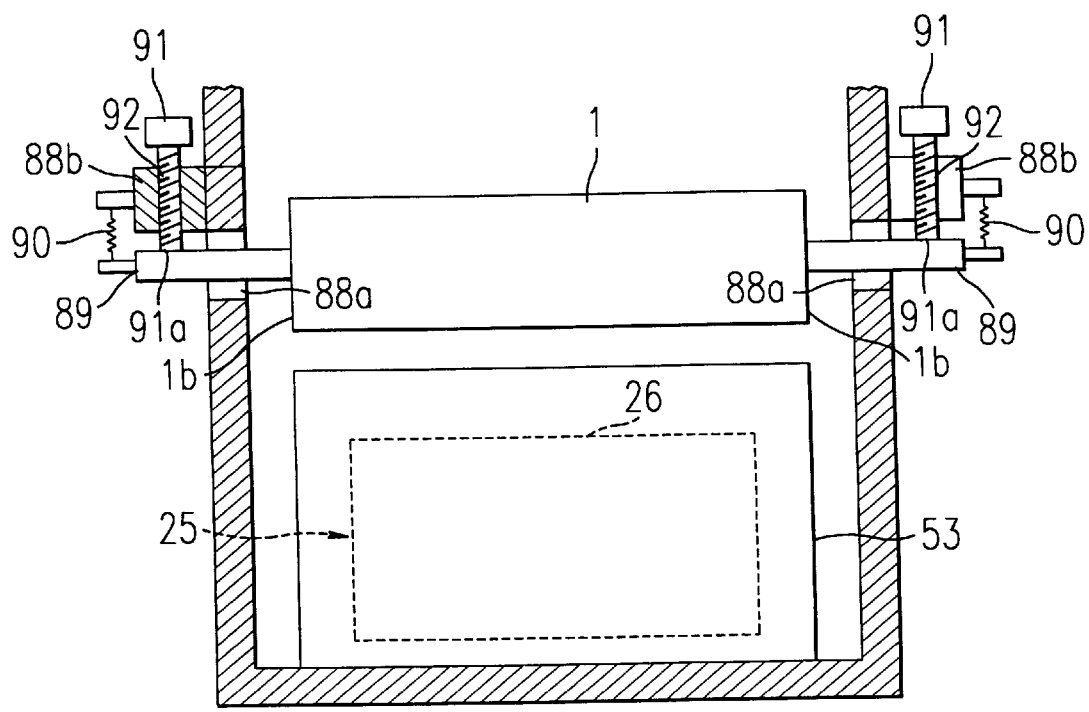
FIG. 33 is an explanatory diagram of structure 1 for adjusting a depth by means of a write unit or an image forming unit, and is a partially sectional view showing an optical path length adjustment structure which adjusts an optical path length by adjusting the gap between the write unit and the image forming unit, based on the depth curve obtained by the light beam characteristic evaluation apparatus shown in the fourth embodiment of the present invention.

The aforementioned example has adjusted the beam waist by moving the collimator lens 13 and 14 in the optical axis direction. This variation, as shown in FIG. 33, is provided with guide holes 88a and screw attaching portions 88b extending in the height direction of the main body constitution wall 57. The write unit constitution wall 1b is provided with guide pins 89, which are loosely fitted into the guide holes 88a. The write unit 1 is urged upward by the urging force of tension springs 90 through the guide pins 89. On the other hand, the screw attaching portions 88b are provided with screw portions 92, which in turn mesh with adjusting screws 91. The point end portion 91a of the adjusting screw 91 abuts on the guide pin 89. If the adjusting screws 91 are rotated to adjust the gap between the write unit 1 and the image forming unit 53, the optical path length will be varied and therefore the position of the beam waist is adjusted with respect to the surface 26 of the photosensitive drum 25.

(Depth adjusting structure 2 for adjusting a depth by the write unit or the image forming unit)

Figure 34:
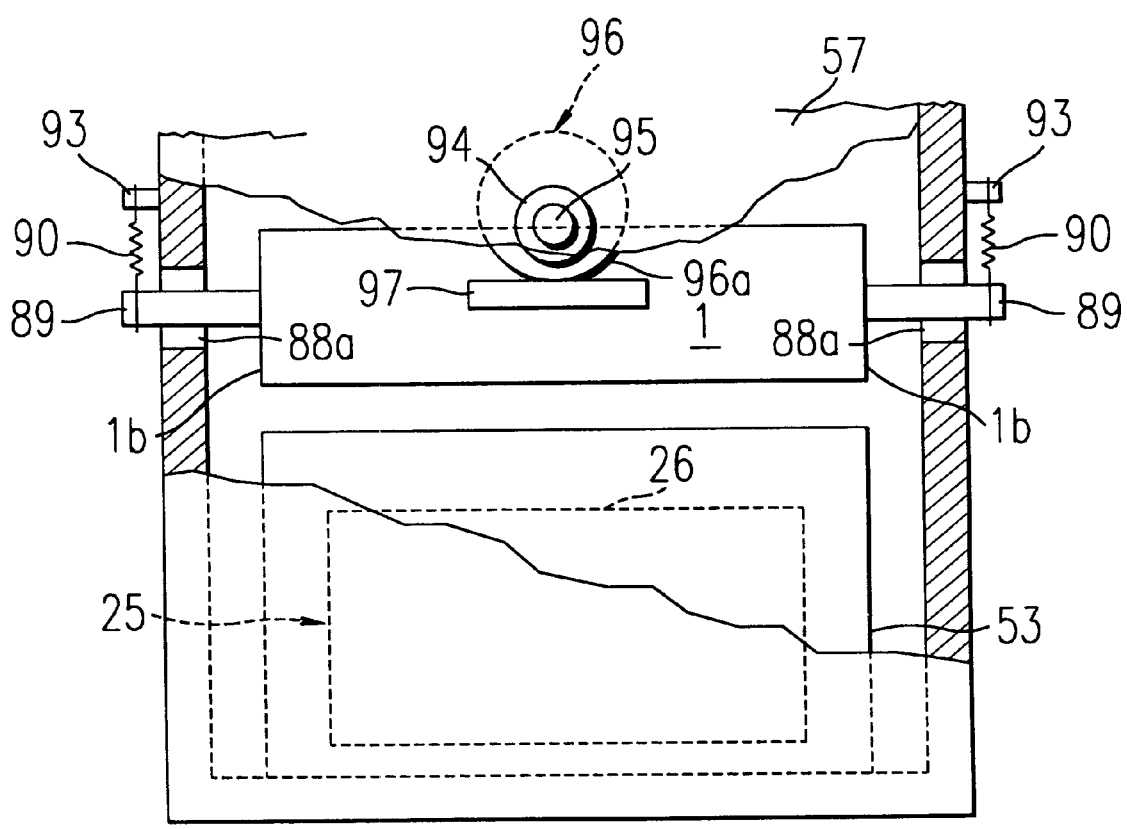
FIG. 34 is an explanatory diagram of structure 2 for adjusting a depth by means of the write unit or the image forming unit, and is a partially sectional view showing an optical path length adjustment structure which adjusts an optical path length by adjusting the gap between the write unit and the image forming unit, based on the depth curve obtained by the light beam characteristic evaluation apparatus shown in the fourth embodiment of the present invention.

The first depth adjusting structure is provided with the adjusting screws 91 to adjust the gap between the write unit 1 and the image forming unit 53. In a second depth adjusting structure, as shown in FIG. 34, the main body constitution wall 57 is provided with an adjusting knob 94. The shaft portion 95 of the adjusting knob 94 is provided with an eccentric cam 96. On the other hand, the write unit 1 is provided with an abutting portion 97, which in turn abuts on the cam surface 96a of the eccentric cam 96. The abutting portion 97 is brought into contact with the cam surface 96a by tension springs 90 each provided between a stop pin 93 and a guide pin 89. If the optical path length between the write unit 1 and the image forming unit 53 is changed by rotating the adjusting knob 94, the positional adjustment of the beam waist can be performed with respect to the surface 26 of the photosensitive drum 25.

Note that the aforementioned optical path length adjustment means may be constituted by a pinion which is rotated by an adjusting screw, and a rack meshing with this pinion.

In this example, although the write unit 1 is moved in the vertical scanning direction, the image forming unit 53 may be moved.

(Adjustment based on evaluation results regarding the other evaluation items)

a) When the evaluation in the evaluation item c or d is outside an allowable range, it is considered that the polygon mirror 19 is defective, so it is desirable to exchange the polygon mirror 19 mounted in the write unit 1 for a new one.

b) When the evaluation in the evaluation item e or f is outside an allowable range, the aperture diameter of an aperture member (not shown), provided in an optical path between the laser diode LD and the polygon mirror 19, is adjusted. This aperture member is usually arranged directly after the collimator lens in the traveling direction of a light beam. In this adjustment of the aperture diameter of the aperture member, the aperture diameter of the aperture member may be adjusted by mechanical adjustment means. Also, the aperture member presently arranged in the optical path may be removed and exchanged for an aperture member having another aperture diameter.

c) It is desirable that the adjustment based on the evaluations of the magnification error and magnification error deviation in the evaluation items g and i be performed by an exchange of f θ lens or an exchange of reflecting mirrors.

This is because there is a high possibility that a magnification error or magnification error deviation will occur as a result of the influence on the right and left optical path lengths caused by an optical defect in optical elements such as the fθ lens 24 and the reflecting mirror 24 constituting an optical system which guides the light beam reflected by the polygon mirror 19 to the photosensitive drum 25.

Figure 53A:
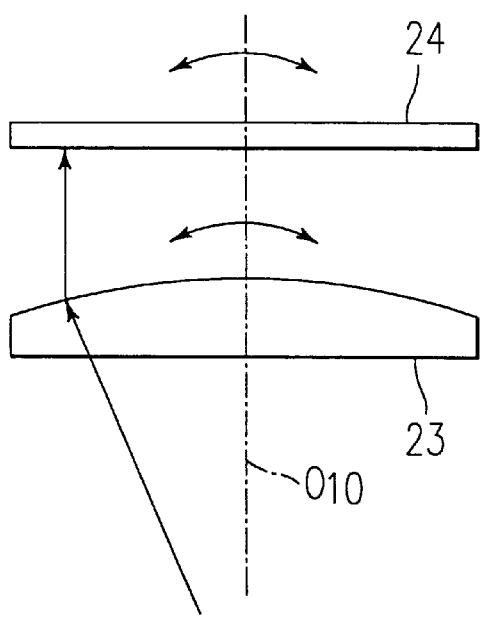
FIG. 53(a) is a diagram showing how a reflecting mirror or an fθ lens is adjusted with respect to the optical axis when there is only a magnification error.
Figure 53B:
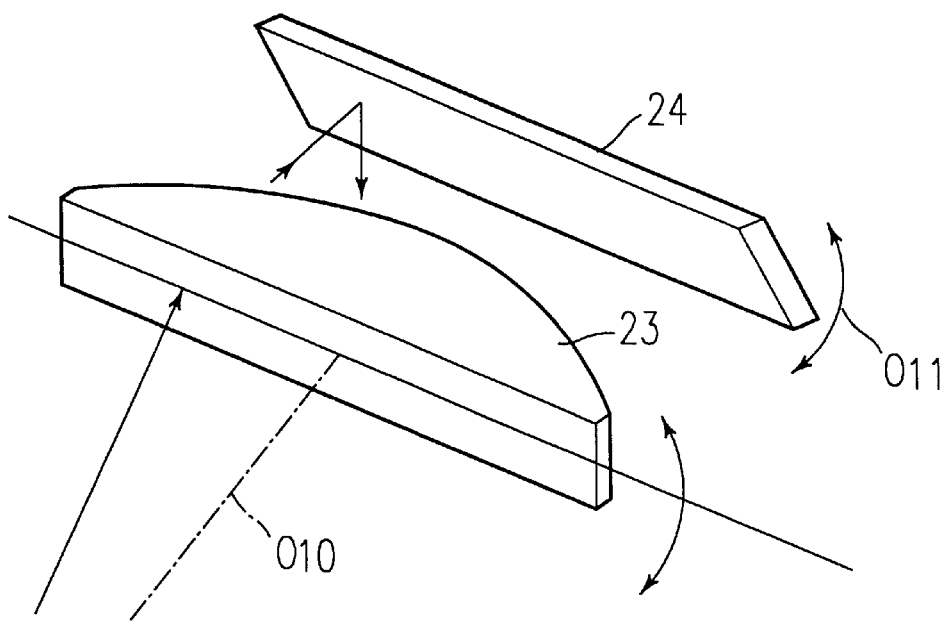
FIG. 53(b) is a diagram showing how the reflecting mirror or the fθ lens is adjusted with respect to the optical axis when there is only scanning line tilt.

In the case of only the magnification error in the evaluation item g, as shown in FIG. 53(*a*), the adjustment can be performed by adjusting the reflecting mirror 24 or fθ lens 23 around the optical axis O 10 through a predetermined angle.

(d) For adjustment based on the evaluations of the scanning line tilt and scanning line curvature in the evaluation items h and j, it is also desirable that the adjustment be performed by an exchange of fθ lens or an exchange of reflecting mirrors.

This is because there is a high possibility that scanning line tilt or scanning line curvature will occur as a result of the influence on the right and left optical path lengths caused by an optical defect in optical elements such as the fθ lens 24 and the reflecting mirror 24 constituting an optical system which guides the light beam reflected by the polygon mirror 19 to the photosensitive drum 25.

In the case of only the scanning line tilt in the evaluation item h, as shown in FIG. 53(*b*), the adjustment can be performed by adjusting the reflecting mirror 24 or fθ lens 23 around the optical axis O 10 through a predetermined angle and also adjusting the inclined angle of the reflecting mirror 24 in a direction of arrow O 11.

(e) Adjustment based on the evaluation of the pitch space in the evaluation item m is performed by adjusting a unit with a plurality of LDs around the optical axis through a predetermined angle.

(f) Adjustment based on the evaluation of the scanning period in the evaluation item i is performed by adjusting the rotation speed of the polygon mirror 19. As with FIG. 53(*a*), the scanning period can also be performed by adjusting the reflecting mirror 24 or fθ lens 23 around the optical axis O 10 through a predetermined angle.

Figure 32:
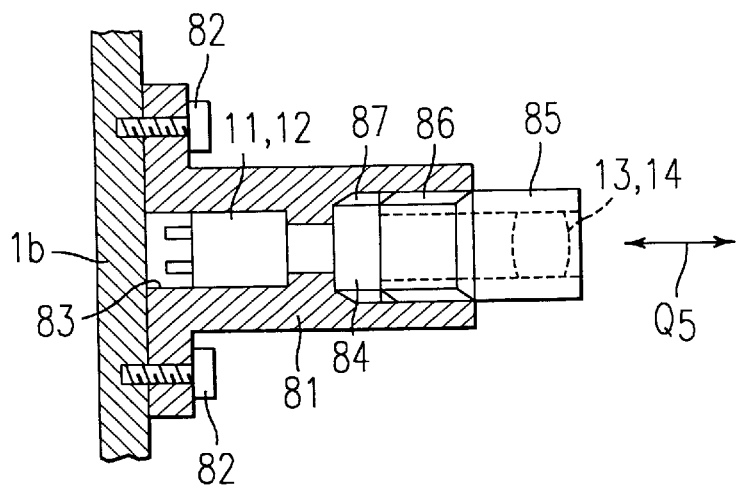
FIG. 32 is an explanatory diagram of an adjustment structure which adjusts a depth by means of a laser diode unit, and is a partially sectional view showing an optical path length adjustment structure which adjusts an optical path length by adjusting the position of a collimator lens in an optical axis direction, based on the depth curve obtained by the light beam characteristic evaluation apparatus shown in the fourth embodiment of the present invention.

(g) Adjustment based on the evaluation of the depth in the evaluation item 1 is performed as described in FIGS. 32 to 34.

While the present invention has been fully described with relation to the preferred embodiment thereof, the invention is not to be limited to the details given herein, but may be modified within the scope of the appended claims.

What is claimed is:

1. An adjustment apparatus comprising:
    a write unit incorporating an optical scanning system to form an electrostatic latent image on a surface of a latent image carrier by a light beam emitted from a laser light source;
    an image forming unit incorporating at least said latent image carrier; and
    moving means for moving either one of said write unit or said image forming unit relatively along a horizontal scanning direction in order to adjust an offset quantity of said light beam in said horizontal scanning direction.

2. The adjustment apparatus as set forth in claim 1, wherein said image forming unit is provided with a developing unit.

3. The adjustment apparatus as set forth in claim 1, wherein said moving means is constituted by a guide hole formed in a main body constitution wall of an image forming device and extending lengthwise in said horizontal scanning direction, and a support pin formed in either said write unit or said image forming unit and fitted into said guide hole.

4. The adjustment apparatus as set forth in claim 1, wherein said moving means is constituted by an adjusting screw for moving either said write unit or said image forming unit in said horizontal scanning direction, and elastic means for urging either said write unit or image forming unit moved by said adjusting screw so that a point end of said adjusting screw abuts on said unit.

5. The adjustment apparatus as set forth in claim 1, wherein said moving means is constituted by an adjusting screw for moving either said write unit or said image forming unit in said horizontal scanning direction and a boss portion provided in either said write unit or image forming unit moved by said adjusting screw, said adjusting screw meshing with said boss portion.

6. An adjustment apparatus comprising:
    a write unit incorporating an optical scanning system to form an electrostatic latent image on a surface of a latent image carrier by a light beam emitted from a laser light source;
    an image forming unit incorporating at least said latent image carrier; and
    moving means for moving one of said write unit or said image forming unit relatively along a vertical scanning direction defined as a direction perpendicular to both a traveling direction of a light beam which is incident from said write unit toward said image forming unit and a horizontal direction in order to adjust an offset quantity of the light beam in said vertical scanning direction.

7. The adjustment apparatus as set forth in claim 6, wherein said image forming unit is provided with a developing unit.

8. The adjustment apparatus as set forth in claim 6, wherein said moving means is constituted by a guide hole formed in a main body constitution wall of an image forming device and extending lengthwise in said vertical scanning direction, and a support pin formed in either said write unit or said image forming unit and fitted into said guide hole.

9. The adjustment apparatus as set forth in claim 6, wherein said moving means is constituted by an adjusting screw for moving either said write unit or said image forming unit in said vertical scanning direction and elastic means provided in either said write unit or image forming unit moved by said adjusting screw, the elastic means being used for urging the moved unit so that a point end of said adjusting screw abuts on said unit.

10. The adjustment apparatus as set forth in claim 6, wherein said moving means is constituted by an adjusting screw for moving either said write unit or said image forming unit in said vertical scanning direction and a boss portion provided in either said write unit or image forming unit moved by said adjusting screw, said adjusting screw meshing with said boss portion.

11. An adjustment apparatus comprising:
a write unit incorporating both an optical scanning system and a synchronous sensor for determining a write timing period with respect to a latent image carrier in order to form an electrostatic latent image on a surface of said latent image carrier by a light beam emitted from a laser light source; and
moving means for moving said synchronous sensor in a horizontal scanning direction in order to adjust an offset quantity of the light beam of said write unit with respect to said latent image carrier in said horizontal scanning direction.

12. The adjustment apparatus as set forth in claim 11, wherein said moving means is constituted by a movable body for holding said synchronous sensor, a guide shaft for guiding said movable body in said horizontal scanning direction, an adjusting screw for moving said movable body by its point end portion abutting on said movable body, and means for urging said movable body in a direction which abuts on the point end portion of said adjusting screw.

13. An adjustment apparatus which comprises optical path length adjustment means for moving at least either an image forming unit or a write unit so that a space therebetween is increased or decreased, in order to adjust an optical path length between a laser light source and a writing object surface of said image forming unit and based on a beam waist position correction quantity obtained by a light beam characteristic evaluation method comprising the steps of:
(a) lighting said laser light source of a light beam which is employed to scan said writing object surface of said image forming unit linearly during a scanning period equivalent to 1 dot;
(b) moving an area-type solid-state imaging element which detects said light beam in order along a traveling direction of said light beam with said writing object surface as a reference position, thereby obtaining a beam image at each position by said area-type solid-state imaging element;
(c) based on each beam image obtained by said area-type solid-state imaging element at each position in a traveling direction of said light beam, computing a beam diameter at said each position of said light beam and thereby computing a beam diameter with respect to a depth direction;
(d) from said beam diameter and a depth, computing a depth curve representative of a relation of said beam diameter to said depth;
(e) specifying a beam waist position on the basis of said depth curve; and
(f) from a difference between said beam waist position and said reference position, computing said beam waist position correction quantity.

14. The adjustment apparatus as set forth in claim 13, wherein in order to change an optical path length between a surface of a latent image carrier of said image forming unit and said write unit, said optical path length adjustment means is constituted by a guide hole formed in a main body constitution wall of an image forming device and a guide pin formed in either said write unit or said image forming unit and fitted into said guide hole.

15. An adjustment apparatus which comprises optical path length adjustment means for adjusting an optical path length between a laser light source and a surface to be scanned, based on a beam waist position correction quantity obtained by a light beam characteristic evaluation method comprising the steps of:
(a) lighting said laser light source of a light beam which is employed to scan said surface linearly during a scanning period equivalent to 1 dot;
(b) moving an area-type solid-state imaging element which detects said light beam in order along a traveling direction of said light beam with said writing object surface as a reference position, thereby obtaining a beam image at each position by said area-type solid-state imaging element;
(c) based on each beam image obtained by said area-type solid-state imaging element at each position in a traveling direction of said light beam, computing a beam diameter at said each position of said light beam and thereby computing a beam diameter with respect to a depth direction;
(d) from said beam diameter and a depth, computing a depth curve representative of a relation of said beam diameter to said depth;
(e) specifying a beam waist position on the basis of said depth curve; and
(f) from a difference between said beam waist position and said reference position, computing said beam waist position correction quantity.

16. The adjustment apparatus as set forth in claim 15, wherein:
said laser light source is equipped with a semiconductor laser for emitting a light beam, a collimator lens for collimating said light beam, and a lens barrel for holding said collimator lens;
said lens barrel is formed with a first screw portion along an optical axis direction;
a constitution wall of said write unit is formed with a second screw portion at a position at which said lens barrel is arranged, said first screw portion meshing with said second screw portion; and
said optical path length adjustment means is constituted by said first and second screw portions.

* * * * *